United States Patent
Watabe et al.

(10) Patent No.: US 6,663,491 B2
(45) Date of Patent: Dec. 16, 2003

(54) GAME APPARATUS, STORAGE MEDIUM AND COMPUTER PROGRAM THAT ADJUST TEMPO OF SOUND

(75) Inventors: Hajime Watabe, Tokyo (JP); Toshio Suzuki, Tokyo (JP); Akio Onda, Tokyo (JP); Kyoko Endo, Tokyo (JP)

(73) Assignee: Namco Ltd., Tokyo (JP)

( * ) Notice: Subject to any disclaimer, the term of this patent is extended or adjusted under 35 U.S.C. 154(b) by 195 days.

(21) Appl. No.: 09/784,315

(22) Filed: Feb. 16, 2001

(65) Prior Publication Data

US 2002/0160823 A1 Oct. 31, 2002

(30) Foreign Application Priority Data

Feb. 18, 2000 (JP) ........................ 2000-042048
Feb. 18, 2000 (JP) ........................ 2000-042049
Feb. 18, 2000 (JP) ........................ 2000-042052

(51) Int. Cl.[7] ................................ A63F 13/00
(52) U.S. Cl. ............................ 463/36; 463/7
(58) Field of Search ................. 434/250, 236; 463/7, 8, 30, 31, 36; 473/131, 221–226, 409

(56) References Cited

U.S. PATENT DOCUMENTS

| | | | | |
|---|---|---|---|---|
| 4,137,566 A | * | 1/1979 | Haas et al. | |
| 5,111,410 A | * | 5/1992 | Nakayama et al. | |
| 5,184,295 A | * | 2/1993 | Mann | |
| 5,233,544 A | * | 8/1993 | Kobayashi | |
| 5,249,967 A | * | 10/1993 | O'Leary et al. | |
| 5,333,061 A | * | 7/1994 | Nakashima et al. | |
| 5,342,054 A | * | 8/1994 | Chang et al. | |
| 5,414,256 A | * | 5/1995 | Gurner et al. | |
| 5,419,562 A | * | 5/1995 | Cromarty | |
| 5,442,168 A | * | 8/1995 | Gurner et al. | |
| 5,486,001 A | * | 1/1996 | Baker | |
| 5,513,129 A | * | 4/1996 | Bolas et al. | |
| 5,616,078 A | * | 4/1997 | Oh | |
| 5,681,223 A | * | 10/1997 | Weinreich | |
| 5,772,522 A | * | 6/1998 | Nesbit et al. | |
| 5,826,578 A | * | 10/1998 | Curchod | |
| 5,833,549 A | * | 11/1998 | Zur et al. | |
| 5,857,855 A | * | 1/1999 | Katayama | |
| 5,907,819 A | * | 5/1999 | Johnson | |
| 5,913,727 A | * | 6/1999 | Ahdoot | |
| 6,001,013 A | * | 12/1999 | Ota | |
| 6,001,017 A | * | 12/1999 | Okano et al. | |
| 6,068,559 A | * | 5/2000 | Lubell et al. | |
| 6,126,449 A | * | 10/2000 | Burns | |
| 6,190,287 B1 | * | 2/2001 | Nashner | |
| 6,227,968 B1 | * | 5/2001 | Suzuki et al. | |
| 6,227,974 B1 | * | 5/2001 | Eilat et al. | |
| 6,283,858 B1 | * | 9/2001 | Hayes, Jr. et al. | |
| 6,336,891 B1 | * | 1/2002 | Fedrigon et al. | |
| 6,342,665 B1 | * | 1/2002 | Okita et al. | |
| 6,347,998 B1 | * | 2/2002 | Yoshitomi et al. | |
| 6,379,244 B1 | * | 4/2002 | Sagawa et al. | |
| 6,410,835 B2 | * | 6/2002 | Suzuki et al. | |
| 6,450,888 B1 | * | 9/2002 | Takase et al. | |

* cited by examiner

*Primary Examiner*—Michael O'Neill
(74) *Attorney, Agent, or Firm*—Oliff & Berridge, PLC

(57) ABSTRACT

A game apparatus, a storage medium and a computer program, suitable to games that can be experienced by a player using an entire body to play a game. The game apparatus comprises: a storage section for storing a predetermined assigned movement for a player; an assigned movement display section for displaying the assigned movement, thereon; a movement detection section for detecting a movement of the player; a player movement display section for displaying the movement of the player detected by the movement detection section, thereon; a similarity decision section for comparing the assigned movement with the movement of the player detected by the movement detection section, to decide a similarity between the assigned movement and the movement of the player; and a game operation section for processing a score on the basis of the similarity decided by the similarity decision section.

40 Claims, 44 Drawing Sheets

1950  1952  1954

| | DIRECTION | MAGNITUDE | SPEED |
|---|---|---|---|
| PLAYER'S MOVEMENT | $\alpha 1$ | $\beta 1$ | $\gamma 1$ |

| | | DECISION REFERENCE DATA (DIRECTION α, MAGNITUDE β, SPEED γ) | | |
|---|---|---|---|---|
| | | t1 | t2 | t3 |
| DANCE 1 | PART a | (α11, β11, γ11) | (α12, β12, γ12) | (α13, β13, γ13) |
| | PART b | (α21, β21, γ21) | (α22, β22, γ22) | (α23, β23, γ23) |
| | ... | ... | ... | ... |
| DANCE 2 | PART a | (α11', β11', γ11') | (α12', β12', γ12') | (α13', β13', γ13') |
| | PART b | (α21', β21', γ21') | (α22', β22', γ22') | (α23', β23', γ23') |
| | ... | ... | ... | ... |

| DANCE 1 | | POSITION DATA (COORDINATES:X,Y,Z) | | | |
|---|---|---|---|---|---|
| | | FRAME 1 | FRAME 2 | FRAME 3 | ... |
| A | PART a | (Xa1,Ya1,Za1) | (Xa2,Ya2,Za2) | (Xa3,Ya3,Za3) | ... |
| | PART b | (Xb1,Yb1,Zb1) | (Xb2,Yb2,Zb2) | (Xb3,Yb3,Zb3) | ... |
| | PART c | (Xc1,Yc1,Zc1) | (Xc2,Yc2,Zc2) | (Xc3,Yc3,Zc3) | ... |
| | ... | ... | ... | ... | ... |
| B | PART a | (Xa1',Ya1',Za1') | (Xa2',Ya2',Za2') | (Xa3',Ya3',Za3') | ... |
| | PART b | (Xb1',Yb1',Zb1') | (Xb2',Yb2',Zb2') | (Xb3',Yb3',Zb3') | ... |
| | PART c | (Xc1',Yc1',Zc1') | (Xc2',Yc2',Zc2') | (Xc3',Yc3',Zc3') | ... |
| | ... | ... | ... | ... | ... |

| | | FRAME 1 | FRAME 2 | FRAME 3 | ... |
|---|---|---|---|---|---|
| | | POSITION DATA (COORDINATES: X,Y,Z) | | | |
| DANCE 1 | PART a | (Xa1,Ya1,Za1) | (Xa2,Ya2,Za2) | (Xa3,Ya3,Za3) | ... |
| | PART b | (Xb1,Yb1,Zb1) | (Xb2,Yb2,Zb2) | (Xb3,Yb3,Zb3) | ... |
| | PART c | (Xc1,Yc1,Zc1) | (Xc2,Yc2,Zc2) | (Xc3,Yc3,Zc3) | ... |
| | ... | ... | ... | ... | ... |
| DANCE 2 | PART a | (Xa1',Ya1',Za1') | (Xa2',Ya2',Za2') | (Xa3',Ya3',Za3') | ... |
| | PART b | (Xb1',Yb1',Zb1') | (Xb2',Yb2',Zb2') | (Xb3',Yb3',Zb3') | ... |
| | PART c | (Xc1',Yc1',Zc1') | (Xc2',Yc2',Zc2') | (Xc3',Yc3',Zc3') | ... |
| | ... | ... | ... | ... | ... |

| | | DECISION REFERENCE DATA (DIRECTION $\alpha$, MAGNITUDE $\beta$, SPEED $\gamma$) | | | |
|---|---|---|---|---|---|
| | | t1 | t2 | t3 | |
| DANCE 1 | 1ST REGION | ($\alpha 11, \beta 11, \gamma 11$) | ($\alpha 12, \beta 12, \gamma 12$) | ($\alpha 13, \beta 13, \gamma 13$) | ⋮ |
| | 2ND REGION | ($\alpha 21, \beta 21, \gamma 21$) | ($\alpha 22, \beta 22, \gamma 22$) | ($\alpha 23, \beta 23, \gamma 23$) | ⋮ |
| | 3RD REGION | ($\alpha 31, \beta 31, \gamma 31$) | ($\alpha 32, \beta 32, \gamma 32$) | ($\alpha 33, \beta 33, \gamma 33$) | ⋮ |
| | 4TH REGION | ($\alpha 41, \beta 41, \gamma 41$) | ($\alpha 42, \beta 42, \gamma 42$) | ($\alpha 43, \beta 43, \gamma 43$) | ⋮ |
| DANCE 2 | 1ST REGION | ($\alpha 11', \beta 11', \gamma 11'$) | ($\alpha 12', \beta 12', \gamma 12'$) | ($\alpha 13', \beta 13', \gamma 13'$) | ⋮ |
| | 2ND REGION | ($\alpha 21', \beta 21', \gamma 21'$) | ($\alpha 22', \beta 22', \gamma 22'$) | ($\alpha 23', \beta 23', \gamma 23'$) | ⋮ |
| | 3RD REGION | ($\alpha 31', \beta 31', \gamma 31'$) | ($\alpha 32', \beta 32', \gamma 32'$) | ($\alpha 33', \beta 33', \gamma 33'$) | ⋮ |
| | 4TH REGION | ($\alpha 41', \beta 41', \gamma 41'$) | ($\alpha 42', \beta 42', \gamma 42'$) | ($\alpha 43', \beta 43', \gamma 43'$) | ⋮ |

1ST REGION    2ND REGION

3RD REGION    4TH REGION

*FIG.29*

|            | DIRECTION | MAGNITUDE | SPEED |
|------------|-----------|-----------|-------|
| 1ST REGION | $\alpha 1$ | $\beta 1$ | $\gamma 1$ |
| 2ND REGION | $\alpha 2$ | $\beta 2$ | $\gamma 2$ |
| 3RD REGION | $\alpha 3$ | $\beta 3$ | $\gamma 3$ |
| 4TH REGION | $\alpha 4$ | $\beta 4$ | $\gamma 4$ |

2ND REGION

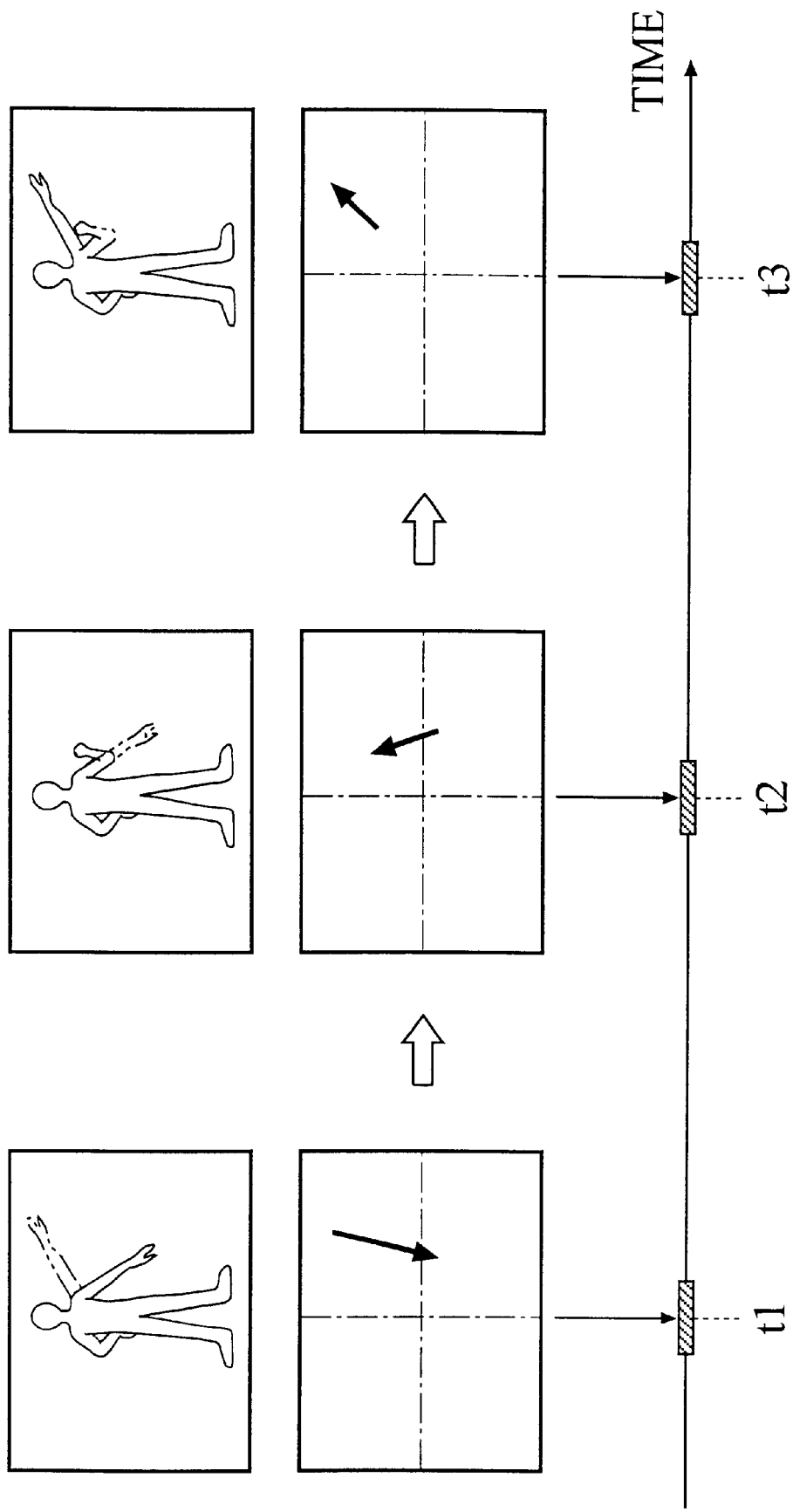

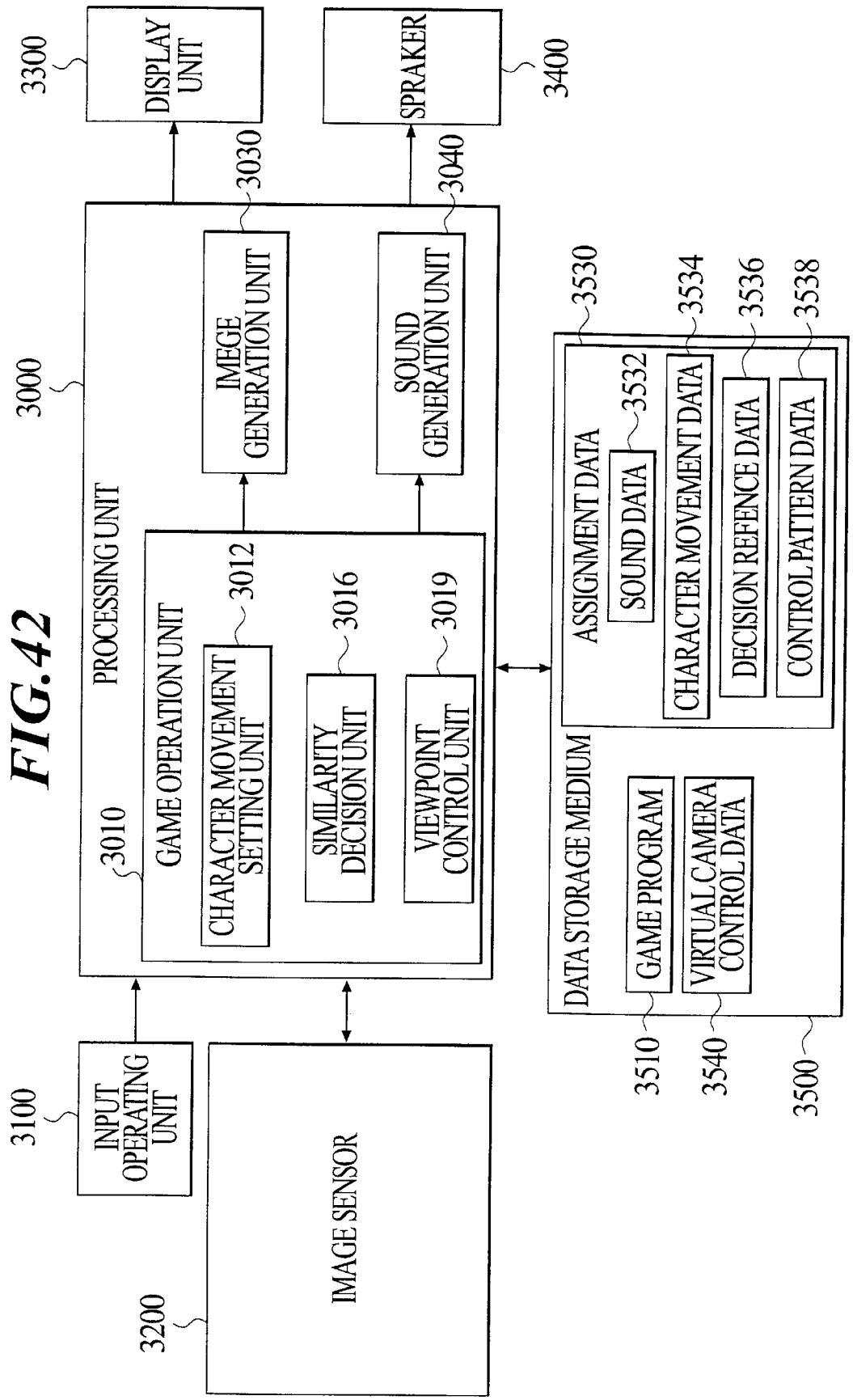

| MODE | | LEVEL | BEFORE DANCE | | DURING DANCE | |
|---|---|---|---|---|---|---|
| | | | CHARACTER CONTROL PATTERN | CAMERA CONTROL PATTERN | CHARACTER CONTROL PATTERN | CAMERA CONTROL PATTERN |
| NORMAL | | BIGINNER | A | 1 | A | 1 |
| | | INTERMEDIATE | A | 1 | A | 2 |
| | | EXPERT | A | 1 | B | 1 |
| REAL-TIME | | — | N/A | N/A | A | 1 |
| FREE | | — | N/A | N/A | B | 2 |

| DANCE 1 | | FRAME 1 | FRAME 2 | FRAME 3 | ... |
|---|---|---|---|---|---|
| A | PART a | (Xa11,Ya11,Za11) | (Xa12,Ya12,Za12) | (Xa13,Ya13,Za13) | ... |
| | PART b | (Xb11,Yb11,Zb11) | (Xb12,Yb12,Zb12) | (Xb13,Yb13,Zb13) | ... |
| | PART c | (Xc11,Yc11,Zc11) | (Xc12,Yc12,Zc12) | (Xc13,Yc13,Zc13) | ... |
| | ... | ... | ... | ... | ... |
| B | PART a | (Xa21,Ya21,Za21) | (Xa22,Ya22,Za22) | (Xa23,Ya23,Za23) | ... |
| | PART b | (Xb21,Yb21,Zb21) | (Xb22,Yb22,Zb22) | (Xb23,Yb23,Zb23) | ... |
| | PART c | (Xc21,Yc21,Zc21) | (Xc22,Yc22,Zc22) | (Xc23,Yc23,Zc23) | ... |
| | ... | ... | ... | ... | ... |

POSITION DATA (COORDINATES:X,Y,Z)

FIG.50

DECISION REFERENCE DATA
(DIRECTION $\alpha$, MAGNITUDE $\beta$, SPEED $\gamma$)

3536

| | t1 | t2 | t3 | ... |
|---|---|---|---|---|
| DANCE 1 | ($\alpha 11, \beta 11, \gamma 11$) | ($\alpha 12, \beta 12, \gamma 12$) | ($\alpha 13, \beta 13, \gamma 13$) | ... |
| DANCE 2 | ($\alpha 11', \beta 11', \gamma 11'$) | ($\alpha 12', \beta 12', \gamma 12'$) | ($\alpha 13', \beta 13', \gamma 13'$) | ... |

GAME APPARATUS, STORAGE MEDIUM AND COMPUTER PROGRAM THAT ADJUST TEMPO OF SOUND

BACKGROUND OF THE INVENTION

1. Field of the Invention

The present invention relates to a game apparatus that detects a movement of a player and then operates a game according to the movement detected, and so on.

2. Description of Related Art

Various types of a game apparatus today typically has an input device used by a player to enter various control commands, and the input device has an operating unit manipulated by the player to play the game. The operating unit of the input device of the game apparatus is typically a joy-hand, a joystick or similar device. When the player manipulates the operating unit while playing a game, the input device sends a signal indicative of the player's action to the game system. The game apparatus then performs a particular game process, such as moving or otherwise operating the object in the game image affected by the player's action. A drawback to game apparatuses having such a conventional input device is that while the player uses the player's hands and feet to manipulate the operating unit and play the game, it is difficult for the player to enjoy the experience of using the entire body to play the game.

Video game apparatuses having a CCD camera or other imaging device are known from the literature as one attempt to solve this problem. This type of video game apparatus uses the imaging device to image the player. A feature extraction process then removes the background from the captured image to extract an image of just the player. The shape (body shape) and actions of the player are then recognized using the result of this feature extraction process.

Unexamined Published Japanese Patent Application No.hei-7-155467, for example, teaches a video game apparatus of this type. The video game apparatus described in Unexamined Published Japanese Patent Application No.hei7-155467 uses a CCD camera to capture an image of the player in front of a screen. The captured image is then converted to a digital image signal to which a feature extraction process is applied to remove the background and extract only the player. More specifically, color differences between the screen color and the color of the player in the captured image are used to extract an image of just the player. This operation focuses on the screen color (which is blue), and uses a blue extraction circuit to remove the screen (that is, the background image).

This video game apparatus displays an instruction pattern having white or red areas near the four corners of the screen. The player holds a white or red flag in each hand and appropriately raises and lowers the flags according to the pattern displayed on the screen. The game apparatus detects whether the color of the flag raised or lowered by the player matches the color displayed on the screen.

The video game apparatus according to an earlier development as described above, has the following technical problem. Since the player is photographed by the CCD camera, more specifically, the characteristic extracting process or the like for detecting the movement of the player takes such a long operation time as to make it difficult to establish the processing rate desired for the execution of the game. Therefore, the recognition (the pattern recognition) of the flag raised and lowered by the player in the video game apparatus as disclosed in Unexamined Published Japanese Patent Application No.hei-7-155467, is decided depending on whether or not the color data of the flag exceed a predetermined amount (or area) at a predetermined region. Accordingly, a match or mismatch is thus determined using the flag color, so that the video game apparatus does not detect the action itself of the player.

As one game apparatus for the player to enjoy the game physically with the whole body, there is known a game apparatus for a dance game. This game apparatus comprises an input unit having a plurality of switches to be turned ON/OFF by the weight or the like of the player, and the player plays the game on that input unit. Specifically, the game apparatus for playing this dance game is constructed such that the game can be progressed while calculating the score by detecting whether or not the player depresses (or rides on) the switches at a given timing. Therefore, the game apparatus does not detect and decide the dance itself of the player, but the dance game is realized and held by detecting the input timing to the input unit.

However, a problem with the above video game apparatus taught in Unexamined Published Japanese Patent Application No.hei-7-155467 is that an extremely complex image process is required to capture an image of player's movement and identify player's movement within the image. In addition, player's movement is detected by a pattern recognition process based on the color of flags held in the player's hands. It is therefore not possible to play the game if the player is not holding flags of the correct colors, and players cannot be said to enjoy experiencing playing the game with the entire body. The result, therefore, is that the game is played with only hand's movements detected using flags, which function as the above-noted operating unit.

Furthermore, the game is played by the player simply raising and lowering red or white flags held in the hands to match a particular pattern having red or white areas displayed in the four corners of the screen. The game is thus extremely simple.

Further, as described above, either the video game apparatus, as disclosed in Unexamined Published Japanese Patent Application No.hei-7-155467, or the game apparatus for the dance game according to an earlier development progresses the game by the simple movement of raising the flag in the given region or by the simple input of depressing the given switch. Therefore, the game contents are monotonous, and the inputting action is specified to a predetermined movement to depress the switch so that the game apparatus is troubled by the following problem. It is entrusted on the player whether or not the player plays the game by using the entire body. In other words, the game apparatus only decides whether or not the switch is depressed. Therefore, the movement on the player side has no relation to the progress or score of the game so that it results in the so-called "waste".

Furthermore, according to the video game apparatus as disclosed in Unexamined Published Japanese Patent Application No.hei-7-155467, since the player would be indicated with an answer upon the display of the instruction patterns on the four corners of the screen, the apparatus is incapable of giving clues to allow the player to guess a correct movement or providing incorrect clues to confuse the player. Accordingly, the only factor reflected to the game result is the quickness of the player's movement, rendering the game quite simple, so that the player may quickly loose his interest in playing the game.

SUMMARY OF THE INVENTION

The present invention was developed in view of the above-described problems.

An object of the present invention is to provide a game apparatus and so on, suitable to games that can be experienced by a player using an entire body to play a game.

Another object of the present invention is to provide a game apparatus and so on, which can progress a game and process a score according to a movement using an entire body without restricting an inputting action.

A further object of the present invention is to provide a game apparatus and so on, which can realize a body sensing game requiring a player to use an entire body and vary contents of the game by outputting hints.

In accordance with the first aspect of the present invention, a game apparatus (for example, a game apparatus 1700 shown in FIG. 1) comprises: a storage section (for example, a data storage medium 1500 shown in FIG. 8) for storing a predetermined assigned movement for a player; an assigned movement display section (for example, a game operation unit 1010, a game image generation unit 1032, and a data storage medium 1500 shown in FIG.) for displaying the assigned movement, thereon; a movement detection section (for example, a movement detection unit 1200 shown in FIG. 8) for detecting a movement of the player; a player movement display section (for example, a game operation unit 1010, a player image generation unit 1034, and a data storage medium 1500 shown in FIG. 8) for displaying the movement of the player detected by the movement detection section, thereon; a similarity decision section (for example, a similarity decision unit 1016, and an assignment data 1530 shown in FIG. 8) for comparing the assigned movement with the movement of the player detected by the movement detection section, to decide a similarity between the assigned movement and the movement of the player; and a game operation section (for example, a game operation unit 1010, and a data storage medium 1500 shown in FIG. 8) for processing a score on the basis of the similarity decided by the similarity decision section.

In accordance with the second aspect of the present invention, according to a storage medium having a computer-executable program recorded thereon, the computer comprising a movement detection section for detecting a movement of a player, the program comprises: a program code of executing a predetermined game (for example, a game program 1510 shown in FIG. 8); a program code of storing a predetermined assigned movement (for example, an assignment data 1530 shown in FIG. 8); a program code of displaying the assigned movement (for example, a game program 1510 shown in FIG. 8); a program code of inputting an input data based on a movement of the player detected by the movement detection section (for example, a movement input program 1040 shown in FIG. 8); a program code of displaying the movement of the player on the basis of the input data inputted (for example, a game program 1510 shown in FIG. 8); a program code of comparing the assigned movement with the input data, to decide a similarity between the assigned movement and the input data (for example, a game program 1510 and a decision reference data 1536 shown in FIG. 8); and a program code of processing a score on the basis of similarity decided (for example, a game program 1510 shown in FIG. 8).

In accordance with the third aspect of the present invention, a computer program comprises program code means for performing the steps of: storing a predetermined assigned movement for a player; displaying the assigned movement; detecting a movement of the player; displaying the movement of the player detected; comparing the assigned movement with the movement of the player detected, to decide a similarity between the assigned movement and the movement of the player; and processing a score on the basis of the similarity decided.

According to the game apparatus, the storage medium and the computer program in accordance with the first, second and third aspects of the present invention, the player performs the assigned movement displayed so as to match the assigned movement, and thereby the game is advanced. Thereafter, the movement of the player is detected and compared with the assigned movement, to decide the similarity. Based on the result of deciding the similarity, the score is processed, and the game progresses according to the score. For example, the player can enjoy comparing the player's movement with the assigned movement by displaying the result of the processing the score. Accordingly, because the player moves so as to match the assigned dance, the player can enjoy the experience of playing the game using the entire body.

Further, the player can play the game while checking the player's own movement detected and displayed. Accordingly, the player can enjoy watching the player's own movement.

Furthermore, the game apparatus in accordance with the first aspect of the present invention can detect the player's movement without requiring a complicated image processing operation because the movement detection section detects the player's movement. That is, the game apparatus is constructed so as to be different from a conventional flag-raising type video game apparatus that detects the player's movement based on the flags held in the player's hands, and directly detects the movement of the player's entire body. Accordingly, the player can enjoy the experience of playing the game with the entire body.

It should be noted that the "score" as used herein refers not necessarily to a strict numerical point system, but to an objective decision corresponding to the detected degree of similarity between the player's movement and the assigned movement.

In accordance with the fourth aspect of the present invention, a game apparatus (for example, a game apparatus 1700 shown in FIG. 1) comprises: a storage section (for example, a data storage medium 1500 shown in FIG. 8) for storing a predetermined assigned movement for a player; an assigned movement display section (for example, a game operation unit 1010, a game image generation unit 1032, and a data storage medium 1500 shown in FIG. 8) for displaying the assigned movement, thereon; a sound generation section (for example, a game operation unit 1010, a sound generation unit 1040, and a data storage medium 1500 shown in FIG. 8) for generating at least one of a sound, a music and a sound effect; a movement detection section (for example, a movement detection unit 1200 shown in FIG. 8) for detecting a movement of the player; a similarity decision section (for example, a similarity decision unit 1016, and a data storage medium 1500 shown in FIG. 8) for comparing the assigned movement with the movement of the player detected by the movement detection section, to decide a similarity between the assigned movement and the movement of the player; and a game operation section (for example, a game operation unit 1010, and a data storage medium 1500 shown in FIG. 8) for processing a score on the basis of the similarity decided by the similarity decision section.

In accordance with the fifth aspect of the present invention, according to a storage medium having a computer-executable program recorded thereon, the computer comprising a movement detection section for detecting a movement of a player, the program comprises: a program code of executing a predetermined game (for example, a game program 1510 shown in FIG. 8); a program code of storing a predetermined assigned movement (for example, an assignment data 1530 shown in FIG. 8); a program code of displaying the assigned movement (for example, a game program 1510 shown in FIG. 8); a program code of inputting an input data based on a movement of the player detected by the movement detection section (for example, a movement input program 1540 shown in FIG. 8); a program code of generating at least one of a sound, a music and a sound effect (for example, a game program 1510, and a sound data 1532 shown in FIG. 8); a program code of comparing the assigned movement with the input data, to decide a similarity between the assigned movement and the input data (for example, a game program 1510, and a decision reference data 1536 shown in FIG. 8); and a program code of processing a score on the basis of similarity decided (for example, a game program 1510 shown in FIG. 8).

In accordance with the sixth aspect of the present invention, a computer program comprises program code means for performing the steps of: storing a predetermined assigned movement for a player; displaying the assigned movement; generating at least one of a sound, a music and a sound effect; detecting a movement of the player; comparing the assigned movement with the movement of the player detected, to decide a similarity between the assigned movement and the movement of the player; and processing a score on the basis of the similarity decided.

According to the game apparatus, the storage medium and the computer program in accordance with the fourth, fifth and sixth aspects of the present invention, the player performs the assigned movement displayed so as to match the assigned movement, and thereby the game is advanced. Thereafter, the movement of the player is detected and compared with the assigned movement, to decide the similarity. Based on the result of deciding the similarity, the score is processed, and the game progresses according to the score. For example, the player can enjoy comparing the player's movement with the assigned movement by displaying the result of the processing the score. Accordingly, because the player moves so as to match the assigned dance, the player can enjoy the experience of playing the game using the entire body.

Further, the player can enjoy the game while listening to at least one of the sound, the music and the sound effect generated. And further, the player can move to the rhythm or the tempo of the sound or the music, so that the player can rhythmically move. Furthermore, the player moves rhythmically to the sound, the music or the sound effect, thereby other people can enjoy watching the player's movement and also be motivated to play the game themselves.

Furthermore, the game apparatus in accordance with the fourth aspect of the present invention can detect the player's movement without requiring a complicated image processing operation because the movement detection section detects the player's movement. That is, the game apparatus is constructed so as to be different from a conventional flag-raising type video game apparatus that detects the player's movement based on the flags held in the player's hands, and directly detects the movement of the player's entire body. Accordingly, the player can enjoy the experience of playing the game with the entire body.

It should be noted that the "sound" as used herein refers is not limited to the peoples' voices, but could be bird songs or other animal noises.

In accordance with the seventh aspect of the present invention, a game apparatus (for example, a game apparatus 1700 shown in FIG. 8) comprises: a storage section (for example, a data storage medium 1500 shown in FIG. 8) for storing a predetermined assigned movement for a player; an assigned movement display section (for example, a game operation unit 1010, a game image generation unit 1032, and a data storage medium 1500 shown in FIG. 8) for displaying the assigned movement, thereon; a sound generation section (for example, a game operation unit 1010, a sound generation unit 1040, and a data storage medium 1500 shown in FIG. 8) for generating at least one of a sound, a music and a sound effect; a movement detection section (for example, a movement detection unit 1200 shown in FIG. 8) for detecting a movement of the player; a player movement display section (for example, a game operation unit 1010, a player image generation unit 1034, and a data storage medium 1500 shown in FIG. 8) for displaying the movement of the player detected by the movement detection section, thereon; a similarity decision section (for example, a similarity decision unit 1016, and a data storage medium 1500 shown in FIG. 8) for comparing the assigned movement with the movement of the player detected by the movement detection section, to decide a similarity between the assigned dance movement and the movement of the player; and a game operation section (for example, a game operation unit 1010, and a data storage medium 1500 shown in FIG. 8) for processing a score on the basis of the similarity decided by the similarity decision section.

In accordance with the eighth aspect of the present invention, according to a storage medium having a computer-executable program recorded thereon, the computer comprising a movement detection section for detecting a movement of a player, the program comprises: a program code of executing a predetermined game (for example, a game program 1510 shown in FIG. 8); a program code of storing a predetermined assigned movement (for example, an assignment data 1530 shown in FIG. 8); a program code of displaying the assigned movement (for example, a game program 1510 shown in FIG. 8); a program code of inputting an input data based on a movement of the player detected by the movement detection section (for example, a movement input program 1540 shown in FIG. 8); a program code of generating at least one of a sound, a music and a sound effect (for example, a game program 1510, and a sound data 1532 shown in FIG. 8); a program code of displaying the movement of the player on the basis of the input data inputted (for example, a game program 1510 shown in FIG. 8); a program code of comparing the assigned movement with the input data, to decide a similarity between the assigned movement and the input data (for example, a game program 1510, and a decision reference data 1536 shown in FIG. 8); and a program code of processing a score on the basis of similarity decided (for example, a game program shown in FIG. 8).

In accordance with the ninth aspect of the present invention, a computer program comprises program code means for performing the steps of: storing a predetermined assigned movement for a player; displaying the assigned movement; generating at least one of a sound, a music and a sound effect; detecting a movement of the player; displaying the movement of the player detected; comparing the assigned movement with the movement of the player detected, to decide a similarity between the assigned movement and the movement of the player; and processing a score on the basis of the similarity decided.

According to the game apparatus, the storage medium and the computer program in accordance with the seventh, eighth and ninth aspects of the present invention, the player performs the assigned movement displayed so as to match the assigned movement, and thereby the game is advanced. Thereafter, the movement of the player is detected and compared with the assigned movement, to decide the similarity. Based on the result of deciding the similarity, the score is processed, and the game progresses according to the score. For example, the player can enjoy comparing the player's movement with the assigned movement by displaying the result of the processing the score. Accordingly, because the player moves so as to match the assigned dance, the player can enjoy the experience of playing the game using the entire body.

Further, the player can enjoy the game while listening to at least one of the sound, the music and the sound effect generated. And further, the player can move to the rhythm or the tempo of the sound or the music, so that the player can rhythmically move. Furthermore, the player moves rhythmically to the sound, the music or the sound effect, thereby other people can enjoy watching the player's movement and also be motivated to play the game themselves.

And Further, the player can play the game while checking the player's own movement detected and displayed. Accordingly, the player can enjoy watching the player's own movement. Further, the player can check whether the rhythm or the tempo of the player's movement match the rhythm or the tempo of the sound or the music generated.

Furthermore, the game apparatus in accordance with the seventh aspect of the present invention, can detect the player's movement without requiring a complicated image processing operation because the movement detection section detects the player's movement. That is, the game apparatus is constructed so as to be different from a conventional flag-raising type video game apparatus that detects the player's movement based on the flags held in the player's hands, and directly detects the movement of the player's entire body. Accordingly, the player can enjoy the experience of playing the game with the entire body.

Preferably, a game apparatus in accordance with the first aspect of the present invention, further comprises an image display device (for example, a display unit 1300 shown in FIG. 8, and a display 1730 shown in FIG. 1), wherein the movement detection section detects a movement of the player, to output an input data based on the movement detected to the player movement display section; and the player movement display section displays the movement of the player on the image display device, on the basis of the input data outputted from the movement detection section.

According to the game system as described above, the movement of the player detected by the movement detection section is inputted as an input data. That is, the movement of the player detected by the movement detection section is outputted not as an image (a moving image) but as an input data to the player movement display section. Thereby, the player movement display section displays the movement of the player on the image display section based on the input data. Accordingly, because the movement of the player is outputted to the player movement display means as an input data, a process related to displaying the movement of the player can be eliminated. It should be noted that the "input data" as used here is a vector data for the movement of each part (for example, arms and legs, a torso, a head and so on) of the player.

Preferably, according to a game apparatus in accordance with the first aspect of the present invention, the player movement display section displays a character that moves according to the movement of the player detected by the movement detection section, thereon.

As described above, because the movement of the player is displayed by using the character, the player can conform the player's own movement with interest.

Preferably, according to a game apparatus in accordance with the fourth aspect of the present invention, the assigned movement matches at least one of the sound, the music and the sound effect, generated by the sound generation section.

As described above, because the assigned movement is matched to the sound, the music or the sound effect generated, the player can recognize the tempo or the rhythm of the assigned movement from the sound and move more easily. Accordingly, even beginner players can enjoy playing the game. Further, the player can simulate the assigned movement according to the tempo of the sound, the music or the sound effect rhythmically.

Preferably, according to a game apparatus in accordance with the fourth aspect of the present invention, the assigned movement matches a tempo of at least one of the sound, the music and the sound effect, generated by the sound generation section.

As described above, because the assigned movement matches the tempo of the sound, the music or the sound effect, the player can perform the assigned movement according to the tempo of the sound, the music or the sound effect. Accordingly, even beginner players can thus enjoy playing the game.

Preferably, a game apparatus in accordance with the first and fourth aspects of the present invention, further comprises a tempo display section (for example, a game operation unit 1010, and a game image generation unit 1032 shown in FIG. 8) for displaying a tempo of the assigned movement, thereon.

As described above, because the tempo of the assigned movement is displayed on the tempo display section, the player can move according to the tempo of the assigned movement. Accordingly, even beginner players can enjoy playing the game.

Preferably, a game apparatus in accordance with the first and fourth aspects of the present invention, further comprises: a game level setting section (for example, a game level setting unit 1022 shown in FIG. 8) for setting a game level of difficulty, wherein at least one of a tempo of the assigned movement, a type of the assigned movement and the similarity decided by the similarity decision section is changed on the basis of the game level of difficulty set by the level setting section.

According to the game apparatus as described above, because at least one of the tempo of the assigned movement, the type of the assigned movement and the similarity decided by the similarity decision section is changed according to the game level of difficulty set by the game level setting section, the wider range of players can play the game. For example, if a player thinks to be poor at exercise, the player can set a lower game level of difficulty, and if the player feels to be good at exercise, the player can set a higher game level of difficulty.

Further, preferably, in the case wherein the faster the tempo of the assigned movement is, the more difficult to perform the assigned movement is, when the game level of difficulty is raised the tempo of the assigned movement is made higher, and when the game level of difficulty is lowered the tempo of the assigned movement is made slower. On the other hand, in the case wherein the slower the tempo of the assigned movement is, the more difficult to perform the assigned movement is, when the game level of difficulty is raised the tempo of the assigned movement is made slower, and when the game level of difficulty is lowered the tempo of the assigned movement is made higher.

And further, if the game level of difficulty is high, it is preferable to change the type of the assigned movement that is relatively difficult to perform. Conversely, if the game level of difficulty is low, it is preferable to change the type of the assigned movement that is relatively easy to perform.

Furthermore, if the game level of difficulty is high, it is preferable to change the result of deciding the similarity by the similarity decision section so that the result is more demanding. Conversely, if the game level of difficulty is low, it is preferable to change the result of deciding the similarity by the similarity evaluation means so that the result is less demanding.

Preferably, according to a game apparatus in accordance with the first and fourth aspects of the present invention, at least one of a tempo of the assigned movement, a type of the assigned movement and the similarity decided by the similarity decision section is changed on the basis of the similarity decided by the similarity decision section.

As described above, because the tempo of the assigned movement, the type of the assigned movement and the similarity decided by the similarity decision section can be changed based on the similarity, even experienced players that have become accustomed to the game can continue enjoy playing the game. That is, because the tempo of the assigned movement is not simple and the type of the movement is monotonous, players can continue to play the game seriously.

Furthermore, because the similarity decided is changed, the score processed by the game operation section differs even for different players performing the same movement, so that the game will not become monotonous. Accordingly, players can continue to play the game seriously.

Preferably, according to a game apparatus in accordance with the first and fourth aspects of the present invention, the similarity decision section compares the assigned movement with the movement of the player detected by the movement detection section, at a predetermined time of the assigned movement, to decide the similarity between the assigned movement and the movement of the player; and the game apparatus further comprises a timing notice section (for example, a game operation unit 1010, an assigned dance setting unit 1014, a game image generation unit 1032, and a sound generation unit 1040 shown in FIG. 8) for indicating the predetermined time to the player by a visual effect and by a visual effect or an auditory effect, respectively.

As described above, because the predetermined time to decide the similarity is indicated by the timing notice section, the player can conform the time wherein the player's movement is decided. Therefore, the player can be stimulated to perform the particular movement at the predetermined time, so that the player can move rhythmically. Accordingly, the player can play the game with interesting.

Preferably, according to a game apparatus in accordance with the first and fourth aspects of the present invention, the similarity decision section compares the assigned movement with the movement of the player detected by the movement detection section, at a predetermined time of the assigned movement, to decide the similarity between the assigned movement and the movement of the player; and the game apparatus further comprises a decision display section (for example, a game operation unit 101, an assigned dance setting unit 1014, and a game image generation unit 1032 shown in FIG. 8) for displaying a decision according to the similarity decided at the predetermined time by the similarity decision section.

As described above, because the decision is displayed according to the similarity at the predetermined time, the player can conform the result of comparing the player's own movement with the assigned movement. Accordingly, the player can play the game so as to improve the decision, so that the player can enjoy the game.

Preferably, according to a game apparatus as described above, the decision display section is a gauge display section (for example, a game operation unit 1010, and a game image generation unit 1032 shown in FIG. 8) for displaying a gauge that fluctuates according to the decision of the similarity decided at the predetermined time by the similarity decision section.

As described above, the player can play the game while watching the gauge fluctuating according to the decision of the similarity at the predetermined time. That is, the player can play the game while comparing the player's own movement with the assigned movement. Accordingly, players can concentrate on the game while playing game with the desire to improve the similarity with the assigned movement.

Preferably, according to a game apparatus as described above in accordance with the fourth aspect of the present invention, the predetermined time is changed according to a tempo of at least one of the sound, the music and the sound effect, generated by the sound generation section.

As described above, because the predetermined time can be changed according to the tempo of the sound, the music or the sound effect, the rhythm of the assigned movement and the predetermined time wherein the similarity is decide can be matched to the similarity.

Preferably, according to a game apparatus in accordance with the first and fourth aspects of the present invention, the game operation section calculates the score on the basis of the similarity decided by the similarity decision section.

As described above, because the score is calculated on the basis of the similarity decided by the similarity decision section, the player can objectively decide the comparison between the player's movement and the assigned movement by the score.

Preferably, according to a game apparatus in accordance with the first and fourth aspects of the present invention, the game operation section calculates the score on the basis of the similarity decided by the similarity decision section, to calculate a cumulative total of the score calculated; and the game apparatus further comprises a score display section (for example, a game image generation unit 1010, and a game image generation unit 1032 shown in FIG. 8) for displaying the cumulative total of the score, thereon.

As described above, because the cumulative total of the score is displayed, the player can decide the similarity between the player's movement and the assigned movement. That is, the player can confirm the player's own score during the game. Accordingly, the player can play the game with the desire to become even better.

Preferably, according to a game apparatus in accordance with the first and fourth aspects of the present invention, the assigned movement display section displays the assigned movement before the similarity decision section decides the similarity.

As described above, because the assigned movement is displayed before the similarity decision section decides the similarity, that is, before the game operation section performs the score, the player can remember the assigned movement before beginning to perform the moment. In other words, after the player has first the opportunity to remember the assigned movement, the player copies the assigned movement and the similarity between the player's movement and the assigned movement, is then decided. Accordingly, the player can enjoy the game without the game becoming simply a game of reflexes.

Preferably, a game apparatus in accordance with the first and fourth aspects of the present invention, further comprises a movement start notice section (for example, a game operation unit 1010, a game image generation unit 1032, and a sound generation unit 1040 shown in FIG. 8) for indicating when the player starts moving to the player by a visual effect and by a visual effect or an auditory effect, respectively.

As described above, because the player is indicated when to start moving, the player can relatively easily begin playing game play.

It should be noted that the time for starting to play the game can be one, for example, when the similarity decision section starts deciding the similarity.

Preferably, accordance to a game apparatus in accordance with the first and fourth aspects of the present invention, the assigned movement is a dance.

As described above, because the assigned movement is a dance, the player can more easily perform rhythmically. Accordingly, players can enjoy playing the game.

Preferably, according to a game apparatus in accordance with the first and fourth aspects of the present invention, the movement detection section comprises an artificial retina chip.

As described above, the artificial retina chip can perform such as an image processing as an image detection, an edge detection, a pattern matching, a resolution varying process, a gaze and so on, by own chip without other image processing device. Accordingly, the game apparatus can simplified and require a lower manufacturing cost.

Preferably, according to a game apparatus in accordance with the first and fourth aspects of the present invention, the movement detection section detects the movement of the player from a light received through a visible spectrum cut-off filter (for example, a visible spectrum cut-off filter 1740 shown in FIG. 1).

As described above, because the player's movement is detected by receiving the light through the visible spectrum cut-off filter, the movement detection section receives a light from which a visible spectrum light has been removed. More specifically, there are situations in which the player's movement cannot be detected because of interference from random outside light and so on. However, it is possible to detect only the player's movement without a process for removing interference from random outside light and so on, by receiving the light passed through a visible spectrum cut-off filter.

Accordingly, the movement of the player can be detected without interfering the progress of the game, and thereby it is possible to detect the similarity on the basis of the detected movement.

It should be noted that the visible spectrum cut-off filter is preferably disposed directly before a photo-detection unit between the photo-detection unit and the player. Consequently, it is possible to reliably detect only the player's movement without being affected by interference from random outside light and so on.

Preferably, a game apparatus in accordance with the first and fourth aspects of the present invention, further comprises a wall member (for example, a back panel 1780 shown in FIG. 1) disposed upright in a line of the movement detection section and the player.

As described above, because the wall member is disposed upright in a line of the movement detection section and the player, the movement detection section does not detect the movements of objects or people behind the wall member. That is, the movement detection section can reliably detect only the player's movement. Accordingly, interference with the game play is prevented, and the player can relax and concentrate on the game.

Preferably, a game apparatus as described above, further comprises a projection suppression section for suppressing a projection of a shadow of the player on the wall member.

As described above, while an ambient artificial lighting and a natural light can project a shadow of the player onto the wall member, the projection suppression section prevents the player's shadow from projecting on the wall member, so that the movement detection section can reliably detect only the player's movements without detecting the shadow's movement. Accordingly, the player can relax and concentrate on the game without interfering with the game play.

Herein, according to the projection suppression section, it is possible to suppress the projection of the player's shadow to the wall member, for example, by coloring a surface of the wall member such a dark color as a gray, a black, a dark blue and so on. Further, it is possible to suppress the projection of the player's shadow by illuminating the player with a direct light from the side of the player, that is, from the direction orthogonal to the line joining the player and movement detection section, so as not to illuminate with a light to the wall member.

Further, this type of projection suppression section can prevent the shadows of not only the player but also other people near the game apparatus from projecting onto the wall member.

In accordance with the tenth aspect of the present invention, a game apparatus (for example, a game apparatus 2700 shown in FIG. 1) for executing a predetermined game, comprises: a storage section (for example, an assignment data 2530 shown in FIG. 24) for storing a predetermined assigned movement; a movement detection section (for example, an image sensor 2200 shown in FIG. 24) for detecting a movement of a player; and a similarity decision section (for example, a movement specifying unit 2017, and a similarity decision unit 2016 shown in FIG. 24) for deciding a similarity between the movement of the player detected by the movement detection section and the predetermined assigned movement stored in the storage section, on the basis of at least one of a direction, a magnitude and a speed of the movement of the player.

In accordance with the eleventh aspect of the present invention, according to a storage medium having a computer-executable program recorded thereon, the computer comprising a movement detection section (for example, an image sensor 2200 shown in FIG. 24) for detecting a movement of a player, the program comprises: a program code of executing a predetermined game (for example, a game program 2510 shown in FIG. 24); a program code of storing a predetermined assigned movement (for example, a decision reference data 2536 shown in FIG. 24); and a program code of deciding a similarity between the movement of the player detected by the movement detection section and the predetermined assigned movement, on the basis of at least one of a direction, a magnitude and a speed of the movement of the player (for example, a game program 2510 shown in FIG. 24, and steps S204 to S214 shown in FIG. 34A).

In accordance with the twelfth aspect of the present invention, a computer program comprises program code means for performing the steps of: executing a predetermined game; storing a predetermined assigned movement; detecting a movement of a player; and deciding a similarity between the movement of the player detected and the predetermined assigned movement, on the basis of at least one of a direction, a magnitude and a speed of the movement of the player.

According to the game apparatus, the storage medium and the computer program in accordance with the tenth, eleventh and twelfth aspects of the present invention, the movement of the player is detected, and the movement of the player detected and the predetermined assigned movement is compared and decided.

Consequently, because the player is freed from the necessity for depressing the switch during the game play in order to discriminate that the player has moved, the player can enjoy the physical game using the entire body without being restricted by the inputting action. Further, because the similarity is decided with the elements of the direction, the magnitude and the speed of the movement of the player, the subjective decision on whether or not the movement of the player is good can be objectively made. Herein, it is possible to enhance the effect of the present invention that the predetermined game is exemplified by the dance game.

Preferably, according to a game apparatus in accordance with the tenth aspect of the present invention, the similarity decision section decides the similarity between the movement of the player and the predetermined assigned movement corresponding to a predetermined time thereof, every the predetermined time of the assigned movement.

As described above, the similarity of the movement of the player is decided every the predetermined time. Therefore, it is unnecessary to decide the movement of the player at all times so that the processing can be lightened. Further, by accumulating the similarities every the predetermined time, i.e., the similarities decided by using the direction, the magnitude and the speed as the elements, the entire movement of the player can be objectively decided.

Preferably, a game apparatus in accordance with the tenth aspect of the present invention, further comprises: a timing notice section for indicating a predetermined time by a visual effect or an auditory effect; and a timing decision section for deciding whether the movement of the player detected by the movement detection section coincides with the predetermined time, or not.

As described above, for example, it is possible to reduce the score, if the movement is identical to the predetermined assigned movement but is not timed. Here, because it is severe against the player to strictly decide whether the movement is timed, it is arbitrary to provide a width of about 0.2 seconds for the allowable time. Further, the coincidence on how to be timed is calculated so that, for example, the value "1" is calculated for the just timed case, and the value "0.8" is calculated for a discrepancy of 0.05 seconds. This coincidence may be added as a coefficient to the decision result of the similarity. In this case, it is possible to relieve a wrong movement in which the right arm is erroneously raised when the left arm should be raised.

Preferably, a game apparatus as described above, further comprises: a movement specifying section (for example, a movement specifying unit 2017 shown in FIG. 24) for specifying the movement of the player to be decided on the similarity, wherein the movement of the player is specified from a plurality of movements of the player concurrently detected by the movement detection section when being decided to coincide with the predetermined time by the timing decision section; wherein the similarity decision section decides the similarity between the movement of the player specified by the movement specifying section and the predetermined assigned movement.

As described above, in the case wherein there has been a plurality of movements of the player actions, the movement to be decided on the similarity can be specified with reference to the decision reference on whether or not the movement is coincided with the predetermined time. Accordingly, in other words, the movement not coincided with the predetermined time can be eliminated from the object to be decided on the similarity.

Preferably, a game apparatus in accordance with the tenth aspect of the present invention, further comprises: a movement specifying section (for example, a movement specifying unit 2017 shown in FIG. 24) for specifying the movement of the player to be decided on the similarity, wherein the movement of the player is specified from a plurality of movements of the player concurrently detected by the movement detection section, on the basis of at least one of the direction, the magnitude and the speed of each of the movements of the player; wherein the similarity decision section decides the similarity between the movement of the player specified by the movement specifying section and the predetermined assigned movement.

As described above, even in the case wherein there are a plurality of movements of the player, the movement to be decided on the similarity can be specified to decide the similarity. Herein, the element to be used for specifying the movement may be changed according to the assigned movement such that it is referred to the magnitude when a large movement is demanded, and such that it is referred to the speed when a quick movement is demanded. On the other hand, by specifying the movement in a direction different from that of the assigned movement, it is arbitrary to lower the decision for the movement of the player.

Preferably, according to a game apparatus as described above, the movement specifying section specifies the movement of the player to be decided on the similarity, for each of a plurality of detection regions divided from a detection range of the movement detection section, and the similarity decision section decides the similarity between the movement of the player specified by the movement specifying section and the predetermined assigned movement corresponding to the detection region, every the detection region.

Preferably, according to a game apparatus as described above, the similarity decision section decides the similarity, by considering the movement of the player extended over a plurality of detection regions, every the detection regions extended.

As described above, for example, in the case wherein the decision reference of the similarity is the magnitude of the movement, even if the movement of the player is extended over the detection regions, the movement can be decided considering the magnitudes of the individual movement in the detection regions. Accordingly, it is possible to prevent the large movement from being erroneously decided.

Preferably, according to a game apparatus in accordance with the tenth aspect of the present invention, the similarity decision section decides the similarity between the movement of the player and the predetermined assigned movement corresponding to each of a plurality of detection regions (for example, the $1^{st}$ to $4^{th}$ regions shown in FIG. 28) divided from a detection range of the movement detection section, every the detection region.

Preferably, according to a storage medium having a computer-executable program recorded thereon, in accordance with the eleventh aspect of the present invention, the program further comprises: a program code of deciding a similarity between the movement of the player and the predetermined assigned movement corresponding to each of a plurality of detection regions divided from a detection range of the movement detection section, every the detection region.

Preferably, a computer program in accordance with the twelfth aspect of the present invention, further comprises program code means for performing the step of: deciding a similarity between the movement of the player and the predetermined assigned movement corresponding to each of a plurality of detection regions divided from a detection range detected, every the detection region.

According to the game apparatus, the storage medium the computer program, as described above, the similarity between the movement of the player and the assigned movement can be decided on how the similarity of the entire detection regions is, every the detection region. Consequently, it is unnecessary that each movement of the player is decided, so that the process of deciding the similarity can be lightened. Further, the efficiency of the processing can be improved by specifying the detection regions to be decided.

Preferably, a game apparatus as described above, further comprises a by-region decision display section for displaying a decision according to the similarity decided every the detection region by the similarity decision section.

As described above, the player can recognize which of detection regions the movement has been good or bad in, to know a more specific decision result.

Preferably, according to a game apparatus as described above, the detection region is changed according to a predetermined condition detected by the movement detection section.

Preferably, according to a game apparatus in accordance with the tenth aspect of the present invention, the similarity decision section changes the similarity decided according to a predetermined condition detected by the movement detection section.

Preferably, according to a game apparatus as described above, the predetermined condition relates to a body shape of the player detected by the movement detection section.

As described above, the similarity decided and the detection region can be automatically changed without any operation input of the player, according to such a predetermined condition detected by the movement detection section, as the body shape (for example, the height or the length of the limbs) of the player or the position of the player. Accordingly, it is possible to correct the differences and so on in the decision result of the similarity due to the body shape of the player. Herein, the change in the detection region contains the change in the number of the detection regions, in the magnitude of the detection regions and in the positions of the detection regions.

Preferably, according to a game apparatus in accordance with the tenth aspect of the present invention, the movement detection section comprises an artificial retina chip for detecting the movement of the player.

As described above, the movement detection section detects the movement of the player with the artificial retina chip. As a result, the processing such as the characteristic extraction and so on of the detection can be facilitated and distributed into the entire apparatus, so that the processing can be speeded up as the entire apparatus.

In accordance with the thirteenth aspect of the present invention, a game apparatus (for example, a game apparatus 3700 shown in FIG. 1) comprises; a movement detection section (for example, an image sensor 3200 shown in FIG. 42) for detecting a movement of a player; a game execution section (for example, a similarity decision unit 3016 shown in FIG. 42) for executing a predetermined game by comparing the movement of the player detected by the movement detection section with a predetermined assigned movement; and a hint outputting section (for example, a character movement setting unit 3012, and a viewpoint control unit 3019 shown in FIG. 42) for outputting a hint corresponding to the predetermined assigned movement by a visual effect or an auditory effect.

In accordance with the fourteenth aspect of the present invention, according to a storage medium (for example, a data storage medium 3500 shown in FIG. 42) having a computer-executable program recorded thereon, the program comprises: a program code of detecting a movement of a player; a program code of executing a predetermined game by comparing the movement of the player detected with a predetermined assigned movement (for example, a game program 3510 shown in FIG. 42); and a program code of outputting a hint corresponding to the predetermined assigned movement by a visual effect or an auditory effect (for example, a character movement data 3534, a control pattern data 3538, and a virtual camera control data 3540 shown in FIG. 42).

In accordance with the fifteenth aspect of the present invention, a computer program comprising program code means for performing the steps of: detecting a movement of a player; executing a predetermined game by comparing the movement of the player detected with a predetermined assigned movement; and outputting a hint corresponding to the predetermined assigned movement by a visual effect or an auditory effect.

According to the game apparatus, the storage medium and the computer program in accordance with the thirteenth, fourteenth and fifteenth aspects of the present invention, when the player performances a movement based on the hint corresponding to the predetermined assigned movement by a visual effect or an auditory effect, the movement of the player is detected and reflected to the game. Accordingly, the predetermined assigned movement and the movement of the player are not limited to a constant movement, so that it is possible to realize a body sensing game requiring the player to use the entire body thereof. Furthermore, the game level of difficulty or the content of the game can be readily altered by varying the timing of outputting the hint, or by changing the contents of the hint.

Preferably, according to a game apparatus in accordance with the thirteenth aspect of the present invention, the hint outputting section outputs the hint by displaying a character performing a movement.

Preferably, according to a storage medium having a computer-executable program recorded thereon, in accordance with the fourteenth of the present invention, the program further comprises: a program code of displaying a character performing a movement to be outputted as the hint.

Preferably, a computer program in accordance with the fifteenth of the present invention, further comprises program code means for performing the step of: displaying a character performing a movement to be outputted as the hint.

According to the game apparatus, the storage medium and the computer program as described above, because the hint is provided through the character performing the movement, it is possible to provide an effect in that the player can more easily recognize the movements to be performed as compared with a case in which the player has to follow voice instructions or instructions displayed on the screen.

Preferably, according to a game apparatus as described above, the hint outputting section does not display the character before a movement-start instruction is given to the player, when a predetermined game level of difficulty is selected by the player.

As described above, because the player is not provided with the hint concerning the assigned movement before the player starts performing the movement, the player has to move reflectively by viewing the movement of the character displayed after the movement-start instruction. Accordingly, the game level of difficulty increases, so that it is possible that the skilled players can play a more interesting game.

Preferably, according to a game apparatus as described above, the hint outputting section displays the character facing to the player and performing the movement laterally inversed the predetermined assigned movement.

Preferably, according to a storage medium having a computer-executable program recorded thereon, as described above, the program further comprises: a program code of displaying the character facing to the player and performing the movement laterally inversed the predetermined assigned movement.

Preferably, a computer program as described above, further comprises program code means for performing the step of: displaying the character facing to the player and performing the movement laterally inversed the predetermined assigned movement.

According to the game apparatus, the storage medium and the compute program as described above, because the character performs the movement laterally inversed the predetermined assigned movement, the player may intuitively determine the assigned movement from the left and right sides of the movement as viewed, and can reflectively provide a response. Accordingly, it is possible to reduce the time period from the time wherein the hint is displayed by the character performing the movement to the time wherein the player performs actually the movement.

Preferably, according to a game apparatus as described above, the hint outputting section displays the character before a movement-start instruction is given to the player.

Preferably, according to a storage medium having a computer-executable program recorded thereon, as described above, the program further comprises: a program code of displaying the character before a movement-start instruction is given to the player.

Preferably, a computer program as described above, further comprises program code means for performing the step of: displaying the character before a movement-start instruction is given to the player.

According to the game apparatus, the storage medium and the computer program as described above, because the hint concerning the assigned movement is outputted by displaying the character prior to the movement-start instruction to the player, the player can obtain the information on the assigned movement before the player starts performing the movements. Accordingly, beginners of the game can play the game with more interesting.

Preferably, according to a game apparatus as described above, the hint outputting section displays the character after a movement-start instruction is given to the player.

Preferably, according to a storage medium having a computer-executable program recorded thereon, as described above, the program further comprises: a program code of displaying the character after a movement-start instruction is given to the player.

Preferably, a computer program as described above, further comprises program code means for performing the step of: displaying the character after a movement-start instruction is given to the player.

According to the game apparatus, the storage medium and the computer program as described above, because the hint concerning the assigned movement is outputted by displaying the character while the player performing the movement, the player can simulate the assigned movement based on the movement of the character. Accordingly, the game level of difficulty may be lowered, to enhance the amusement of the game for beginners.

Preferably, according to a game apparatus as described above, the hint outputting section changes the movement of the character to be displayed, according to a game level of difficulty selected by the player or the movement of the player detected by the movement detection section.

As describe above, because the game level of difficulty wherein the player is presently playing can be changed, by changing the movement of the character, the game level of difficulty can be changed easily.

Preferably, according to a game apparatus as described above, the hint outputting section displays the character performing the movement having no association with the predetermined assigned movement, when a predetermined game level of difficulty is selected by the player.

As described above, because the character shows a movement having no association with the predetermined assigned movement while the player is performing the movement, the player may be mislead by the movement of the character. Therefore, it would be more difficult for the player to perform the assigned movement correctly. Accordingly, the game level of difficulty increases, and thereby it is possible to provide a more amusing game to skilled players.

Preferably, according to a game apparatus in accordance with the thirteenth aspect of the present invention, the hint outputting section does not output the hint corresponding to the predetermined assigned movement by a visual effect or an auditory effect, when a predetermined instruction is inputted by the player.

As described above, because the player is not given the hint concerning the assigned movement when the predetermined instruction is inputted, the player can freely move to reflect the movements to the game. Accordingly, the player feels as if the player's movement is good or poor is decided, so that the player can get a kind of amusement that is different from the game in which the player has to copy the assigned movement. Consequently, the contents of the game can be changed in various ways.

Preferably, according to a game apparatus in accordance with the thirteenth aspect of the present invention, the movement detection section comprises an artificial retina chip for detecting the movement of the player.

As described above, because the player's movement is detected by using the artificial retina chip, the process such as the feature extraction process and so on, for detecting the player's movement can be performed on the side of the artificial retina chip. Accordingly, the total processing load of the apparatus can be more distributed, the processing speed of the apparatus as a whole can be further increased.

Preferably, according to a game apparatus in accordance with the thirteenth aspect of the present invention, the predetermined assigned movement is a movement which synchronizes with a predetermined tempo of at least one of a music, a sound, a sound effect and a video.

As described above, because the player moves in synchronization with the tempo of the music, the sound, the sound effect or the video, the pleasure in performing the movements can be increased. Further, because the player has to move with the tempo, the game level of difficulty can readily be changed by changing the tempo of the music, the sound, the sound effect or the like.

BRIEF DESCRIPTION OF THE DRAWINGS

The present invention will become more fully understand from the detailed description given hereinafter and the accompanying drawing which are given by way of illustration only, and thus are not intended as a definition of the limits of the present invention, and wherein:

FIG. 11 is a diagram showing an example of a decision reference data 1536;

FIG. 12 is a diagram showing an example of a character movement data 1534;

FIG. 25 is a diagram showing an example of a character movement data 2534;

FIG. 26 is a diagram view showing an example of a decision reference 2536;

FIG. 29 is a diagram showing an example of a player's movement data;

FIG. 32 is a view for explaining a decision of similarity on timed movements;

FIG. 42 is a functional block diagram of the game apparatus 3700;

FIG. 43 is a diagram showing an example of a control pattern data 3538;

FIG. 44 is a diagram showing an example of a character movement data 3534;

FIG. 50 is a diagram showing an example of a decision reference data 3536;

PREFERRED EMBODIMENT OF THE INVENTION

Hereinafter, a preferred embodiment of the present invention will be explained in detail with reference to figures.

The present invention is described below as applied to a dance game by way of example only, and it will be obvious to one with ordinary skill in the related art that the present invention shall not be limited to such applications.

First, a game apparatus 1700 suitable to games that can be experienced by a player using an entire body to play a game, will be explained according to the first embodiment of the game apparatus of the present invention, with reference to FIGS. 1 to 20.

Next, a game apparatus 2700 which can progress a game and process a score according to a movement using an entire body without restricting an inputting action, will be explained according to the second embodiment of the game apparatus of the present invention, with reference to FIGS. 1, 2 and 21 to 36.

And next, a game apparatus 3700 which can realize a body sensing game requiring a player to use an entire body and vary contents of the game by outputting hints, will be explained according to the third embodiment of the game apparatus of the present invention, with reference to FIGS. 1, 2 and 37 to 53.

[First Embodiment]

The game apparatus 1700 suitable to games that can be experienced by a player using his entire body to play a game, will be explained according to the first embodiment of the game apparatus of the present invention, with reference to FIGS. 1 to 20.

Figure 1:
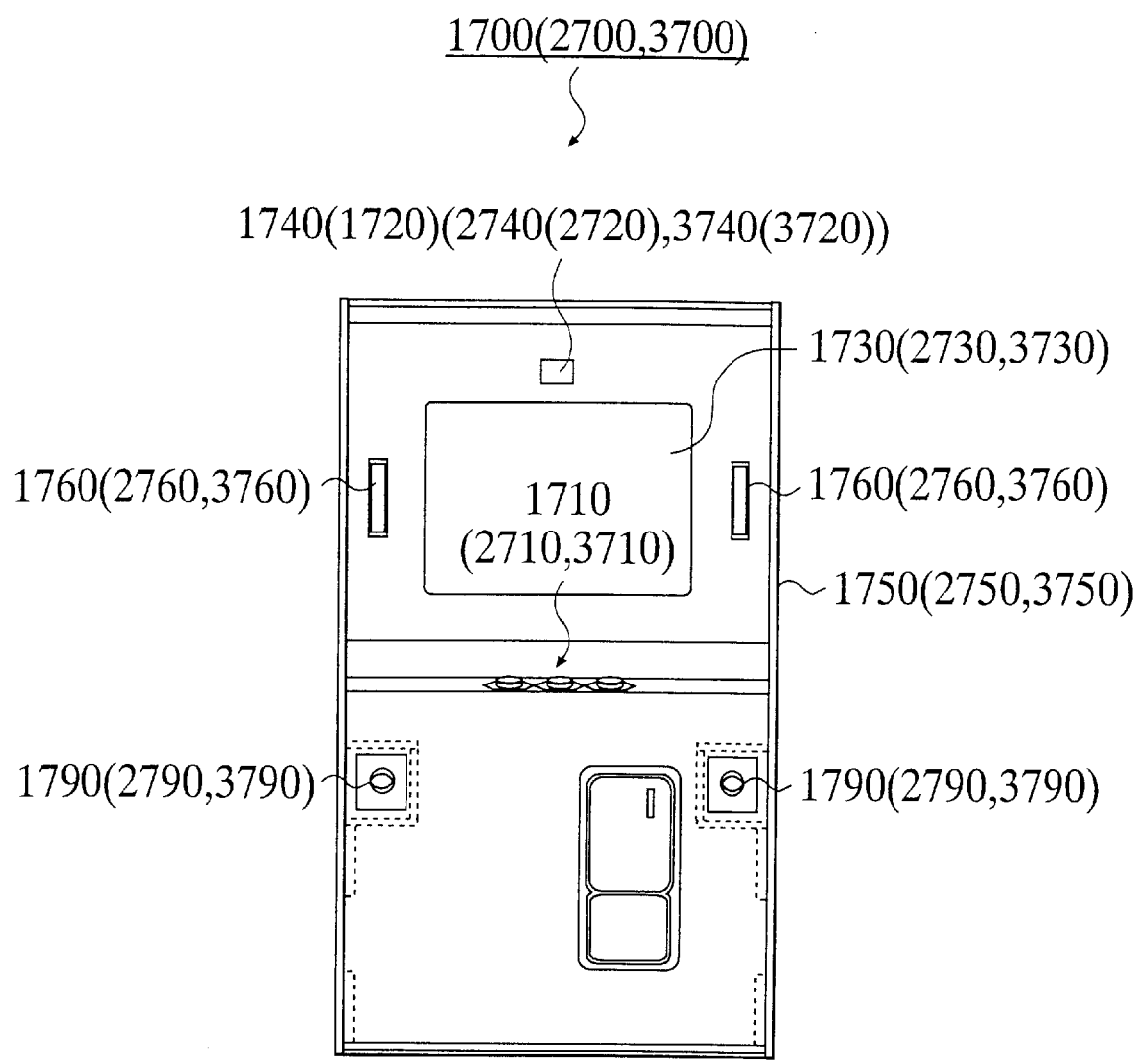
FIG. 1 is an external front view of a game apparatus 1700 (2700, 3700) as an arcade game machine to which the present invention is applied.
Figure 2:
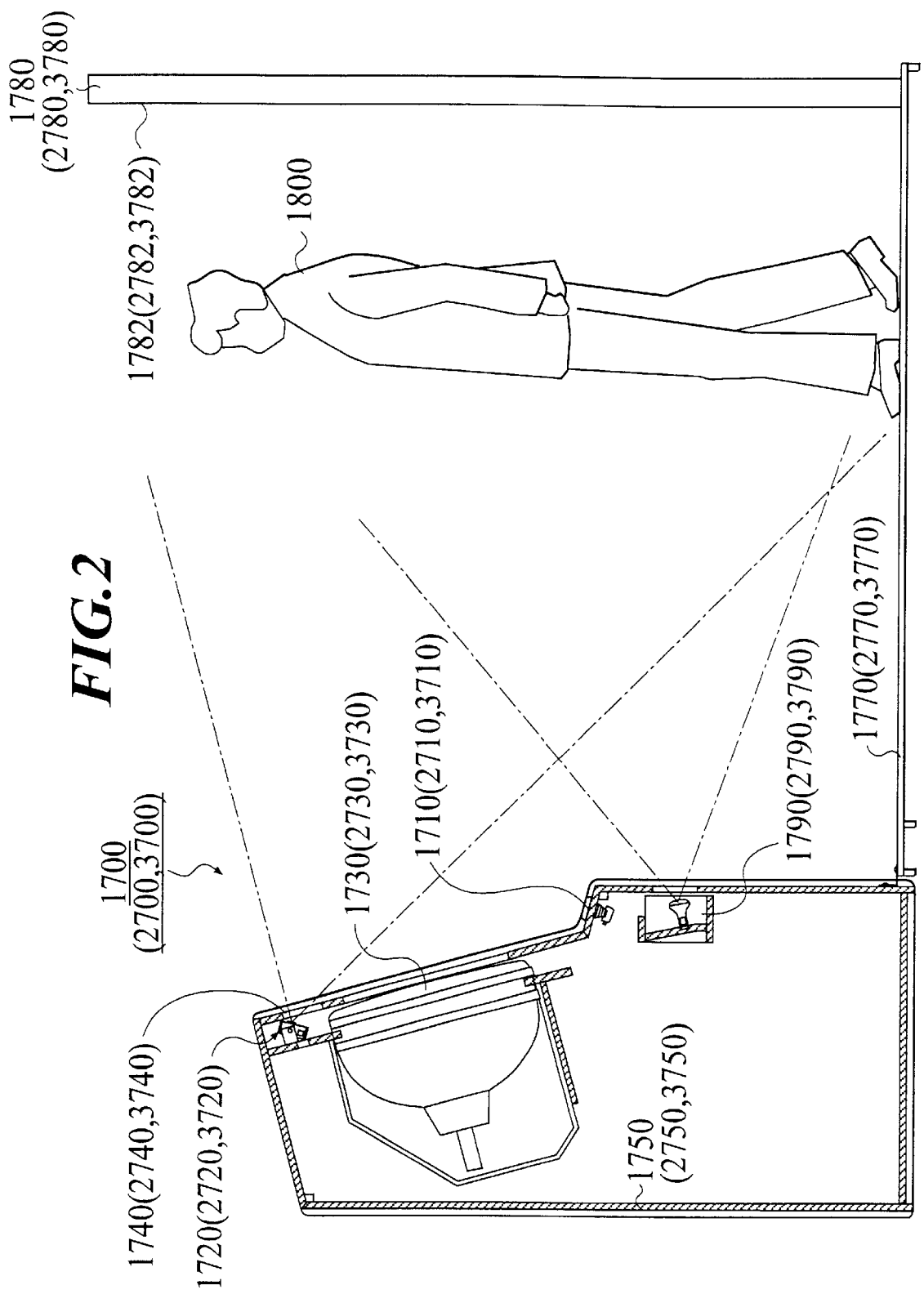
FIG. 2 is a sectional view of the game apparatus 1700 (2700, 3700) as an arcade game machine to which the present invention is applied.

FIGS. 1 and 2 are exemplary external views showing the game apparatus 1700 as an arcade game machine according to the first embodiment of the game apparatus of the present invention. FIG. 1 is a front view showing an external of the game apparatus 1700, and FIG. 2 is a vertical sectional view from the side of the game apparatus 1700.

Further, in FIGS. 1 and 2, the reference numerals of each part of the game apparatus 2700 and the game apparatus 3700 according to the second and third embodiments are illustrated in parentheses, corresponding to each part of the game apparatus 1700 according to the first embodiment.

As shown in FIG. 1, this game apparatus 1700 comprises substantially horizontal a dance stage 1770, a housing 1750 standing upright at the front of the dance stage 1770, a back panel 1780 standing upright at the back of the dance stage 1770, an artificial retina camera 1720, a display (image display device) 1730, operating buttons 1710, a speaker 1760 and a light 1790 and so on, wherein the artificial retina camera 1720, the display 1730, the operating buttons 1710, the speaker 1760 and the light 1790 are provided at the housing 1750. Note that this artificial retina camera 1720 is the movement detection means for detecting the movement of the player 1800.

The player 1800 dances (moves) on the dance stage 1770 and enjoys playing the dance game. The position in which the player 1800 dances, is also indicated on the dance stage 1770. This designated dancing position is the area in which player's movement can be detected by the artificial retina camera 1720.

The operating buttons 1710 can be alternatively disposed near where the player 1800 dances. Buttons operated with the feet could also be provided on the dance stage 1770 such that the player 1800 steps on these buttons at some particular timing while dancing. Touch-screen type buttons, for example, could also be provided near the dancing position such that the player 1800 touches these buttons at some particular timing while dancing.

The artificial retina camera 1720 and display 1730 are positioned in front of the player 1800 with the artificial retina camera 1720 above the display 1730. It will be obvious to one with ordinary skill in the related art that the artificial retina camera 1720 could be placed below the display or on the sides of the display. Further alternatively, a half mirror and the artificial retina camera could be placed in front of the player 1800 such that movement of the player 1800 is detected through the half mirror. In other words, the display and artificial retina camera can be arranged as desired insofar as the player 1800 can see the display and the artificial retina camera can capture images of the movement of the player 1800 while the player 1800 is playing the game.

The speaker 1760 can also be placed as desired, including, for example, above the dance stage 1700 or in the back panel 1780.

The artificial retina camera 1720 has an artificial retina chip for detecting the player 1800. This artificial retina chip performs an image detection process for detecting an image, and a feature extraction process for detecting particular features of the detected image. This feature extraction process could be, for example, an edge detection process for detecting the contours of a subject in the image; a resolution varying process for reading pixel groups; a pattern matching process for extracting a subject from the image; or a random access process for detection only in a particular part of the image. Based on the image processed by the artificial retina chip, the artificial retina camera 1720 then detects player 1800 movement (further described below).

Because the artificial retina chip can accomplish the image detection, the edge detection, the pattern matching, the resolution varying process, the gaze, or other feature extraction process without other image processing, it simplifies the configuration of a game apparatus 1700 according to this preferred embodiment of the present invention and makes it possible to reduce the manufacturing cost of the game apparatus 1700.

A visible light cut-off filter 1740 is also disposed between the player 1800 and the photo-detection unit of the artificial retina camera 1720 so that the photo-detection element of the artificial retina chip detects only light from which light in the visible spectrum has been filtered out. This can be achieved by placing the visible light cut-off filter 1740 in the housing 1750 between the player 1800 and artificial retina camera 1720.

The artificial retina camera 1720 thus detects player's movement from light received through the visible light cut-off filter 1740. Because a light having a wavelength of the visible spectrum is removed by the visible light cut-off filter 1740, the artificial retina camera 1720 can detect only player movement without distortion introduced by random outside light, and is thus prevented from player's movement detection errors.

The visible light cut-off filter 1740 can also be achieved by appropriately coating the photo-detection unit of the artificial retina camera 1720.

The back panel 1780 stands upright behind the player 1800 in line connecting between the artificial retina camera 1720 and player 1800. A surface portion 1782 of the back panel 1780, which is at the side of the housing 1750 prevents movement of people and objects passing or moving behind the back panel 1780 from being detected by the artificial retina camera 1720. The back panel 1780 is a primarily gray, a dark blue, or other deep shade to suppress the projection of the player's shadow onto the back panel 1780 by an ambient natural or an artificial light. The artificial retina camera 1720 thus will not detect movement of the player's shadow.

It will be obvious to one with ordinary skill in the related art that the back panel 1780 does not need to be a panel, but could be a screen or curtain, for example.

The game apparatus 1700 according to the first embodiment is thus a game machine that determines the progress and tallies the score of the dances game by comparing and evaluating the movement of the player 1800 detected by the artificial retina camera 1720 with an assigned dance.

Figure 3:
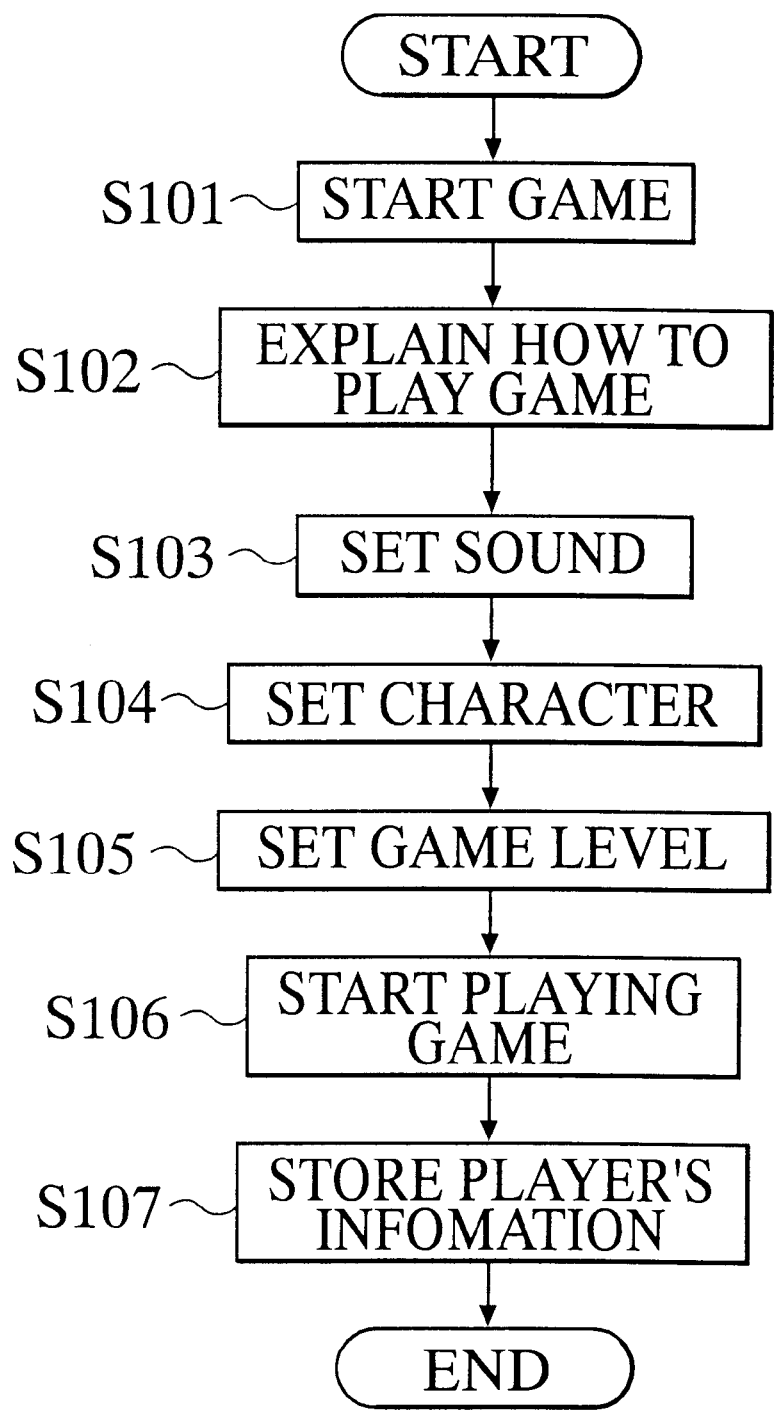
FIG. 3 is a flow chart showing the operation of the game apparatus 1700 according to the first embodiment of the present invention.

FIG. 3 is a flow chart of a game flow in the game apparatus 1700.

In the game apparatus 1700 according to this preferred embodiment of the present invention, the game starts when a coin is inserted into the game apparatus 1700 or the start button (not shown in figures) is pressed (step S101). How to play the game is then explained using the display 1730 or directions are presented through the speaker 1760 (step S102).

Figure 4:
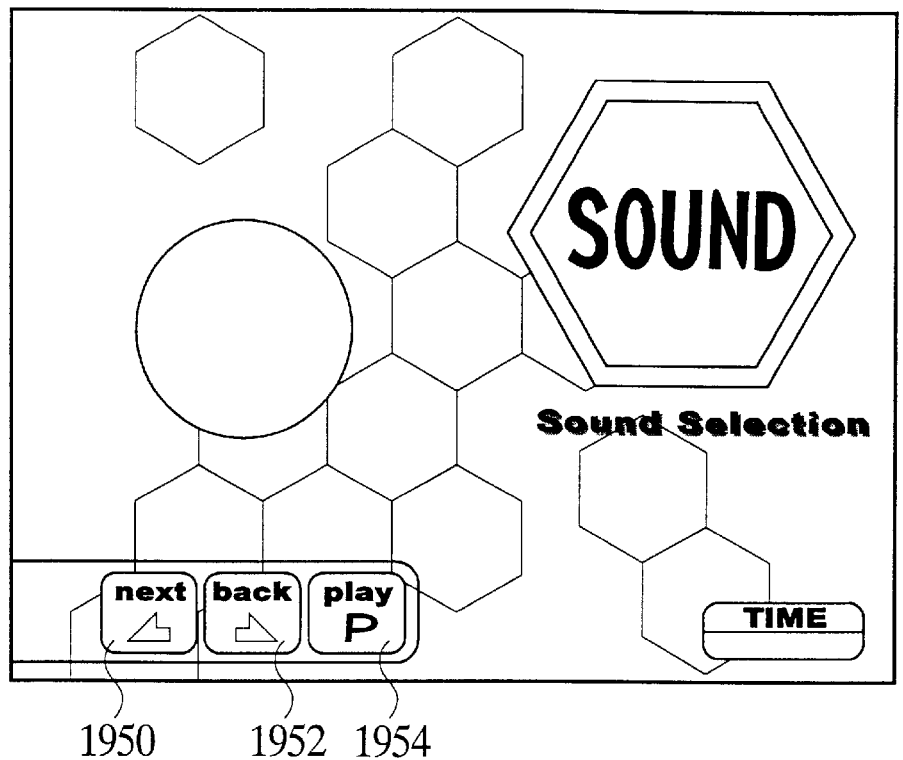
FIG. 4 is a view showing an exemplary sound selection screen presented in the game apparatus 1700.

A sound selection screen is then presented on the display 1730, as shown in FIG. 4 (step S103). FIG. 4 shows a typical screen for selecting the sound and the music of the dance and other sound effects. The player 1800 presses the next button 1950 or the back button 1952 on the sound selection screen to hear the selection of the sound, the music and the effects that will be used when playing the game (dancing). After locating the desired sound, music or effect, the player 1800 presses the play button 1954 to start playing the desired selection. It should be noted that operating the next button 1950, the back button 1952, and the play button 1954 can be realized by operating the operating buttons 1710 or by detecting the player's movement of by means of the artificial retina camera 1720.

Figure 5:
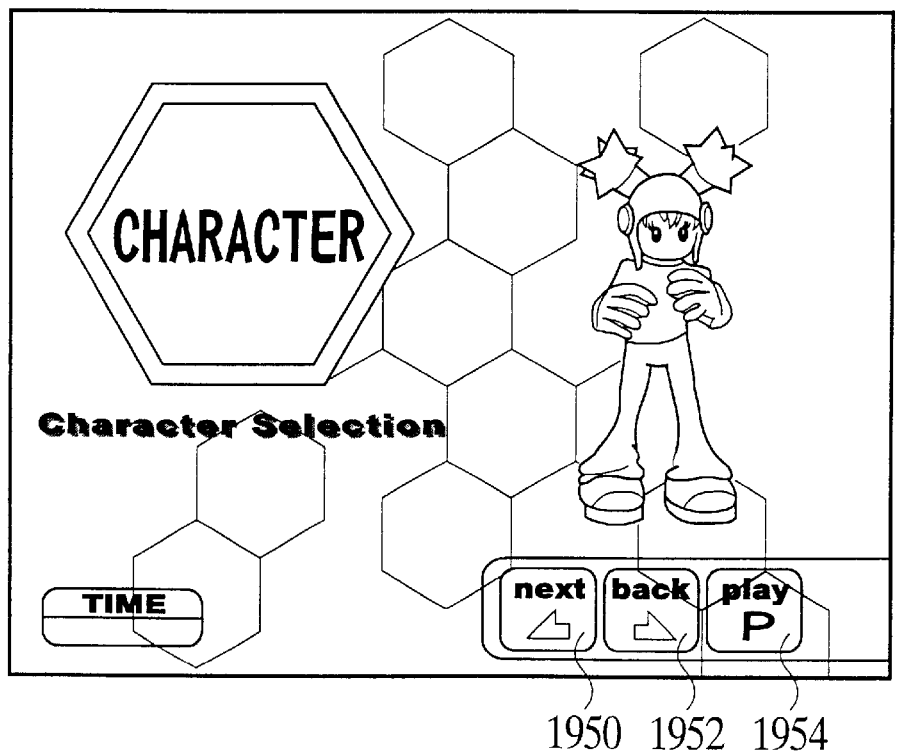
FIG. 5 is a view showing an exemplary character selection screen presented in the game apparatus 1700.

Next, a character selection screen is presented on the display 1730, as shown in FIG. 5 (step S104). FIG. 5 shows a typical screen for selecting the character, displayed on the display 1730. This screen enables the player 1800 to select both a player character and an instructor character.

Selection is aided by a prompt such as "please select your character" and so on presented on display 1730 and/or by the speaker 1760. The player 1800 then uses the next button 1950 and the back button 1952 to view the different characters on the display 1730. When the desired character is found, the player 1800 presses the play button 1954 to set the player character.

After the player character selection is made, a prompt such as "please select your instructor" and so on is presented for the player 1800 on the display 1730 or by the speaker 1760 as noted above. The player 1800 then uses the next button 1950 and the back button 1952 to view the different instructor characters on the display 1730. When the desired instructor character is found, the player 1800 presses the play button 1954 to set the instructor character.

Figure 6:
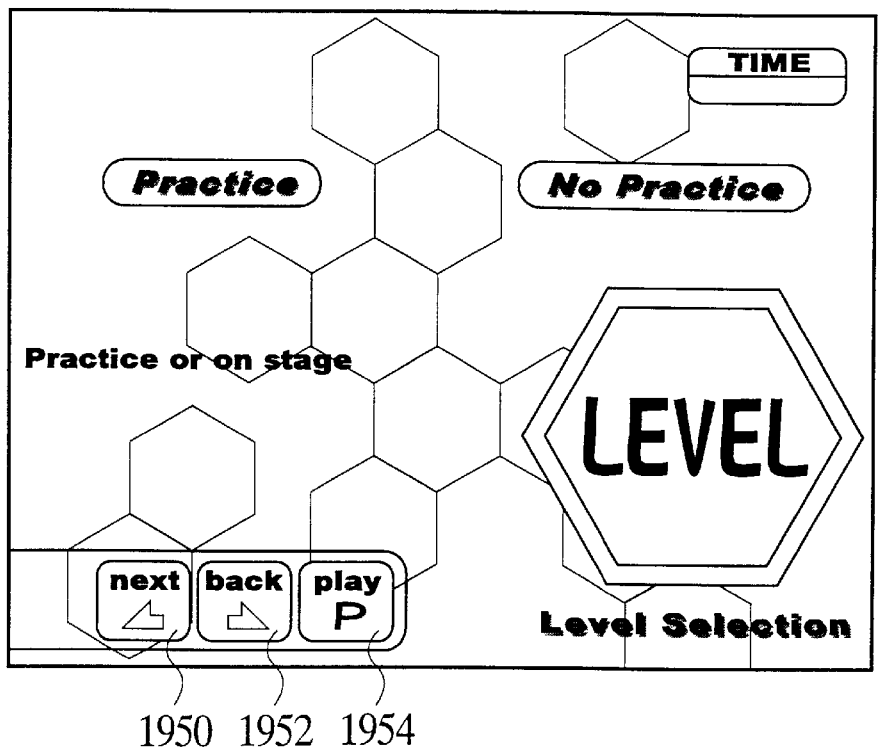
FIG. 6 is a view showing an exemplary game level selection screen presented in the game apparatus 1700.

A level selection screen for selecting the level of difficulty for playing the game is then presented on display 1730, as shown in FIG. 6 (step S105). FIG. 6 shows a typical screen for selecting the game level. The player 1800 uses the next button 1950 and the back button 1952 to select the desired game level (difficulty level), and then presses the play button 1954 to set the game level.

Figure 7:
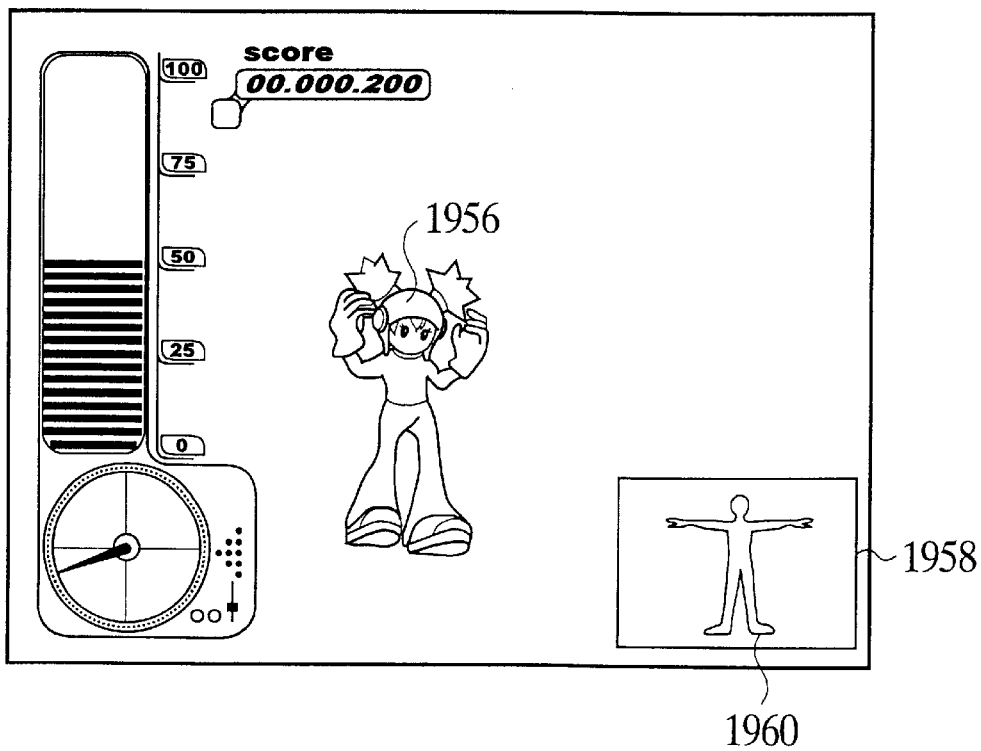
FIG. 7 is a view showing an exemplary screen presented in the game apparatus 1700, while the game is being played.

The player 1800 then starts playing the game according to the dance game (step S106). FIG. 7 shows a typical game play screen while the game is being played. In this dance game the player 1800 dances on the dance stage 1770 to the rhythm and the tempo of the music, the sound and the sound effects flowing from the speaker 1760, using the entire body to enjoy the dance game.

Further, the player 1800 also dances on the dance stage 1770 according to the movements of the instructor character 1956 shown on the display 1730, and thus enjoys playing the dance game by moving the entire body.

And further, as the player 1800 dances, the player's movements are detected by the artificial retina camera 1720, and are shown by the movements of the player character 1960 presented in a window 1958 on the screen. The player 1800 can thus enjoy the dance game by observing the movements of the player character 1960 to confirm the player's own dancing form. The player 1800 can thus enjoy experience using the whole body to play the dance game.

And further, the dancing movements of the instructor character 1956 and the dancing movements of the player 1800 detected by the artificial retina camera 1720 can also be compared by the game apparatus 1700 to evaluate the similarity between the instructor's form and the player's own form, thus providing yet another way for the player 1800 to enjoy the dance game.

When the dance game is over, a screen is presented on display 1730 enabling the player 1800 to enter certain player's information (for example, such as the player's initials or name) using the operating buttons 1710 (step S107). The information of the player 1800 and the score are then shown on the display 1730, and the game ends.

Figure 8:
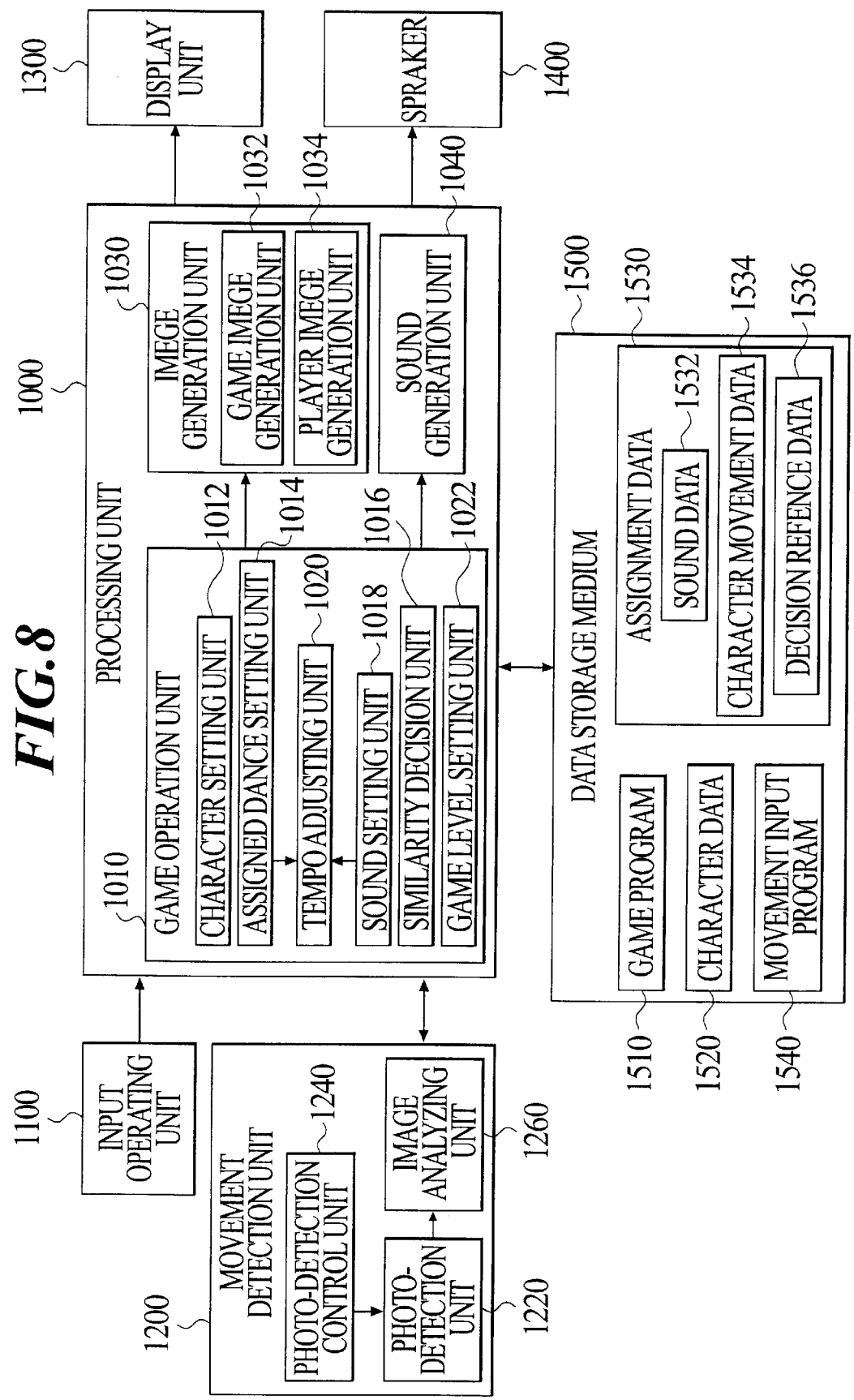
FIG. 8 is a functional block diagram of the game apparatus 1700.

FIG. 8 is a functional block diagram of the game apparatus 1700 according to the first embodiment of the invention. The functional block comprises an input operating unit 1100, a movement detection unit 1200, a processing unit 1000, a display unit 1300, a speaker 1400, and a data storage medium 1500.

The input operating unit 1100 is a means enabling the player 1800 to enter an operating data using the operating buttons 1710 shown in FIG. 1 or the foot-controlled buttons or the touch-panel type buttons as noted above. The operating data obtained through the input operating unit 1100 is outputted to the processing unit 1000.

The movement detecting unit 1200 is achieved as a function of the artificial retina camera 1720 shown in FIG. 1 and detects the player's movement. The movement detecting unit 1200 thus comprises a photo-detection unit 1220, a photo-detection control unit 1240, and an image analyzing unit 1260.

The photo-detection unit 1220 comprises a plurality of the photo-detector elements arranged in a two-dimensional array (a lattice shape). The photo-detection control unit 1240 controls the photo-detection sensitivity of each of the photo-detector elements. Because the photo-detection control unit 1240 controls the photo-detection sensitivity of each of the photo-detector elements, a particular image process such as edge detection process for detecting only the contours of the captured image, is applied to the image data as it is captured and photo-detected by the photo-detection unit 1220. The processed image thus obtained by the photo-detection unit 1220 is then output to the image analyzing unit 1260 as a processed image signal.

The image analyzing unit 1260 then detects the two-dimensional movement in the processed image signal inputted from the photo-detection unit 1220 by applying an optical flow technique or other process to each processed image signal. That is, the direction, the strength, and the magnitude of the movement in each pixel are detected from the temporal and spatial change in the brightness of each pixel. The image analyzing unit 1260 then identifies areas of the strong movement from the detected optical flow, and the direction and the strength of the two-dimensional movement is calculated for the overall region. More specifically, the two-dimensional movement is obtained using the vector average of the optical flow in each area.

Figures 9, 10:
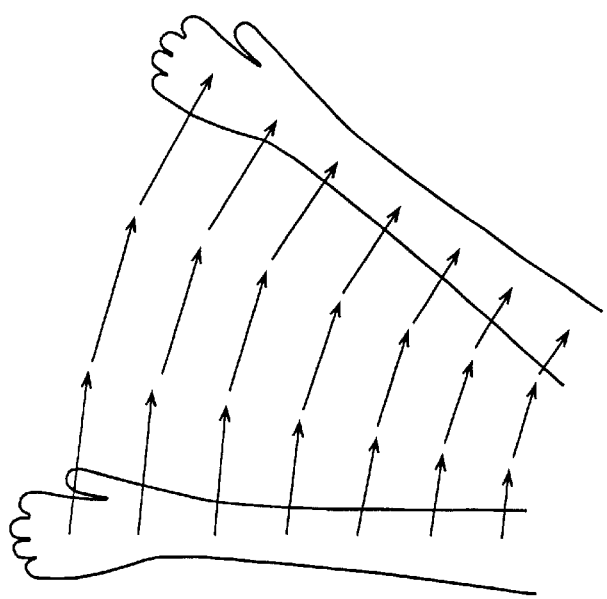
FIG. 9 is a view showing an example of a result of detecting a player's movement.
FIG. 10 is a diagram showing an example of a player's movement data.

FIG. 9 shows an example of detection results for a particular movement of the player 1800, specifically a movement of one arm. The arrows shown in FIG. 9 are vectors of the movement of the arm of the player 1800, and indicate how the image signal for the arm changed.

As noted above, the movement detection unit 1200 constantly detects the movement of a particular object, which is primarily the player in this embodiment. The movement detection unit 1200 then outputs the detected player's movement as the input data to the processing unit 1000, and outputs the player's image data to the processing unit 1000.

The movement detection unit 1200 thus both captures a player's image and processes the captured image. The movement detection unit 1200 also detects the player's movements from the processed image. That is, the processing capacity of the processing unit 1000 can be directed to other processes because it does not perform the image processing and the motion detection, and the overall processing capacity of the processing unit 1000 can thus be improved.

The movements of the player 1800 detected by the movement detection unit 1200 are then outputted to the processing unit 1000 as an input data such as shown in FIG. 10. FIG. 10 shows an example of an input data of the player 1800 outputted at a particular timing from the movement detection unit 1200 (the image analyzing unit 1260) to the processing unit 1000. Note that this input data is input continuously to the processing unit 1000, and that data for one movement of the player 1800 is shown in FIG. 10. If the player moves both arms, for example, two data sets such as shown in FIG. 10 are outputted from the movement detection unit 1200, and the number of data sets and the content of each changes dynamically according to the player's movement. As shown in FIG. 10, the input data for the player 1800 is a vector data comprising a direction $\alpha 1$, a magnitude $\beta 1$, and a speed $\gamma 1$.

Referring again to FIG. 8, the data storage medium 1500 stores data and a program for accomplishing various processes. This data storage medium 1500 can be a hardware device such as an IC card, a magneto-optical disk (MO), a floppy disk (FD), DVD, a hard disk, a semiconductor memory, or the like. The data storage medium 1500 in this preferred embodiment comprises a game program 1510, an assignment data 1530, a character data 1520, and a movement input program 1540.

The game program 1510 is a program for handling a process for determining the progress of the game, a process for calculating and tallying the score of the game, a process for setting object spaces, and other processes for playing the game.

The assignment data 1530 comprises a sound data 1532 for generating a sound, a music, and sound effects (collectively referred to below as the audio data), that is, for setting an assigned dance and a sound, a music, and sound effects during dancing; a character movement data 1534 for setting a movement of a character; and a decision reference data 1536 for deciding the similarly between the assigned dance and the player's dance.

The character data 1520 defines one or a plurality of different characters, as well as such related information as feature and posture data (key frames) for each character.

The movement input program 1540 controls various processes related to the movement detection unit 1200, including a process for detecting a movement of a particular object by means of the movement detection unit 1200 and then inputting this movement as an input data to the processing unit 1000, and a process for handling data input/output between the movement detection unit 1200 and the processing unit 1000.

The decision reference data 1536 is a data used in a process for setting the assigned dance by means of an assigned dance setting unit 1014, and a process for comparing the movement of the player 1800 and the assigned dance by a similarity decision unit 1016.

FIG. 11 shows the configuration and an example of the decision reference data 1536. Types of dance are stored with a specific correlation to the decision reference data at the timing appropriate to the type of dance. Various parts of the body and the decision reference data for each body part are also stored with a correlation therebetween. The decision reference data comprises a direction $\alpha$, a magnitude $\beta$, and a speed $\gamma$. For example, the decision reference data 1536 at a time t1 for a body part "a" in dance 1 are a direction $\alpha 11$, a magnitude $\beta 11$, and a speed $\gamma 11$.

The character movement data 1534 is data used in the process whereby the game operation unit 1010 causes the instructor character 1956 to perform the assigned dance.

FIG. 12 shows the configuration and an example of the character movement data 1534 in dance 1. The character movement data stores various body parts (such as the character's hands, feet, face, arms, legs, and chest) correlated to the position of each part in a particular key frame for each particular dance. For example, a part "a" of a character A in dance 1 is at a position (Xa1, Ya1, Za1) in a frame 1, and is at a position (Xb1, Yb1, Zb1) in a frame 2. As shown in FIG. 12, the data table is stored in the data storage medium 1500, according to the type of the dance.

Referring again to FIG. 8, the processing unit 1000 inputs data to and receives data from the input operating unit 1100, the movement detection unit 1200, the display unit 1300, the speaker 1400, and the data storage medium 1500. The processing unit 1000 also runs various processes based on the detection data (the image data and the input data) from the movement detection unit 1200, the operating data from the input operating unit 1100, and various data and various programs stored to the data storage medium 1500, and outputs the data to the display unit 1300 and the speaker 1400. The processing unit 1000 also controls the data input/output with the movement detection unit 1200 based on the movement input program 1540.

The functions of this processing unit 1000 can be achieved using such hardware as a CISC or RISC CPU, a DSP, an image capture IC, a clock circuit, and so on.

The display unit 1300 presents a game screen according to the data from the processing unit 1000.

The speaker 1400 also generates the game sounds according to the data from the processing unit 1000.

The processing unit 1000 also comprises a game operation unit 1010, an image generation unit 1030, and a sound generation unit 1040.

The game operation unit 1010 runs processes for: advancing a game play based on the game program 1510; setting object spaces based on the game program 1510; setting objects in the object spaces based on the game program 1510; moving the instructor character 1956 (that is, making the instructor character 1956 dance) based on the character movement data 1534, for example; moving the player character 1960 (that is, making the player character 1960 dance)

based on data of the player 1800 (particularly the above-noted input data) detected by the movement detection unit 1200; and setting the game level (level of difficulty) of the assigned dance.

The process for operating the instructor character 1956 is described next.

The instructor character 1956 is made to dance based primarily on the character movement data 1534. The game operation unit 1010 creates the character movement by interpolating a value indicative of the change in the position of the character in one frame of the character movement data 1534 at a particular time to the position of the character in the next frame. By linear interpolation of the change in character position from the frame 1 to the frame 2, the game operation unit 1010 can create an animated character that moves continuously from the frame 1 to the frame 2, for example.

The process for operating the player instructor character 1960 is described next.

The player character 1960 is also moved based on the character data 1520 and the above-noted input data inputted from the movement detection unit 1200. Because the input data relates to a two-dimensional movement, the movement of the player character 1960 is expressed as the movement detected by the movement detection unit 1200, that is, the player movement as seen from the front. It will be obvious to one with ordinary skill in the related art that an image of the player's movement can also be generated from the above-noted image data.

The game operation unit 1010 also contains a character setting unit 1012, an assigned dance setting unit 1014, a similarity decision unit 1016, a sound setting unit 1018, a tempo adjusting unit 1020, and a game level setting unit 1022.

The character setting unit 1012 runs a process for setting the instructor character 1956 and the player character 1960 based on the character data 1520 and the data inputted by means of the input operating unit 1100 or the movement detection unit 1200.

The game level setting unit 1022 runs a process for setting the game level (level of difficulty) based on the data inputted by means of the input operating unit 1100 or the movement detection unit 1200.

The assigned dance setting unit 1014 runs a process for setting the assigned dance based on the decision reference data 1536, and setting the type (difficulty) of the assigned dance based on the game level set by the game level setting unit 1022.

The sound setting unit 1018 runs a process for setting the sound from the sound data 1532 based on the data inputted by means of the input operating unit 1100 or the movement detection unit 1200.

A tempo adjusting unit 1020 adjusts the tempo of the assigned dance set by the assigned dance setting unit 1014 based on the game level of difficulty set by the game level setting unit 1022 or the game operation unit 1010. The tempo adjusting unit 1020 also sets the tempo of the music set by the sound setting unit 1018 based on the game level of difficulty set by the game level setting unit 1022 or the game operation unit 1010. The tempo adjusting unit 1020 can thus be used to adjust the difficulty of the dance game or make the dance game more interesting by, for example, matching the tempo of the music to the assigned dance, changing the tempo according to the progress of the game, or making the tempo of the music and the assigned dance different.

The process of the similarity decision unit 1016 is described as follows. The similarity decision unit 1016 compares the decision data of the decision reference data 1536 at a particular time and the input data of the player's movement (shown in FIG. 10), which is continuously detected by the movement detection unit 1200, at the same time to determine the similarity therebetween. For example, if the input data for player body part "a" at the time t1 is the direction $\alpha 1$, the magnitude $\beta 1$, and the speed $\gamma 1$ as shown in FIG. 10, this player's movement data is compared with the decision reference data 1536 at the same time t1, that is, the direction $\alpha 11$, the magnitude $\beta 11$, and the speed $\gamma 11$. As the difference between the player's movement data and the decision reference data 1536 decreases, the similarity therebetween increases; as the difference increases, the similarity decreases. This similarity comparison and decision is repeated at each timing interval, that is, at the times t1, t2, t3, and so forth. It will be obvious to one with ordinary skill in the related art that the similarity comparison and decision is not required at all timing points t1, t2, t3, and so forth, and can be performed at the selecting timing points, such as t1 and t3.

Further, the similarity decision unit 1016 can also adjust the decision results based on the game level set by the game level setting unit 1022. That is, the input data for the same movement of the player 1800 can be scored lower if the game level is set to a high level of difficulty, and higher if the game level is low.

Furthermore, when the tempo adjusting unit 1020 adjusts the tempo of the assigned dance, the tempo adjusting unit 1020 adjusts the tempo of the assigned dance by adjusting the timing interval according to the tempo of the music, while the similarity decision unit 1016 also adjusts the timing interval of deciding the similarity according to the tempo of the music.

Referring again to FIG. 8, the game operation unit 1010 performs a scoring process based on the game program 1510 and the decision returned by the similarity decision unit 1016. Further, the game operation unit 1010 determines the game progress based on the scoring process (that is, whether to allow the game to continue or to end the game).

The image generation unit 1030 also comprises a game image generation unit 1032 and a player image generation unit 1034.

The game image generation unit 1032 runs a process for generating an image of the instructor character 1956 dancing in the object space set by the game operation unit 1010 as seen from a particular view point (referred to below as a virtual camera), and a process for generating an image of the objects set in the object space by the game operation unit 1010. Note that game image generation unit 1032 can be comprised to change the view point by, for example, rotating the virtual camera in the object space or changing the range of the viewing field. The game image generation unit 1032 can thus generate images in which the instructor character 1956 turns or moves closer to or away from the virtual camera.

The game image generation unit 1032 also runs a process for generating an image for displaying the timing for deciding the similarity by the similarity decision unit 1016, a process for generating an image for displaying the tempo adjusted by the tempo adjusting unit 1020, and a process for generating an image for displaying the results of the scoring process performed by the game operation unit 1010.

The player image generation unit 1034 runs a process for generating an image of the player character 1960 moving (dancing) as determined by the game operation unit 1010, or an image data (a moving image) of the player 1800 detected by the movement detection unit 1200. The images generated by the player image generation unit 1034 are presented on the display unit 1300.

The sound generation unit 1040 runs a process for generating the sound (the sound wherein the tempo thereof is adjusted by the tempo adjusting unit 1020) set by means of the sound setting unit 1018, and a process for generating an alarm sound notifying the player of the timing at which the similarity decision unit 1016 decides the similarity. The generated sounds are outputted from the speaker 1400.

Figure 13:
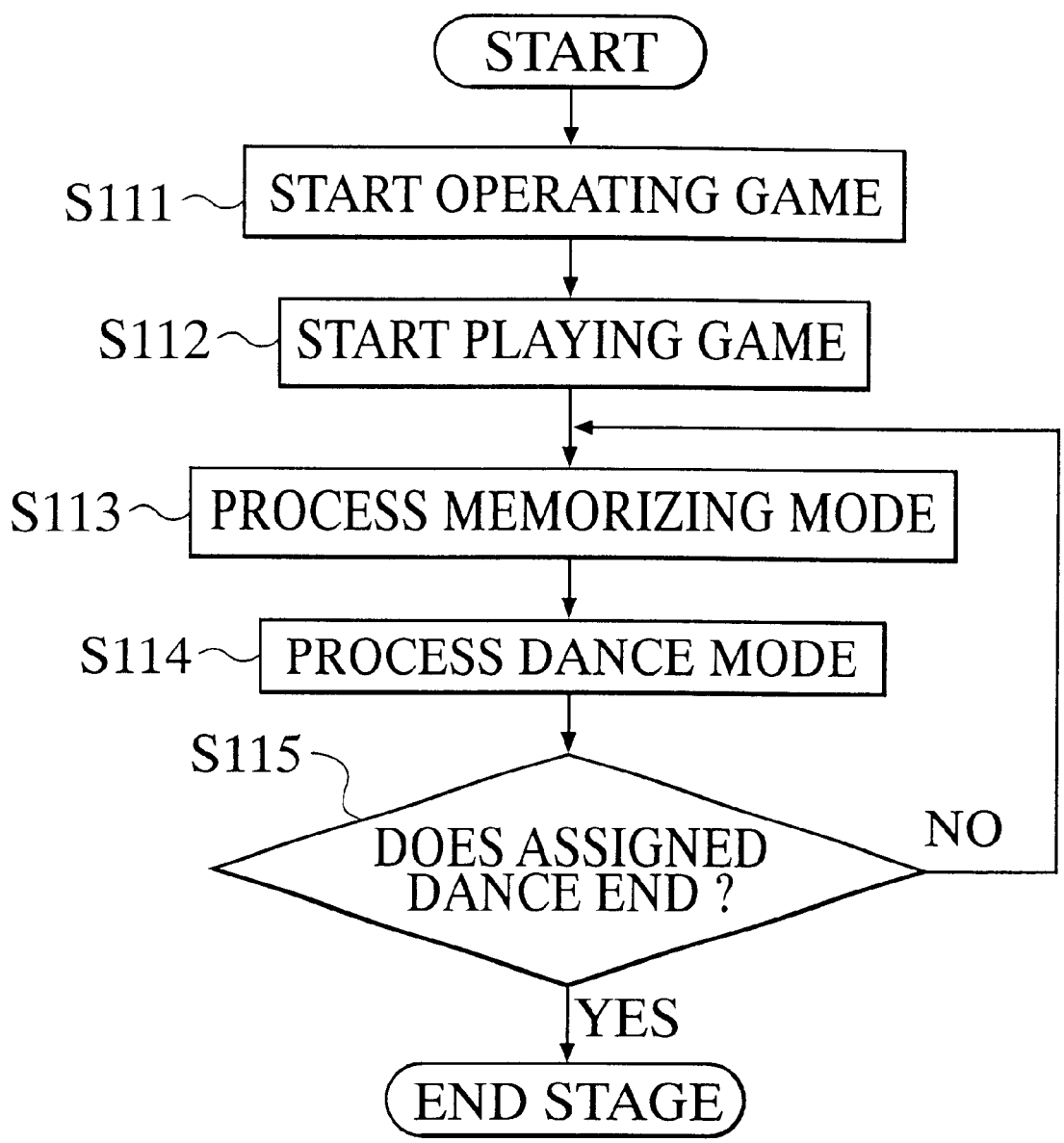
FIG. 13 is a flow chart of a process of the game apparatus 1700.

The game apparatus 1700 is comprised as described above, according to the first embodiment of the present invention. Playing a game in the game apparatus 1700 will be explained, as follows. FIG. 13 is a flow chart showing the flow in the operation of this game apparatus 1700 while a game is being played.

The game operation is started on the basis of the data input from the input operating unit 1100 and the movement detection unit 1200, and the data and the program stored on the data storage medium 1500 (step S111).

That is, the assigned dance setting unit 1014 sets the assigned dance and the sound setting unit 1018 sets the sound. Note that as the game level set by the game level setting unit 1022 increases, the assigned dance is set to one requiring a more difficult movement or a faster movement. Further, as the game level set by the game level setting unit 1022 increases, the similarity decision unit 1016 is set to lower the similarity ratings.

The tempo adjusting unit 1020 also adjusts the tempo of the assigned dance and the tempo of the music. For example, as the game level set by the game level setting unit 1022 increases, a faster tempo is set.

The game play is started when these settings of the game operation are completed (step S112).

Once the game play is started, a memorizing mode is started (step S113). The memorizing mode lets the player remember the assigned dance. That is, according to the memorizing mode, the instructor character 1956 dances the assigned dance so that the player can memorize the assigned dance. Further, in the memorizing mode, the music set by the sound setting unit 1018 is outputted from the speaker 1400 at the tempo set by the tempo adjusting unit 1020. And further, the dance of the instructor character 1956, which is controlled by the game operation unit 1010, is shown on the display unit 1300 dancing rhythmically to the music during the memorizing mode.

In the memorizing mode, the movements of the player 1800 are also detected by the movement detection unit 1200 and shown on the display unit 1300. The movements of the player 1800 are described by displaying the movements of player character 1960. Note that the player character 1960 can be displayed as a projection (a dot image, for example) of the player 1800.

The dance mode is started after the memorizing mode (step S114). The dance mode is the mode in which the player's movement (dancing) is compared with the assigned dance and decided. The music used in the memorizing mode is also outputted in the dance mode. The instructor character 1956 also dances the same dance performed in the memorizing mode.

The similarity decision unit 1016 also begins comparing the similarity between the assigned dance and the dance performed by the player 1800. That is, as noted above, the decision data from the decision reference data 1536 at a particular timing is compared with the input data of the player 1800 outputted from the movement detection unit 1200 at the same timing, to decide the similarity therebetween, as described above. The game operation unit 1010 then processes the score of the player 1800 on the basis of the result of the comparison and decision.

The game apparatus 1700 according to the first embodiment progresses the game by repeating the memorizing mode and the dance mode (step S115; NO). A particular stage of the game ends after these steps are repeated a specified number of times (step S115; YES).

If the resulting of processing the score by the game operation unit 1010 satisfies a particular condition, the game advances to the next stage; if these conditions are not satisfied, the game is over. The game operation unit 1010 determines of these conditions are satisfied. If the game advances to the next stage, the tempo of the assigned dance can be increased or the type of the assigned dance can be changed, to raise the assigned dance's level of difficulty. Further, if the game advances to the next stage, the dance of the instructor character 1956 in the dance mode can be changed so as to be different from the assigned dance of instructor character 1956 in the memorizing mode, to raise the game level of difficulty. By thus raising the level of difficulty, the game can be enjoyed even by advanced players who have become accustomed to the game.

Figure 14:
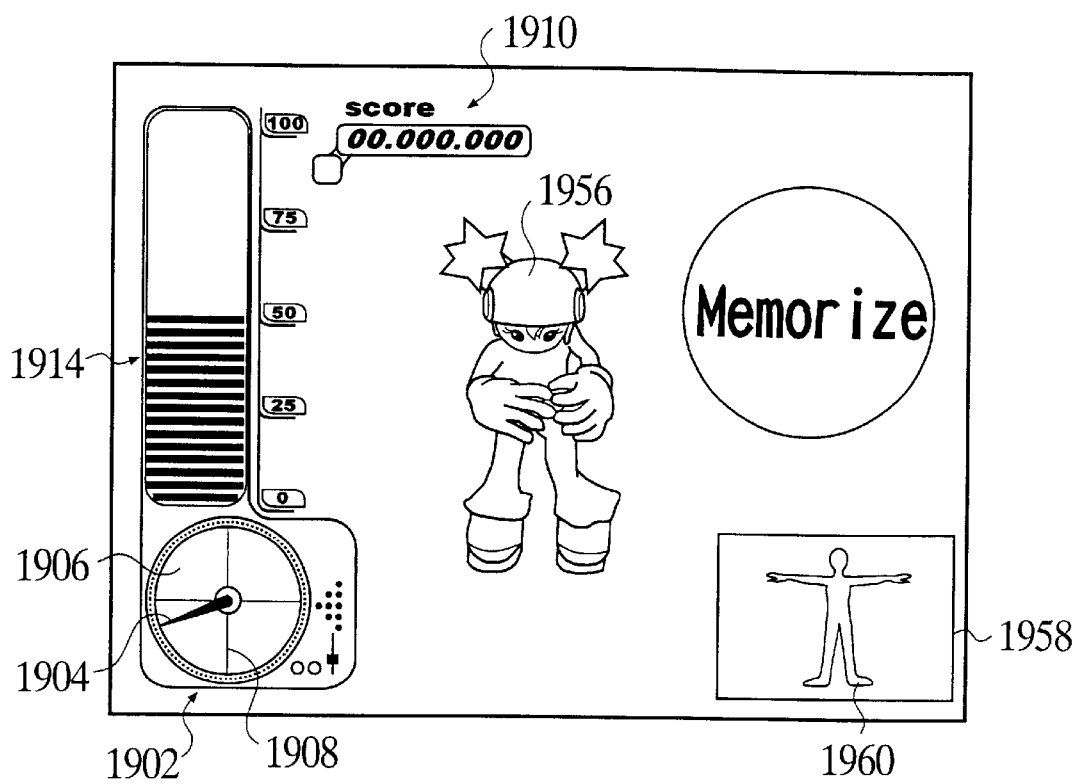
FIG. 14 is a view showing an exemplary screen in a memorizing mode, presented in the game apparatus 1700.
Figure 15:
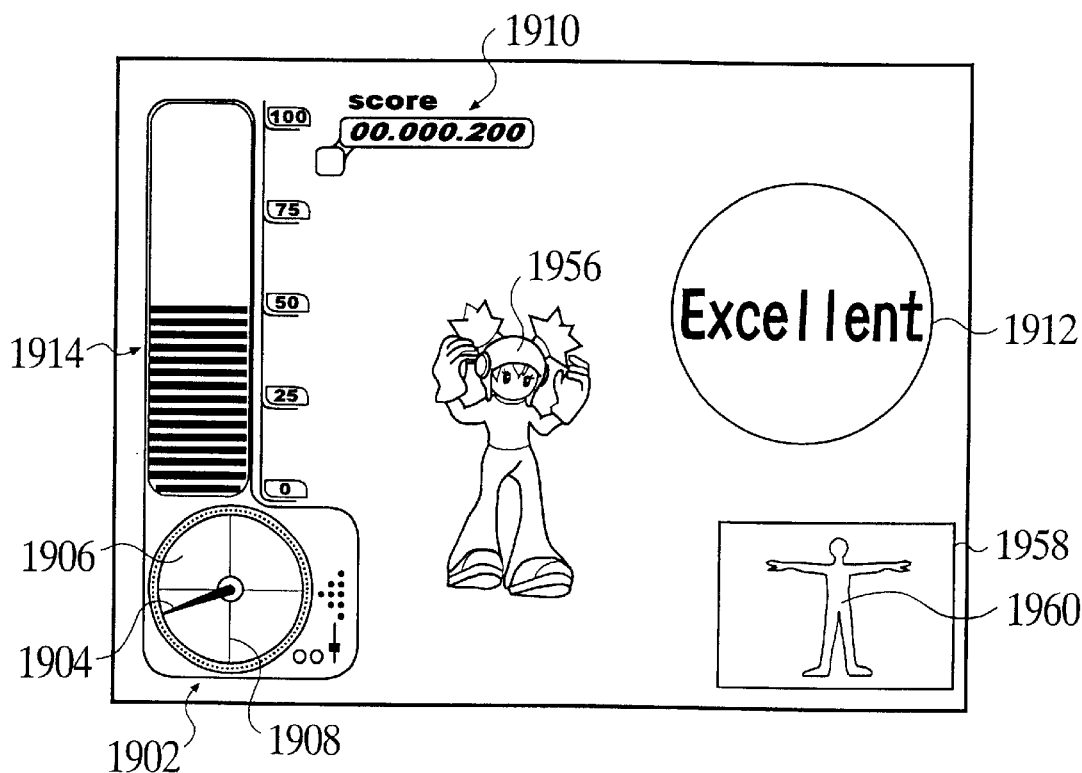
FIG. 15 is a view showing an exemplary screen in a dance mode, presented in the game apparatus 1700.

FIG. 14 shows an exemplary display screen in the memorizing mode, and FIG. 15 shows an exemplary display screen in the dance mode.

A feature of the first embodiment of the invention is that, as shown in FIG. 14 and FIG. 15, the movement of the player 1800 is shown in a window 1958 at the bottom right of the screen in both the memorizing mode and the dance mode.

That is, the movement detection unit 1200 detects the movement of the player 1800, and outputs the detected movement as an input data (a vector data) to the processing unit 1000. When the processing unit 1000 receives this input data, the game operation unit 1010 displays the movement of the player 1800 based on this input data by some means. The player 1800 can then check the player's form shown on the screen while playing the game. Therefore, the player 1800 can enjoy the game by watching the player's own dance form on the screen. Further, the player 1800 can compare the player's own movements shown on the screen with the movement of the instructor character 1956, and thereby correct the player's own form. Accordingly, the player 1800 is able to improve the similarity between the player's dance form and the assigned dance form to improve more quickly.

According to the first embodiment, the movement of the player 1800 is indicated as the movement of the player character 1960.

That is, the game operation unit 1010 sets the movement of the player character 1960 and displays the movement of the player character 1960 on the screen on the basis of the input data outputted to the processing unit 1000 from the movement detection unit 1200. Because the movement of the player 1800 is displayed as the movement of the player character 1960, the player 1800 can immediately check the player's form. That is, by displaying the movement of the player character 1960, the player 1800 can immediately confirm the player's form. Further, because the movement of the player 1800 is displayed as the movement of the player character 1960, the player 1800 can confirm the player's form with getting interested. Note, further, the movement of the player 1800 can be displayed by simply presenting the image data detected by the movement detection unit 1200 directly on the screen, that is, the movement of the player 1800 can be recorded for direct presentation without generating an animated character.

According to the first embodiment, the music is also outputted from the speaker in both the memorizing mode and the dance mode.

That is, the music selected from the sound data 1532 by the sound setting unit 1018 is outputted from the speaker 1400. The player 1800 can therefore play the dance game while listening to the selected music. The player 1800 can also dance to the rhythm and the tempo of the outputted music, and can thus dance rhythmically.

Furthermore, if the player 1800 is dancing to the music, other people can enjoy watching the dance of the player 1800 and thus be motivated to try the dance game themselves.

The tempo of the assigned dance is also matched to the tempo of the music outputted, by the tempo adjusting unit 1020.

By thus matching the tempo of the dance and the assigned music, the player can move according to the assigned dance. Even beginners can therefore enjoy the dance game.

It should be noted that, for example, when the game level of difficulty set by the game level setting unit 1022 is high, it is also possible to vary the tempo of the assigned dance from the tempo of the music. This can be accomplished that the tempo of the music set by the sound setting unit 1018 is not matched with the tempo of the assigned dance by adjusting the tempo of the music, by the tempo adjusting unit 1020.

Because the tempo of the assigned dance and the tempo of the music do not match with each other, the player 1800 cannot use the tempo of the music to determine the tempo of the assigned dance. Moving according to the assigned dance can thus be made more difficult even for the advanced players that have played the game continuously or frequently and have remembered the different assigned dances. Even the advanced players will thus not grow tired of the dance game.

According to the first embodiment of the present invention, as shown in FIG. 14 and FIG. 15, the tempo of the assigned dance is displayed on a timing gauge 1902. The timing gauge 1902 is composed so that the needle 1904 spins at a speed determined by the tempo. The timing gauge 1902 is for displaying the tempo of the assigned dance tempo adjusted by the tempo adjusting unit 1020, and is generated for presentation on the screen by the game image generation unit 1032.

Because the tempo of the assigned dance is displayed on the timing gauge 1902, the player is able to move according to the tempo of the assigned dance. Even the beginners can therefore enjoy playing the dance game. Furthermore, even if the tempo of the music and tempo of the assigned dance differ, the player 1800 can watch the timing gauge 1902 to determine the tempo of the assigned dance.

The timing at which the similarity decision unit 1016 determines the similarity can also be shown in the timing gauge 1902. For example, the color of the panel part 1906 of the timing gauge 1902 could change when the similarity is decided. The timing at which the needle 1904 for spinning overlaps the scale 1908 of the timing gauge 1902 could also be adjusted to matching the timing at which the similarity is decided. The background color of the screen could also be changed according to the timing at which the similarity is decided.

Because the similarity decision unit 1016 displays the timing for deciding the similarity on the screen, the player 1800 can confirm the timing for deciding the similarity by visual effects. The player 1800 is also better able to move at the timing for deciding the similarity, and can thus dance rhythmically. Accordingly, the player can enjoy playing a more interesting dance game.

It will also be obvious that audible cues, such as voicing "1, 2, 3", can also be outputted to the timing for deciding the similarity so that the player can recognize the timing for deciding the similarity by such audible cues. To accomplish this, the sound generation unit 1040 produces the voice outputted at the timing for deciding the similarity. It will also be obvious that a sound effect, such as a rhythmical beat, can be used instead of a voice.

According to the first embodiment, the score 1910 is also displayed at the top of the screen as shown in FIG. 14 and FIG. 15. The score 1910 is typically the cumulative score since the game play started. As described above, the game operation unit 1010 calculates the score based on the similarity result outputted by the similarity decision unit 1016 at each time. This score is calculated as, for example, the score relative to the maximum possible score at the time the similarity was decided. The game operation unit 1010 accumulates the number of scores scored at each time, and the game image generation unit 1032 generates an image of the cumulative score. The score 1910 is thus displayed.

Because the total number of scores accumulated since the start of the game play is shown in the score 1910, the player 1800 can decide how closely the player's movements have cumulatively resembled the assigned dance since the game started. Accordingly, the player 1800 can be motivated to score as many points as possible, and the player 1800 can play the game with the desire to improve as much as possible.

Other people watching the score 1910 might also feel they can score even higher, and can thus also be motivated to play the game and do even better.

According to the first embodiment, the result of deciding the similarity is also displayed on the right side of the screen in the dance mode as shown in FIG. 15. In FIG. 15, for example, "Excellent" is displayed as a decision result 1912, and the result of deciding the similarity between the movement of the assigned dance at a particular time and the movement of the player 1800 at the same time is thus displayed.

In the first embodiment of the present invention, the similarity is decided and displayed at four levels. When "Excellent" is displayed the player's movements are nearly identical to the assigned dance when decided. As the decision result 1912, "Good" is displayed when the similarity is better than average but not excellent, "Poor" is displayed when there is little resemblance, and "Failure" is displayed when there is absolutely no similarity between the movements.

One method for calculating the decision is described by way of example only below as it will be obvious that other methods can alternatively be used.

According to the first embodiment, the decision result 1912 is displayed based on the result of deciding the similarity by the similarity decision unit 1016. That is, the game operation unit 1010 calculates the score based on the similarity decision unit 1016, and the game operation unit 1010 selects a decision according to the score.

For example, if the four possible ranges out of a maximum 100 points are 0 to 25, 26 to 50, 51 to 75, and 76 to 100 points, "Excellent" is selected when the calculated score is 76 to 100 points, "Good" is selected when the calculated score is 51 to 75 points, "Poor" is selected when the calculated score is 26 to 50 points, and "Failure" is selected when the calculated score is 0 to 25 points. The game image generation unit 1032 then generates an image of the selected decision.

Further, according to the first embodiment, it will be obvious to one with ordinary skill in the related art that while the four evaluation levels are used, some other plurality of levels can be alternatively used. In addition, a numerical evaluation, such as 1, 2, 3, and 4, or some set of symbols, such as "○", "Δ", and "×", could be displayed in place of letters or words.

The player 1800 is therefore able to determine the correctness of the player's movements at the decision time because a decision according to the similarity at a particular timing for deciding the similarity is displayed by means of the decision result 1912. The player 1800 can thus confirm the comparison, and play the dance game with the determination to improve the decision while continuing to dance.

A level gauge 1914 is also displayed on the left side of the screen in the first embodiment, as shown in FIG. 14 and FIG. 15. This level gauge 1914 moves up and down on the screen according to the similarity decision, and thus fluctuates according to the result of comparing the movement of the assigned dance at a particular time with the movement of the players 1800 at that same time. That is, the level of the level gauge 1914 rises as the resemblance between the player's movements and the movement of the assigned dance increases, and descends and the resemblance decreases.

It will be obvious that the operation of the level gauge 914 shall not be limited the above-noted example.

As with the above-described decision calculation, the game operation unit 1010 runs a process for calculating the score and changing the level gauge based on the calculated score. The game image generation unit 1032 generates an image based on the process. For example, if the game operation unit 1010 determines an "Excellent" decision, the level gauge 1914 is raised two bars; if the game operation unit 1010 determines a "Good" decision, the level gauge 914 is raised one bar; if the game operation unit 1010 determines a "Poor" decision, the level gauge 1914 is lowered one bar; and if the game operation unit 1010 determines a "Failure" decision, the level gauge 1914 is lowered two bars.

Alternatively, the level gauge 1914 can be raised if the score calculated by the game operation unit 1010 is higher than a certain value, and the level gauge 1914 can be lowered if the score calculated by the game operation unit 1010 is lower.

Because the level gauge 1914 thus fluctuates according to the similarity between the player's movements and the movement of the assigned dance at a particular time, the player 1800 can dance while comparing the player's movements with the assigned dance. This game apparatus 1700 can thus encourage the player 1800 to improve, and the player can play the game in earnest, using it as a learning aid.

The tempo of the assigned dance can also be set according to the fluctuation of the level gauge 1914. For example, as the level gauge 1914 drops and approaches the bottom, the tempo of the assigned dance could be slowed. That is, because the level gauge 1914 moves up and down based on the decision result returned by the similarity decision unit 1016, the tempo of the assigned dance can also be changed based on the decision result by the similarity decision unit 1016. Yet further, the game could be ended if the level gauge 1914 reaches the bottom.

The type of assigned dance can also be changed according to the change in the level gauge 1914. For example, if the level gauge 1914 exceeds a particular level, the assigned dance set in the next memorizing mode or the next dance mode could be set to a more complicated movement or a faster movement, and while if the level gauge 1914 drops below a particular level, the assigned dance could be set to an easier dance. In other words, because the level gauge 1914 moves up an down based on the decision result from the similarity decision unit 1016, the type of assigned dance can also be changed based on the decision result from the similarity decision unit 1016.

The decision results returned by the similarity decision unit 1016 can also be changed according to the change in the level gauge 1914. For example, if the level gauge 1914 drops below a certain level, assuming player 1800 movement is the same, the similarity decision unit 1016 decides that the same movement of the player 1800 has a higher similarity, and if the level gauge 1914 is above a certain level, the similarity decision unit 1016 decides that the same movement of the player 1800 has a lower similarity. In other words, because the level gauge 1914 moves up and down based on the result from the similarity decision unit 1016, the type of the assigned dance also changes based on the decision result from the similarity decision unit 1016.

As described above, the first embodiment of the present invention has two modes, a memorizing mode and dance mode.

According to the memorizing mode, as shown in FIG. 14, "Memorize" is displayed on the right side of the screen. When the player 1800 sees "Memorize" displayed, the player knows that the game apparatus is in the memorizing mode.

Further, "Memorize" is also displayed flashing to match the tempo of the assigned dance. As the tempo of the assigned dance increases, "Memorize" flashes more quickly; as the tempo of the assigned dance slows, "Memorize" flashes more slowly. The player 1800 thus knows the tempo of the assigned dance in the memorizing mode from the speed of the flashing indicator.

It should be noted that the instructor character 1956 continues dancing and the music does not stop when changing from the memorizing mode to the dance mode and from the dance mode to the memorizing mode in the first embodiment of the invention. Furthermore, if the player 1800 does not recognize the moment at which the mode changes, the player 1800 will not know when to start dancing.

Figure 16:
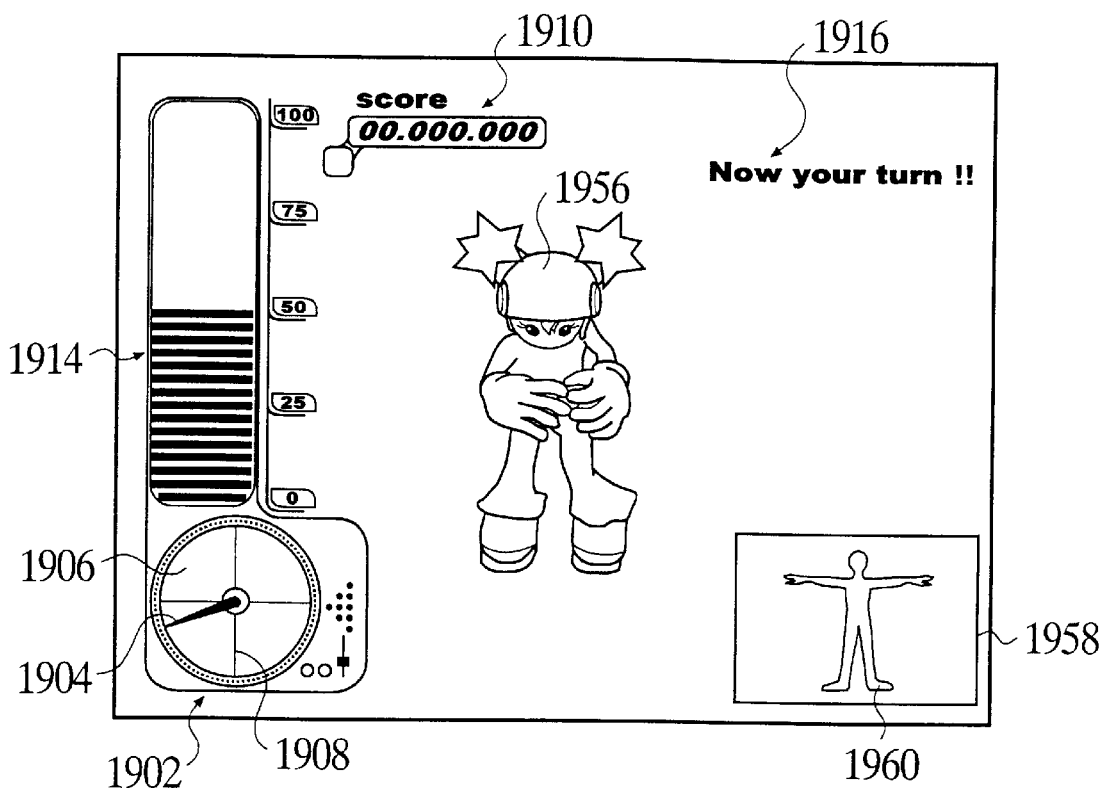
FIG. 16 is a view showing an exemplary screen in the memorizing mode, presented in the game apparatus 1700.

Therefore, as shown in FIG. 16, a dance mode start notice 1916 is displayed in the top left of the screen when in the memorizing mode to inform the player 1800 when to start dancing. By displaying "Now your turn!!" as shown in FIG. 16, the player 1800 is visually cued to the start of the dance mode. That is, the player 1800 is notified that the comparison of the movements of the player 1800 with the assigned dance by the similarity decision unit 1016 is to begin. The dance mode start notice 1916 is displayed immediately before the dance mode starts, that is, immediately before the similarity decision by the similarity decision unit 1016 starts. The game operation unit 1010 sets the display of the dance mode start notice 1916, and the game image generation unit 1032 generates the image of the dance mode start notice 1916.

It will be obvious to one with ordinary skill in the related art that rather than displaying a visual cue, the player can be notified by an announcement from the speaker 1400 that "Now your turn!!". The player 1800 can thus also be audibly notified that the dance mode is starting.

By thus displaying the dance mode start notice 1916 immediately before the start of the dance mode, the player 1800 can easily start dancing in the dance mode.

Figure 17:
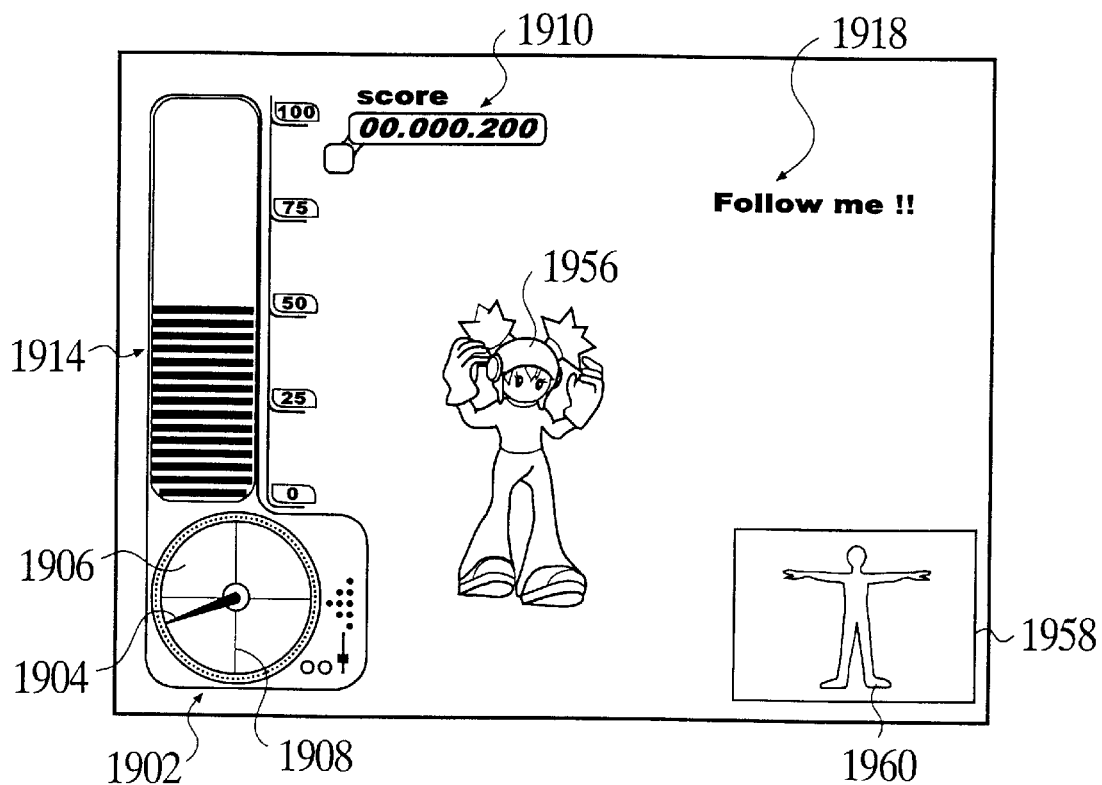
FIG. 17 is a view showing an exemplary screen in the dance mode, presented in the game apparatus 1700.

Like changing from the memorizing mode to the dance mode, the player 1800 can be notified before changing from the dance mode to the memorizing mode that the memorizing mode is to start. FIG. 17 shows an example of a notice informing the player that the memorizing mode is to start. As shown in FIG. 17, the memorizing mode start notice 1918 is presented in the top right area of the screen with the words "Follow me!!" in this example.

It will also be obvious that an audible "follow me" notice could be outputted from the speaker 1400.

By thus displaying the memorizing mode start notice 1918 in the dance mode before changing to the memorizing mode, n the player 1800 can easily know that the memorizing mode is starting.

As described above, in the first embodiment of the present invention, the dance mode starts after the memorizing mode. That is, the assigned dance is shown to the player 1800 by the instructor character 1956 dancing in the memorizing mode, and then the movements of the player's dance are decided using the same dance in the dance mode. Therefore, the player 1800 can learn the assigned dance in the memorizing mode first before attempting to perform the same dance in the dance mode for decision. Accordingly, the dance game avoids becoming a reflexive game requiring a simple reflexive reaction to displayed movements, and the players can have fun playing the dance game.

It is also possible to not display the movements of the instructor character 1956 or show the assigned dance in the memorizing mode and the dance mode. By thus not showing the assigned dance on the screen, it is difficult for even advanced players that have become accustomed to the game to perform the assigned dance. Even advanced players can therefore be motivated to enjoy playing the game.

An exemplary hardware configuration of the game apparatus 1700 according to the first embodiment is described next below with reference to FIG. 18. The game apparatus 1700 shown in FIG. 18 comprises a CPU 1600, a ROM 1602, a RAM 1604, a data storage medium 1606, a sound generation IC 1608, an image generation IC 1610, and I/O ports 1612, 1614, and 1626, wherein they are interconnected by a system bus 1616 so that data can be exchanged therebetween. A display 1618 is further connected to the image generation IC 1610, a speaker 1620 is connected to the sound generation IC 1608, a control device 1622 is connected to the I/O port 1612, a communication device 1624 is connected to the I/O port 1614, and a movement detecting device 1628 is connected to the I/O port 1626.

The data storage medium 1606 stores primarily a software program, a data for expressing displayed objects, and a game data. According to a consumer game machine, for example, a CD-ROM, a game cartridge, a DVD, or other medium is typically used as the data storage medium for storing the game program and other data, and a memory card or other medium is used as the data storage medium for storing the game (playing) data. According to an arcade game machine according to the first embodiment of the invention, such a semiconductor memory device as a ROM or other medium or a hard disk is used, in which case the data storage medium 1606 can be achieved in the ROM 1602. It should be noted that in the first embodiment, the game program 1510, the character data 1520, the assignment data 1530, the sound data 1532, the character movement data 1534, the decision reference data 1536, and the movement input program 1540 are stored to the memory.

The control device 1622 is equivalent to the operating buttons, the game controller, the operating panel, or other such device, and is the device used by the user to input the results of the decisions received while playing the game to the game apparatus. According to the first embodiment, the operating buttons 1710 are equivalent to the control device 1622.

The movement detecting device 1628 detects the player's movement and the images, and outputs the detection data. The artificial retina camera 1720 shown in FIG. 1 is equivalent to the movement detecting device 1628. It should be noted that a processing device separate from the CCD camera can be used to perform the edge detection or other image process, and detect two-dimensional movements by applying an optical flow technique to the processed image. In other words, a device other than the CPU 1600 accomplishes the image processing and the movement detection, and the processing capacity of the CPU 1600 will therefore not drop.

The CPU 1600 provides overall control of the game apparatus and various data processing operations according to signals inputted by the control device 1622, the operating system (including initialization data for the game apparatus) stored to the ROM 1602, and the game program stored to the data storage medium 1606.

The RAM 1604 is a storage means used as a operating memory by the CPU 1600, and stores particular contents from the data storage medium 1606 or the ROM 1602, or operating results from the CPU 1600.

The sound generation IC 1608 and the image generation IC 1610 are also disposed in this type of game apparatus to generate and output sounds and images appropriate to the game.

The sound generation IC 1608 is an integrated circuit for generating game sounds, such as sound effects, background music and so on, based on the data stored to the data storage medium 1606 or the ROM 1602, and the generated sounds are outputted by the speaker 1620.

The image generation IC 1610 is an integrated circuit for generating pixel data to be outputted to the display 1618 based on the image data received, for example, from the RAM 1604, the ROM 1602, the data storage medium 1606, and so on.

The display 1618 must have a light-emitting capability, and is typically a CRT, a LCD, a plasma display, or other such display device.

The communication device 1624 is for communicating various data used by the game apparatus with an external device. If the game apparatus is connected with another game apparatus, the communication device 1624 handles communicating data with the other game apparatus. The communication device 1624 could also be used to communicate game programs and data with other devices via a communications line.

A process for detecting the movement, a process for calculating the score, and a process for moving the animated characters are achieved by the data storage medium 1606 which stores the game program 1510, the movement input program 1540, the character data 1520 and the assignment data 1530, the CPU 1600 which operates according to the program, the image generation IC 1610, and the sound generation IC 1608.

It should be noted that the processes accomplished by the image generation IC 1610 and the sound generation IC 1608 can be written as software applications run by the CPU 1600, a general purpose DSP, or other such device.

As described above, the game apparatus of the present invention, shown in FIG. 1 and FIG. 2 is an arcade game machine.

In such a case as described above, the CPU, the image generator IC, the sound generator IC, and other components are mounted on a system board built in to the game apparatus. The game program 1510, the assignment data 1530, and other data related to the dance game shown in FIG. 8 is also stored in the memory as the data storage medium on the system board. The data related to the dance game is referred to below as the "stored data".

Figure 19A:
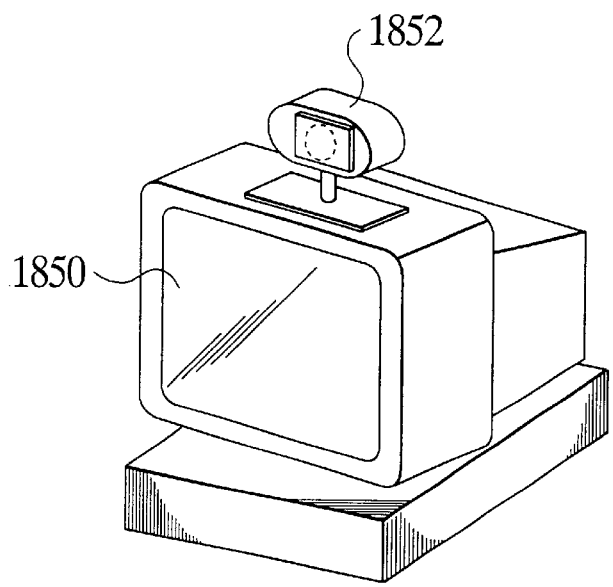
FIG. 19A and FIG. 19B are views showing some possible variations of a game apparatus to which the present invention is applied.

FIG. 19A shows an example of the present invention applied to a computer system.

In the computer system, the stored data is stored to such a data storage medium capable of being installed in and removed from the computer system, as a CD-ROM, a DVD, or the like. Therefore, the player watches the images presented on the display 1850 while dancing (moving) in front of the artificial retina camera 1852 to enjoy playing the dance game.

Figure 19B:
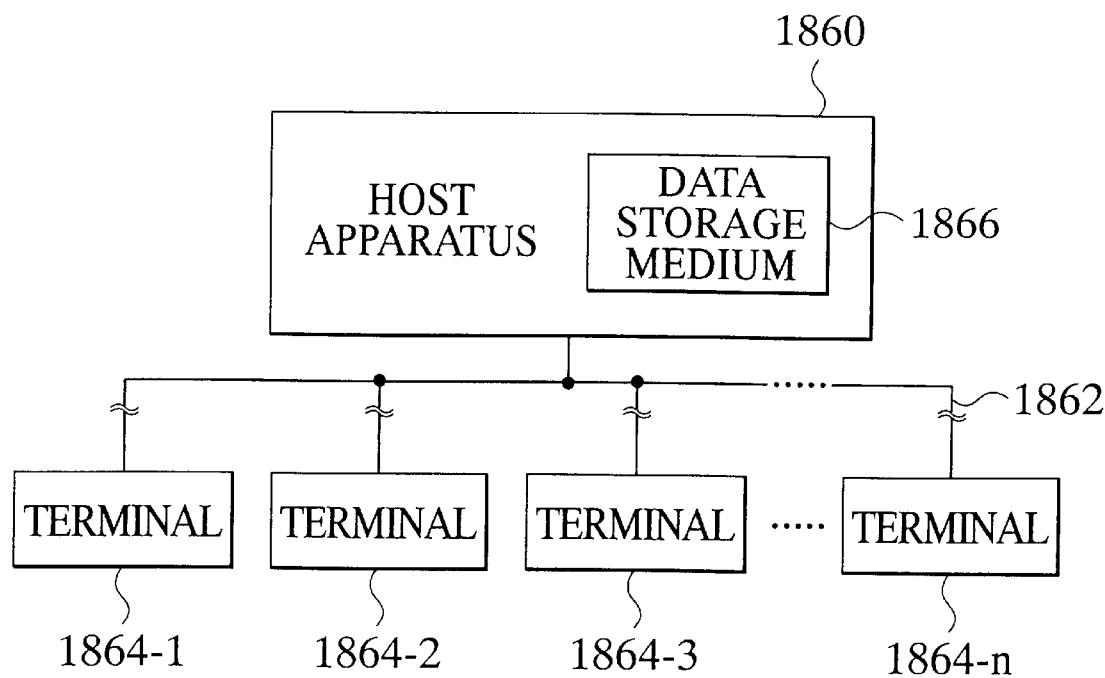

FIG. 19B shows an example of the present invention applied to a game system comprising a host apparatus 1860 and terminals 1864-1 to 1864-n connected to the host apparatus 1860 by way of a communication line 1862.

In the game system, the stored data is stored to such as a data storage medium capable of being controlled by the host apparatus 1860, as, for example, a magnetic disk device, a magnetic tape device, a memory, or the like. When each of the terminals 1864-1 to 1864-n comprises a CPU, an image generator IC, a sound generator IC, and an artificial retina camera and is capable of generating game images and game sounds (including background music) as a stand-alone device, the host apparatus 1860 sends a game program for generating the game images and game sounds, and so on to the terminals 1864-1 to 1864-n. On the other hand, when each of the terminals 1864-1 to 1864-n cannot generate game images and game sounds as a stand-alone device, the host apparatus 1860 generates the game images and game sounds and sends them to each of terminals 1864-1 to 1864-n to output them thereon.

Figure 20:
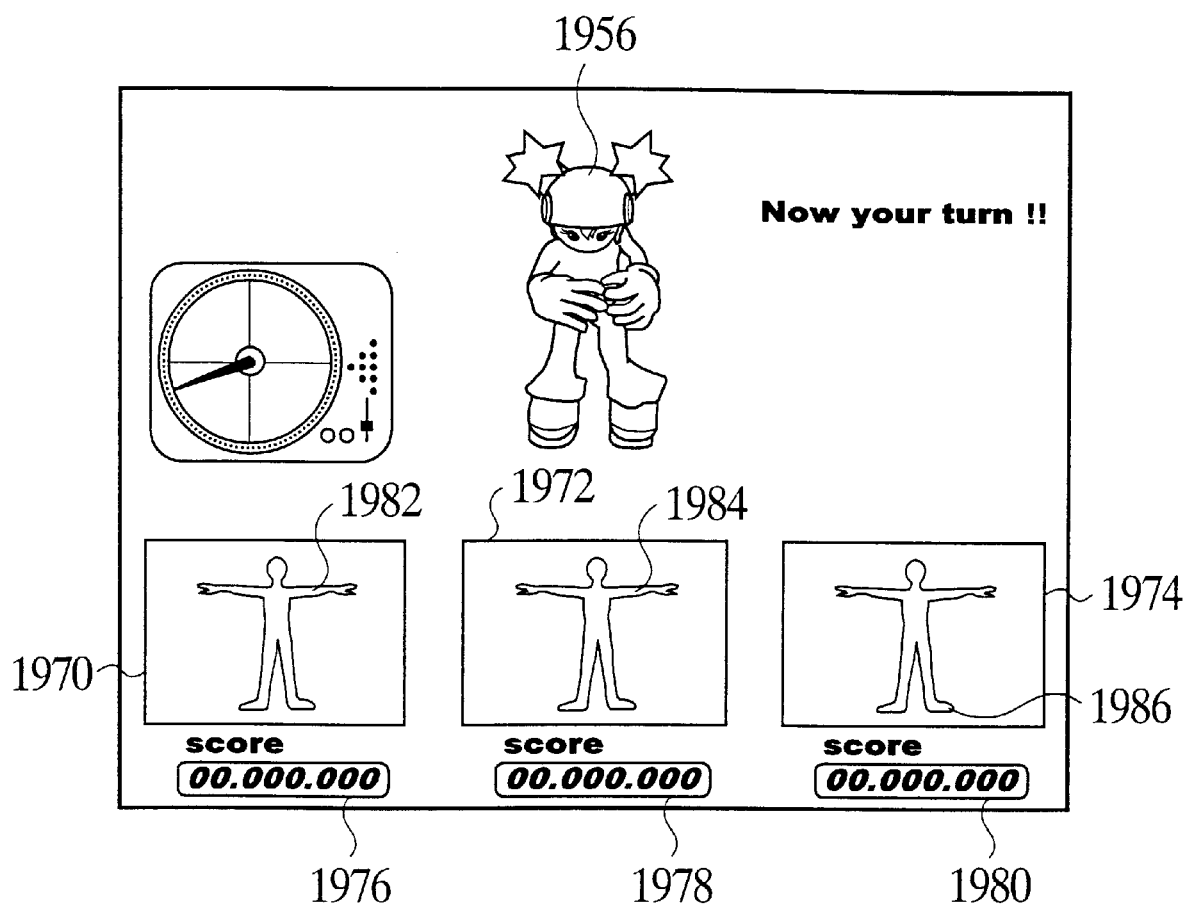
FIG. 20 is a view showing an exemplary screen presented in the game apparatus 1700.

An example of the game system is described next. FIG. 20 is an exemplary game screen presented on the display of each terminal. That is, the movements of players who are playing the dance game at each terminal are displayed at the bottom of the game screen on each terminal.

In FIG. 20, the movements of the player 1 are shown by the player character 1982 in the window 1970, the movements of the player 2 are shown as the player character 1984 in the window 1972, and the movements of the player 3 are shown as the player character 1986 in the window 1974. The cumulative score for the player 1 is also displayed in the score 1976, the cumulative score for the player 2 is also displayed in the score 1978, and the cumulative score for the player 3 is also displayed in the score 980. The movement of each player playing the dance game is thus shown on each display. In other words, the movements of other players playing the dance game are shown on one screen.

In such a game system as described above, each player learns the assigned dance by watching the instructor character 1956 performing the assigned dance in the memorizing mode, and the similarity between each player's dance and the-assigned dance is then decided in the dance mode, and the scores 1976, 1978, and 1980 change according to the result of deciding the similarity.

Each Player can thus enjoy comparing the own score with the other players' scores. Furthermore, because the movements of all players are shown on one screen, each player can check the performances of the other players while playing the game. Furthermore, each player can also compare the own form with that of the other players. Accordingly, the game system enables plural players to play the dance game competing against other players.

As described above, it will thus be known from the above description of the first embodiment of the present invention that the movement detection unit 1200 directly detects the movements of the player 1800 and thus differs from a conventional video game apparatus requiring a player to hold flags in order to detect the player's movement. Because the game apparatus according to the invention thus directly detects the movement of the player's entire body, the players can enjoy the experience of playing the game with their entire body. Further, because the player's movements (dance) is displayed while playing the game, the players can play the game while observing their own dance form on the screen. Furthermore, because the music is also outputted while the game is played, the players can also move (dance) rhythmically to the music.

It will be obvious to one with ordinary skill in the related art that the invention shall not be limited to the first embodiment described above, and can be varied in many ways without departing from the scope of the following claims.

For example, the movement of the player 1800 is displayed in the window at the bottom right of the screen on the display 1730 in the above embodiment, but a sub-monitor separated from the display 1730 could be disposed on the back panel 1780 and the player's movement can be displayed on the sub-monitor. Other people could then watch the player's movements on the sub-monitor. Further, the movements of the instructor character 1956 could also be displayed on the sub-monitor.

Further, a light could also be disposed on the side of the dance stage 1770 to illuminate the player 1800 from the side. Preferably, the light emitted by the light is a linear light so that the back panel 1780 is not illuminated. This prevents the player's shadow from being projected onto the back panel 1780 so that the artificial retina camera 1720 will not also detect the movement of the shadow.

Furthermore, one or a plurality of artificial retina cameras 1720 can be used. For example, the artificial retina cameras could be disposed to capture images of the player from two different angles so that the three-dimensional player's movements can be detected. That is, the detection angles of the artificial retina cameras are not the same with each other, and thereby the artificial retina cameras could detect the three-dimensional player's movements including a depth. Accordingly, an even more realistic dancing game can be provided by thus detecting the player's movements in the three dimensions.

Furthermore, the player character 1960 moves according to the input data obtained by the artificial retina camera 1720 in the first embodiment, but the player character 1960 could alternatively move according to, for example, the player's operation of a foot-operated buttons disposed on the dance stage 1770 or a touch panel disposed near the dance position of the player 1800. For example, the player could press the touch panel to make the player character 1960 turn its arm or play the tambourines or other musical instrument.

Furthermore, the first embodiment of the present invention has been described referring primarily to a single person playing the game, but a plurality of people could play the game at the same time. When a plurality of people play the game, a plurality of artificial retina cameras are disposed so that each camera could detect the movements of one player. One artificial retina camera could alternatively be used to detect the movements of a plurality of players. Many variations of a dance are possible with a plurality of players, and the game can thus be made more interesting.

It will be obvious to one with ordinary skill in the related art that while the first embodiment of the present invention is described above with reference to a dance game, the assigned movements other than the dance are also possible.

For example, other possible actions used for the game include movements for playing the drums or other musical instrument, pitching a ball, batting, copying an animal, caricaturing the quirks of a famous person, and so on.

Effects according to the first embodiment of the present invention will be explained, as follows.

As described above, according to the first embodiment of the present invention, the player moves according to the assigned movements displayed on the assigned movement display unit, and thereby the game is played. Thereafter, the movement detecting unit then detects the player's movements, the similarity decision unit compares the player's movements with the assigned movements, and the game operating unit processes the score on the basis of the decision result. Therefore, the game progress is then determined according to the result of processing the score. For example, if the result of processing the score is displayed, the player can enjoy comparing the player's movements with the assigned movements. Accordingly, because the player moves according to the assigned movements displayed on the assigned movement display unit, the player can enjoy experiencing playing the game using the entire body.

Further, the player can play the game while listening to music and sound effects because the sound generation unit generates at least music, sound or sound effects. And further, the player can also move in time with the music or the rhythm and the tempo of the music, and is thus helped to move rhythmically. Furthermore, if the player moves rhythmically to the sound, the music, or sound effects, other people can enjoy watching the player's perform and can be motivated to play the game, too.

And further, the player can play the game while watching the player's own movements detected by the movement detecting unit and displayed on the player movement display unit. Accordingly, the player can enjoy watching the player's own movements. The player can also confirm whether the rhythm and the tempo of the player's movements match the rhythm and the tempo of the sound or the music generated by the sound generation unit.

Furthermore, the player's movements can be detected without a complicated image processing operation because the player's movements are detected by the movement detecting unit. That is, unlike a conventional video game apparatus in which the player must hold flags, for example, in order to detect the player's movements, the game apparatus according to the present invention detects movement of the entire player's body, and the player can therefore enjoy playing the game using the whole body.

[Second Embodiment]

The game apparatus 2700 which can progress a game and process a score according to a movement using an entire body without restricting an inputting action, will be explained according to the second embodiment of the game apparatus of the present invention, with reference to FIGS. 1, 2 and 21 to 36.

A front view showing an external of a housing 2750 of the game apparatus 2700 as an arcade game machine according to the second embodiment of the game apparatus of the present invention, and a vertical sectional view of the game apparatus 2700 showing a positional relation between a player 1800 and an image sensor 2720 and a display 2730 which are disposed in the housing 2750, are the same as the front view and the vertical sectional view of the game apparatus 1700 according to the first embodiment, as shown in FIG. 1 and FIG. 2. Therefore, the views is not omitted to show in figures.

The game apparatus 2700 comprises: an image sensor 2720 (for example, an artificial retina camera) for detecting movements of the player 1800; a display 2730 for displaying a game screen; operating buttons 2710 for inputting an instruction to start a game or the like; a speaker 2760 for outputting a BGM of a dance and voices for taking rhythms; and a light 2790 for illuminations.

The game apparatus 2700 is one for progressing the dance game and calculating the score by deciding whether or not the movements of the player 1800, detected by the image sensor 2720 are identical to the movements of the dance assigned (as will be called the "assigned dance").

Further, the game apparatus 2700 progresses the game by repeating the executions of two kinds of modes of; a memorizing mode for making the player memorize the dance; and a dance mode for deciding the dance of the player.

Figure 21:
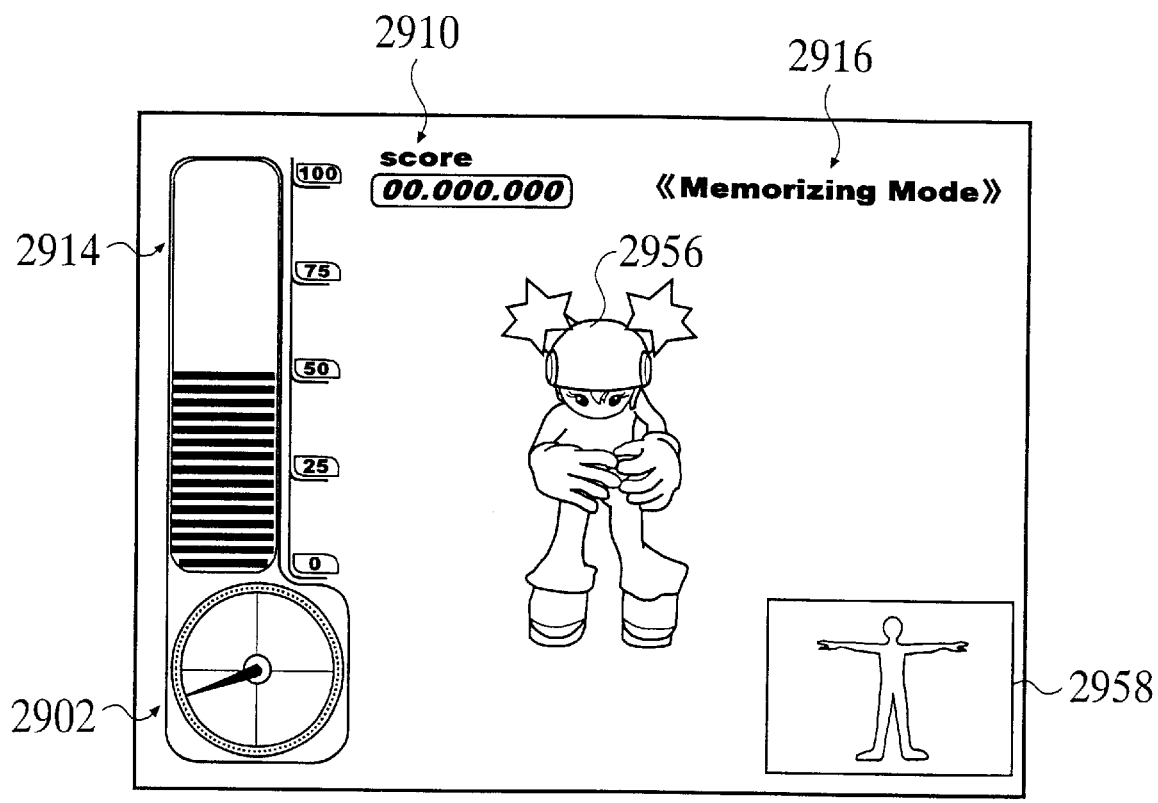
FIG. 21 is a view showing an exemplary screen in a memorizing mode, presented in the game apparatus 2700 according to the second embodiment of the present invention.
Figure 22:
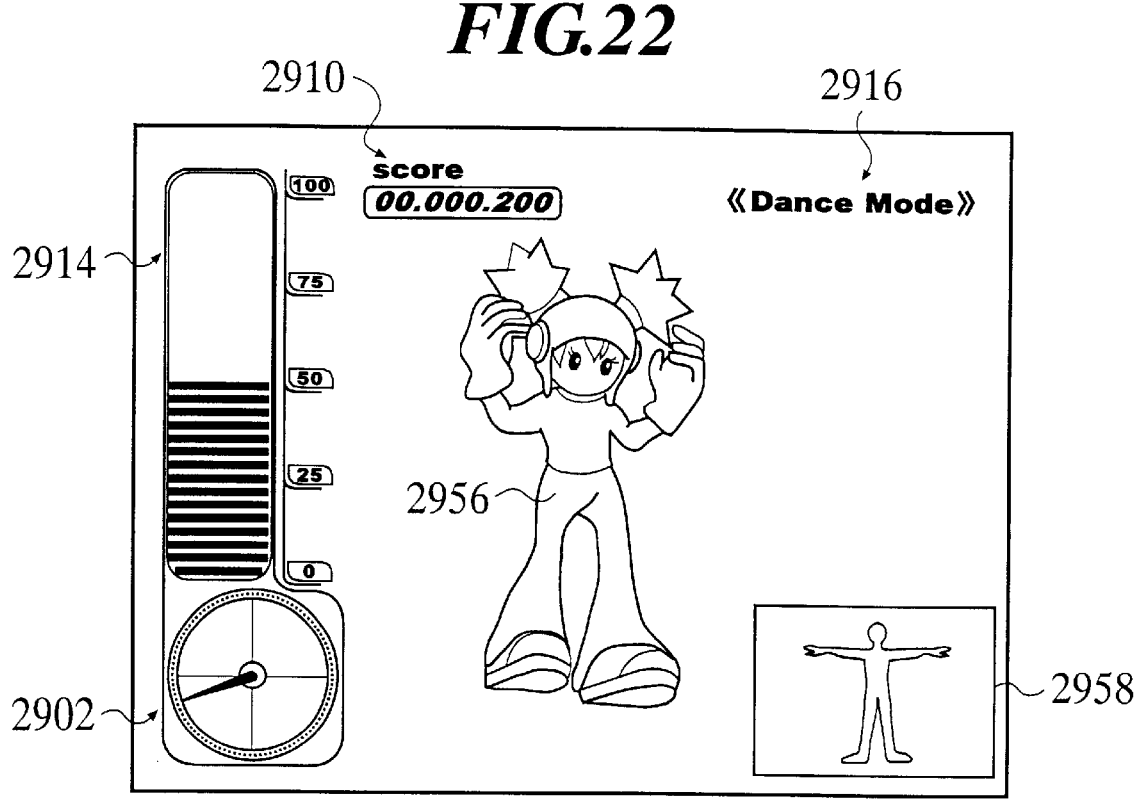
FIG. 22 is a view showing an exemplary screen in a dance mode, presented in the game apparatus 2700.
Figure 23:
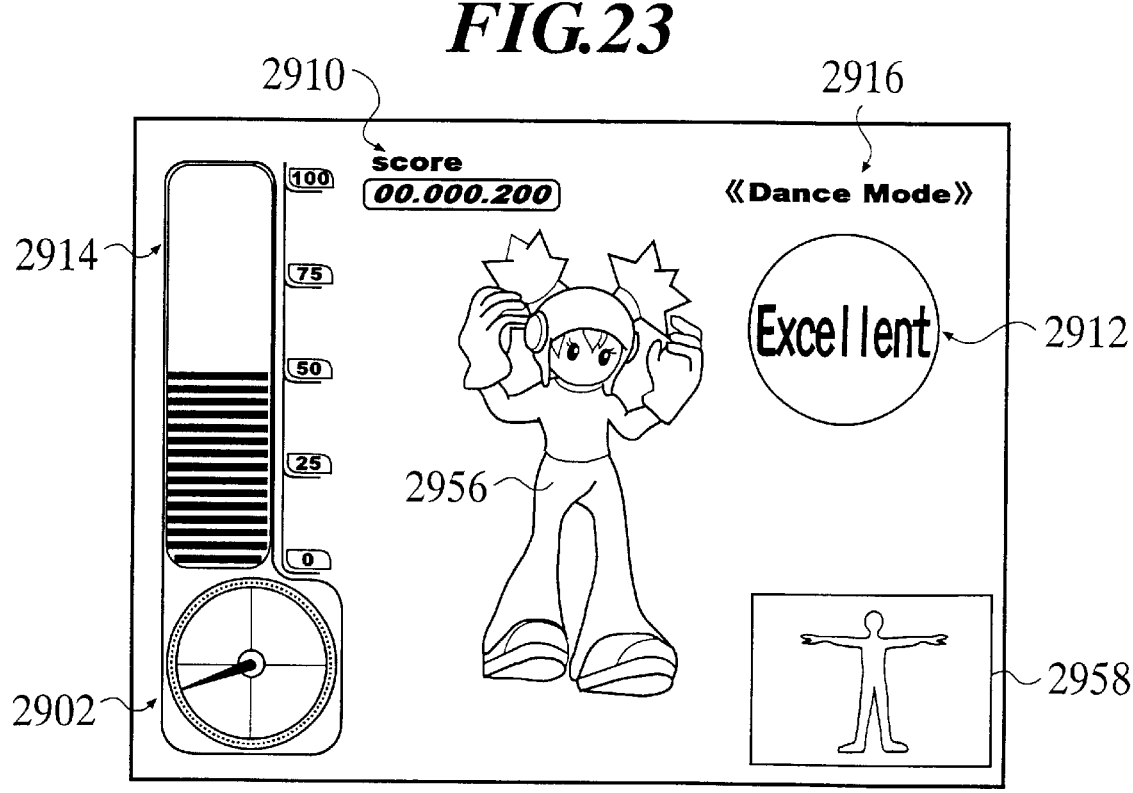
FIG. 23 is a view showing an exemplary screen in a dance mode, presented in the game apparatus 2700.

FIGS. 21 to 23 are views showing examples of the screens displayed in the display 2730 while playing the game.

FIG. 21 is a view showing one example of the screen in the memorizing mode, and a mode display 2916 is displayed on the right-hand upper portion of the screen for indicating the memorizing mode. The mode display 2916 for indicating the memorizing mode may be the mode display displayed on the right-hand upper portion of the screen as shown in FIG. 14 according to the first embodiment.

In the screen of the memorizing mode, the movements of an instructor character 2956 show the movements indicating the correct dance. As a matter of fact, the movements of the instructor character are reversed sideways, but the description will be made assuming that the movements of the instructor character are correct, for simplicity of description. While the screen of this memorizing mode is displayed, the player memorizes the correct dance.

In the screen of the memorizing mode and the dance mode, there are commonly displayed a score 2910, a level gauge 2914, a timing gauge 2902 and a window 2958.

The score 2910 indicates the accumulative score till now. The level gauge 2914 indicates the player's dance level that has accumulated the decision results of the dance (movements) of the player, and this dance level rises when the player's movements are decided to be the correct movements, and falls when the player's movements are decided to be the incorrect movements. The timing gauge 2902 is constructed such that the needle is turned at a speed according to the tempo of the dance, and plays the role of a kind of metronome. The window 2958 displays the image imitating the movement result of the player, detected by the image sensor 2720.

FIG. 22 is a view showing one example of the screen of the dance mode, and the mode display 2916 indicates that it is the dance mode.

In the screen of the dance mode, there is displayed the correct dance by the instructor character 2956, and the movement of the player is detected by the image sensor 2720 so that it is decided whether or not the player is performing the correct dance.

FIG. 23 is a view showing one example of the screen in which the decision result in the dance mode is displayed. As shown in FIG. 23, the "Excellent" for deciding the correct motions is displayed in a decision result display 2912 on the right-hand of the screen.

In the dance mode, whether or not the dance (movements) of the player is correct is decided at every given time interval, at every movement of the assigned dance, at every tempo of the BGM and so on, and the decision result is displayed. As this decision result, there are displayed not only the "Excellent" but also the "Good" for indicating that the player's movement is generally correct, the "Poor" for indicating that the player's movement is not much correct, and the "Failure" for indicating that the player's movement is incorrect, like the case according to the first embodiment, as described above.

According to the game apparatus 2700, the dance game is progressed by executing the memorizing mode and the dance mode repeatedly. For the player 1800, the free movements are reflected on the score or the like, so that the player 1800 can enjoy the dance game physically with the entire body without any restriction on the inputting actions.

Figure 24:
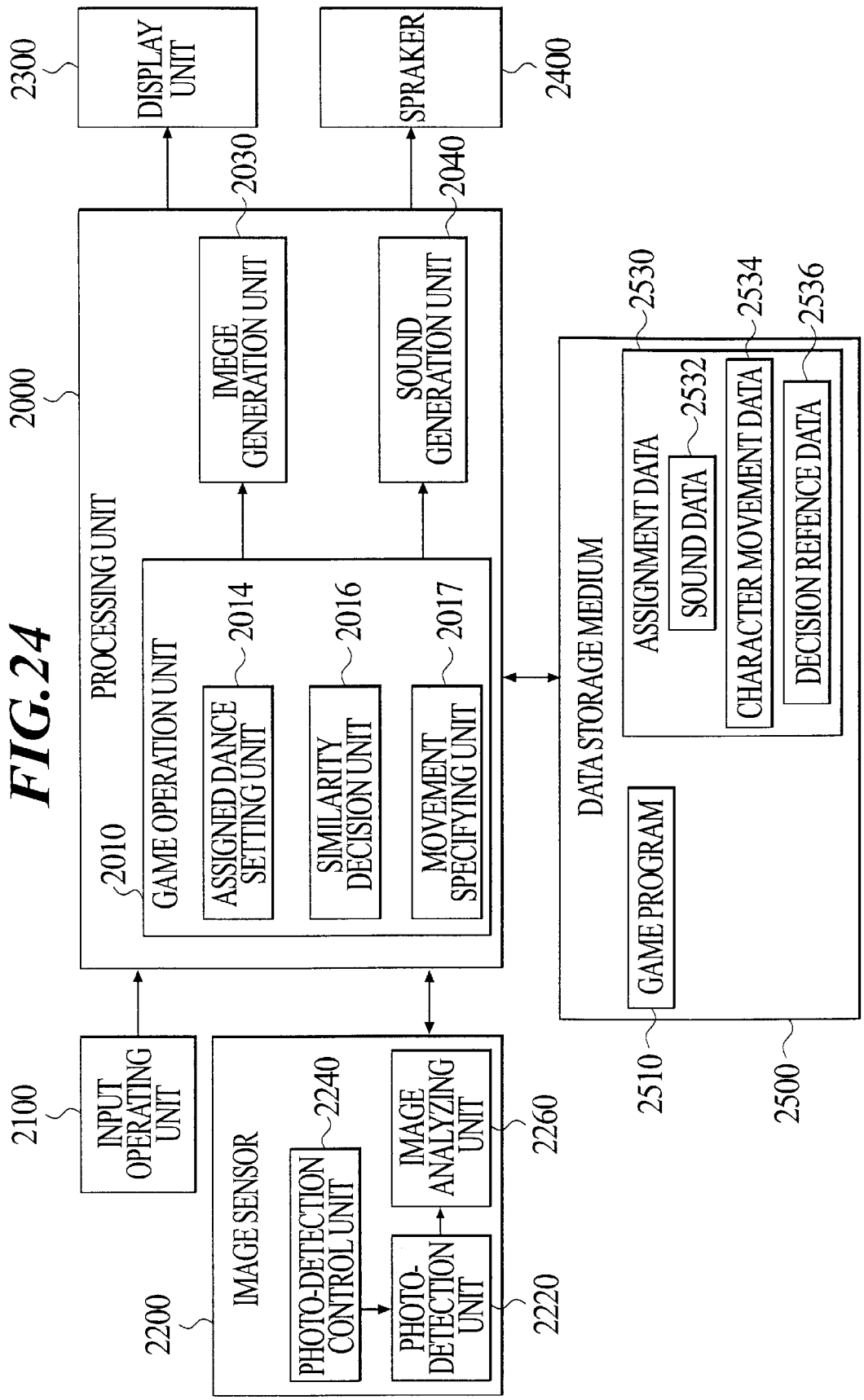
FIG. 24 is a functional block diagram of the game apparatus 2700.

Here will be described the principle for detecting and deciding the movements of the player. One example of the functional block diagram of the game apparatus 2700 of the second embodiment is shown in FIG. 24. The functional block comprises an input operating unit 2100, an image sensor 2200, a processing unit 2000, a display unit 2300, a speaker 2400 and data storage medium 2500.

The input operating unit 2100 comprises buttons for instructing and inputting the start of the dance game, the level of difficulty of the assigned dance and so on, like the input operating unit 1100 of the game apparatus 1700 according to the first embodiment. The operating buttons 2710 of the game apparatus 2700 shown in FIG. 1 corresponds to the input operating unit 2100. The instruction signals inputted by the input operating unit 2100 are outputted to the processing unit 2000.

The image sensor 2200 comprises a photo-detection unit 2220, a photo-detection control unit 2220 and an image analyzing unit 2260, and is realized by an artificial retina chip or the like, like the movement detection unit 1200 of the game apparatus 1700 according to the first embodiment. The image sensor 2720 of the game apparatus 2700 shown in FIG. 1 corresponds to the image sensor 2200.

Since the movement detecting technique by this image sensor 2200 has been developed in an earlier development, its detailed description will be omitted, but its summary will be explained so as to clarify the difference from the gist of the present invention.

The image sensor 2200 performs an image detection process for detecting the image, and a characteristic extraction process for extracting the characteristics of the image detected, wherein the extraction process is exemplified by: an edge detecting process for detecting the contour of an object in the image; a resolution varying process by reading pixels altogether; a pattern matching process for extracting the object from the image; and a random accessing process for detecting only an arbitrary portion in the image. Further, the image sensor 2200 detects the movements of the player on the basis of the processed image, but the description of the detailed processes by the image sensor 2200 will be omitted because they are like various processes by the photo-detection unit 1220, the photo-detection control unit 1240 and the image analyzing unit 1260 of the movement detection unit 1200 on the game apparatus 1700 according to the first embodiment.

Further, the image sensor 2200 detects the movements of the object. The movements thus detected by the image sensor 2200 will be described as a movement vector composed of a starting point, a direction, a magnitude and a speed.

Specifically, the image sensor 2200 monitors and detects the movement vector of the player at all times, and outputs the detected movement vectors temporarily to the processing unit 2000. On the other hand, the image sensor 2200 detects not only the movement vector but also the image itself of the player, and outputs the image of the player additionally to the processing unit 2000.

The processing unit 2000 comprises mainly a game operation unit 2010, an image generation unit 2030 and a sound generation unit 2040.

The game operation unit 2010 executes the dance game by reading a game program 2510 from the data storage medium 2500, and performs a process for causing the instructor character to move (or dance) in an object space on the basis of a character movement data 534 and a process relating to a game progress or a score calculation such as a similarity decision or the like to compare the movement vectors inputted from the image sensor 2200 and a decision reference data 2536.

The game operation unit 2010 comprises an assigned dance setting unit 2014, a movement specifying unit 2017 and a similarity decision unit 2016.

The assigned dance setting unit 2014 performs a process for determining an assigned dance, a music for the BGM and a tempo from the assignment data 2530, in accordance with the level of difficulty selected and inputted from the input operating unit 2100.

The specific process are: to determine those corresponding to the assigned dance from the character movement data 2534 for causing the instructor character to play the correct dance and the decision reference data 2536 for deciding the dance of the player; to determine the music for the BGM of the considered assigned dance from the sound data 2532; and finally to determine the tempo for arranging the speed of the assigned dance and the speed of the music. The following description will made for simplicity by assuming that the assigned dance has two kinds of a dance 1 and a dance 2.

FIG. 25 is a diagram showing one example of the character movement data 2534. In FIG. 25, the character movement data 2534 stores the position data in the object space, as corresponding to the individual parts of the instructor character every key frame, in the dance 1 and the dance 2.

For example, the position data of the frame 1 corresponding to a part a (e.g., a right elbow) of the instructor character in the dance 1 have an X-coordinate of Xa1, a Y-coordinate of Ya1 and a Z-coordinate of Za1. On the other hand, the position data of the frame 2 have an X-coordinate of Xa2, a Y-coordinate of Ya2 and a Z-coordinate of Za2. Here, the movements of the instructor character between the individual frames are interpolated.

FIG. 26 is a diagram showing one example of the decision reference data 2536. In FIG. 26, the decision reference data 2536 stores the decision reference data of the direction, the magnitude and the speed corresponding to the individual regions in the dance 1 and the dance 2 at every given timings (or times). Here, the regions are the four regions divided into four from the range which can be detected by the image sensor 2200.

Figure 27:
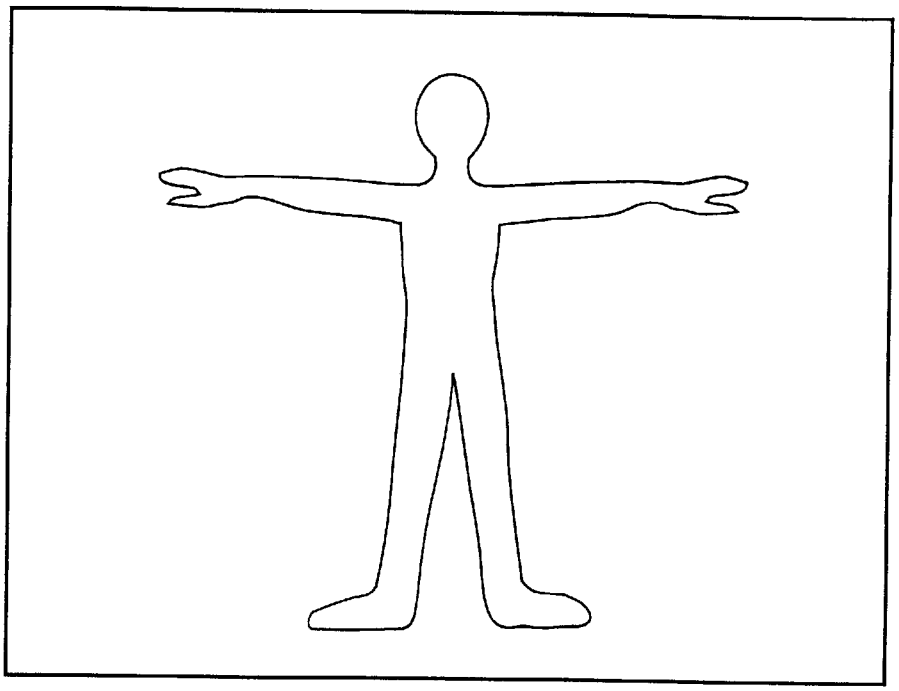
FIG. 27 is a view showing a range which can be detected by an image sensor 2200.
Figure 28:
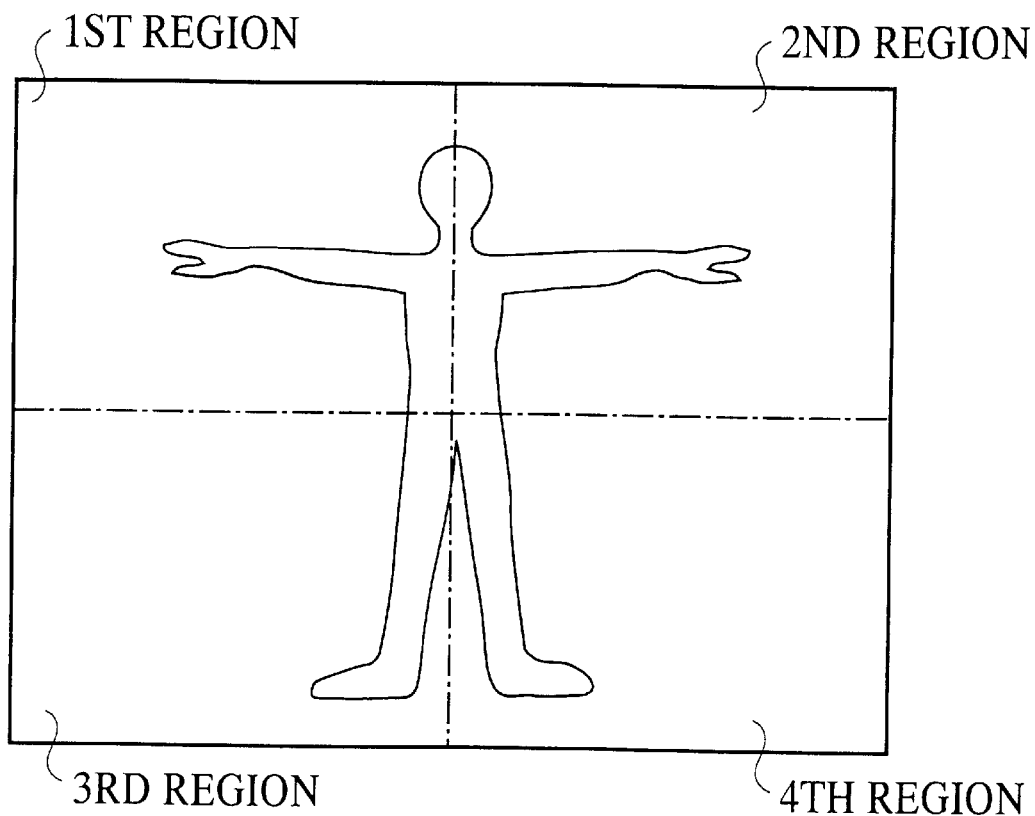
FIG. 28 is a view showing a first region to a fourth region.

The range to be detected by the image sensor 2200 is specified in FIG. 27. In this range: the left-hand upper region will be called the first region; the right-hand upper region will be called the second region; the left-hand lower region will be called the third region; and the right-hand lower region will be called the fourth region. FIG. 28 shows the partitions of the individual regions by single-dotted lines. Here, FIGS. 27 and 28 show the contour of the player conveniently for defining the detection ranges of the image sensor 2200. As a matter of fact, however, what is detected by the image sensor 2200 is the movement vectors. Where the player has no action in FIGS. 27 and 28, therefore, the movement vectors are not detected.

In FIG. 26, the decision reference data of the first region in the dance 1 at the time t1 have a direction $\alpha 11$, a magnitude β11 and a speed γ11. On the other hand, the decision reference data at the time t2 have a direction α12, a magnitude β12 and a speed γ12. Thus, the decision reference data are stored for every regions, because the degree of similarity to the dance (movement) of the player is decided for every region, as will be described hereinafter.

The given timings (times) such as the time t1 and the time t2 are the timings at which the dance of the player is decided, and the movements of the player are decided on the basis of the decision reference data at those timings and at every regions. Therefore, those given timings (times) can be adjusted to the tempos of the assigned dance or the music, determined by the assigned dance setting unit 2014, and can be arbitrarily determined for every given time intervals. If these given timings are adjusted to the tempos of the assigned dance or the music, it is possible to decide whether or not the movements of the player accord to the tempos.

The movement specifying unit 2017 performs the process for specifying the movement vectors corresponding to the individual regions, from the movement vectors temporarily inputted from the image sensor 2200. The data of the movement vectors, detected for every region, will be called the "player's movement data".

FIG. 29 is a diagram showing one example of the player's movement data.

Figure 30A:
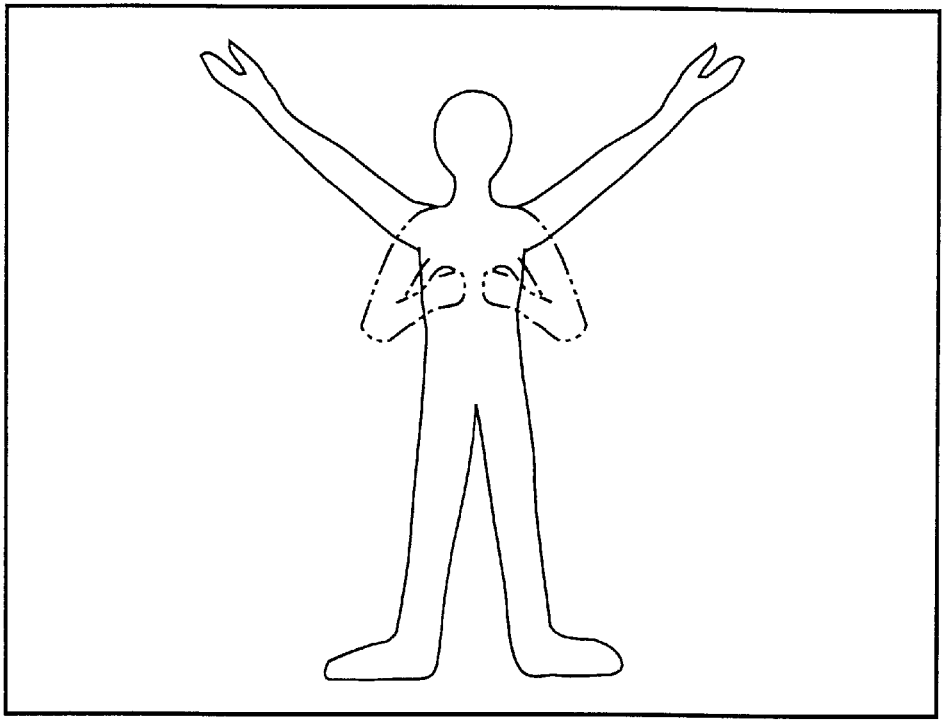
FIG. 30A is a view showing one example of the case in which a player performs a plurality of movements.
Figure 30B:
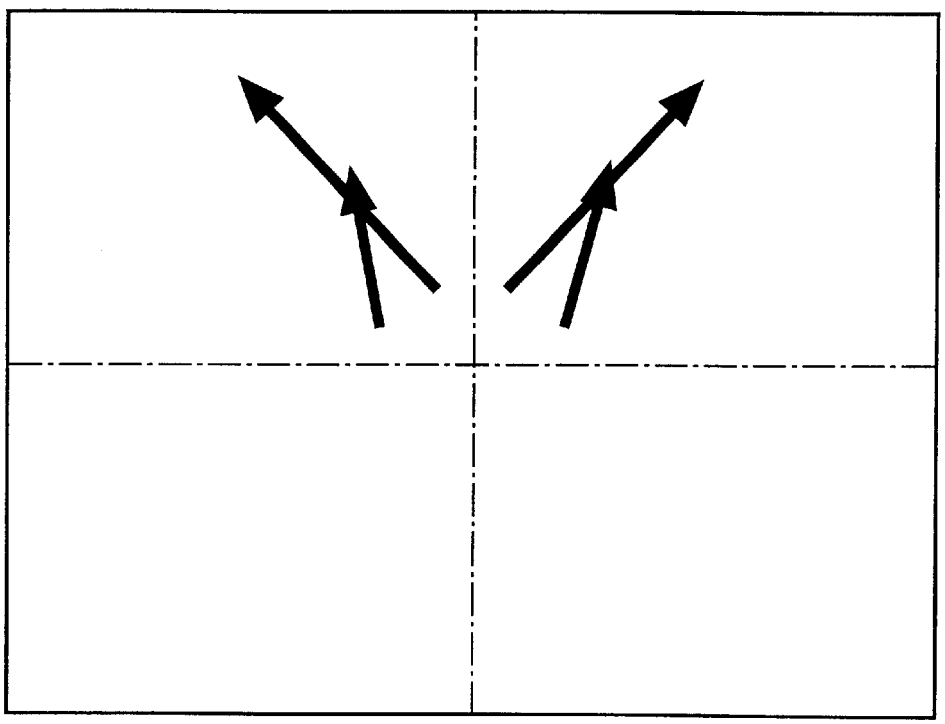
FIG. 30B is a view showing the vectors of the player's movements shown in FIG. 30A, detected by the image sensor 2200.

When the player performs a plurality of movements, as exemplified by FIG. 30A, in which the player raises two arms concurrently, the image sensor 2200 detects a plurality of movement vectors relating to the elbows and two hands of the arms, as indicated by arrows in FIG. 30B. In other words, the number of movement vectors inputted from the image sensor 2200, is dynamically varied according to the movements of the player.

The movement specifying unit 2017 specifies what of the first to fourth regions the movement vectors correspond to, from the starting points of the movement vectors. When the plurality of movement vectors present in the same region, the movement specifying unit 2017 specifies one movement vector in terms of the direction, the magnitude and the speed of the movement vector. Here, for the movement vectors across the regions, the movement vectors for each region can be specified by the aforementioned method. However, the movement vectors across the regions may be divided for every region so that the divided movement vectors may be specified as those corresponding to the individual regions.

Figure 31A:
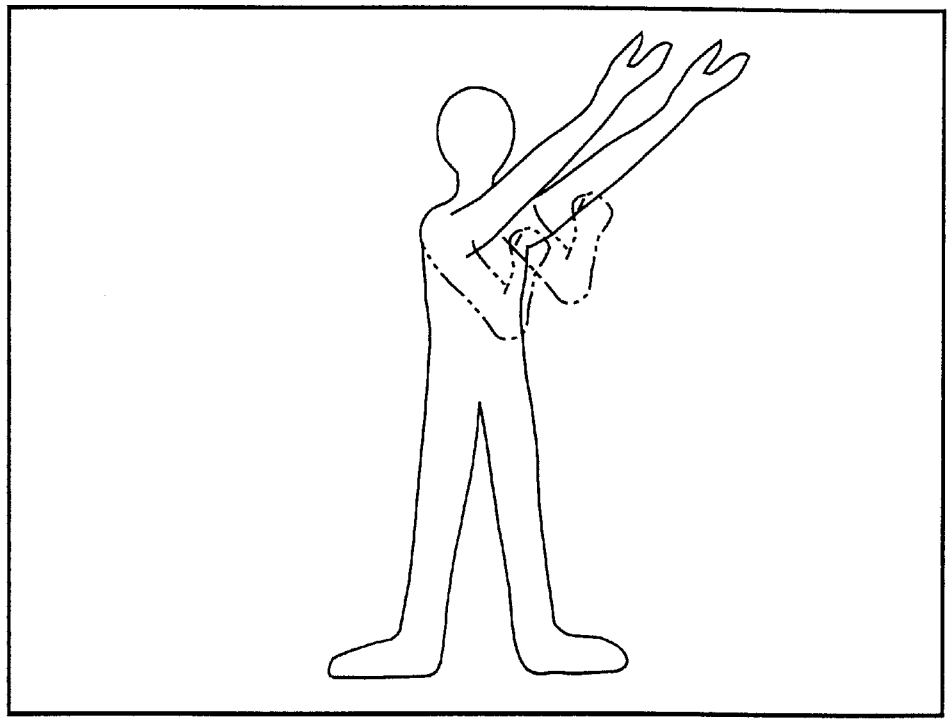
FIG. 31A is a view showing one example of the case in which a player performs a plurality of movements in the same region.
Figure 31B:
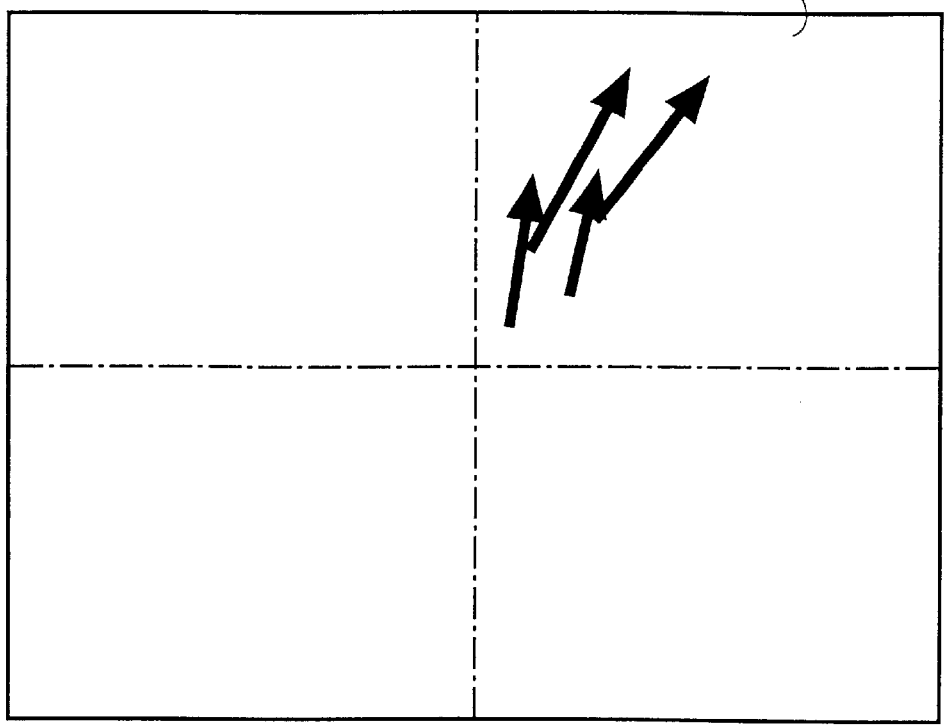
FIG. 31B is a view showing the vectors of the player's movements shown in FIG. 31A, detected by the image sensor 2200.

For example, when the two arms are concurrently extended in the second region, as shown in FIG. 31A, the image sensor 2200 outputs, for example, a plurality of movement vectors relating to the elbows, the two hands of two arms and so on, as indicated by the arrows in FIG. 31B, as the movement vectors of the two arms.

Thereafter, the movement specifying unit 2017 specifies such one of those movement vectors as located in the second region, according to given conditions, such as the movement vector having the largest magnitude, the movement vector having moved at the highest speed, or the movement vector having moved the closest to the transverse directions.

The direction, the magnitude and the speed of the movement vectors, as detected by the movement specifying unit 2017, at the individual regions are employed as the player's movement data. In other words, these player's movement data are temporarily updated.

According to the movement specifying unit 2017, it has been described that one movement vector is specified where a plurality of movement vectors are concurrently present in each region. However, it is arbitrary to take an average among the movement vectors existing in that region. In case of the dance in which two or more movements are concurrently performed in the same region, it is arbitrary to prepare the decision reference data 2536 corresponding to the individual movements at the considered timing and to set the number of the player's movement data for the considered region to the number corresponding to the number of the considered movements. As a result, the dance performing two or more actions concurrently in the same region can be decided more precisely.

The similarity decision unit 2016 decides the degree of similarity between the decision reference data 2536 corresponding to the assigned dance and the player's movement data. When the assigned dance is the dance 1 and it is the time t1, for example, the similarity between the decision reference data 2536 of the dance 1 at the time t1 and the player's movement data at the considered point of time is decided for every regions.

The specific method of deciding the similarity can be exemplified by the pattern matching method of considering the direction, the magnitude and the speed synthetically or the method of deciding the similarity based on only the element of the direction for the dance of beginners but of deciding the similarly based on all the elements of the direction, the magnitude and the speed for the dance of the senior players. Thus, the invention can be applied to any of those methods.

In the similarity decision, on the other hand, the timing may be adopted as one element. More specifically, where the movements are not timed in the least, a strict decision may be made (by 0 point, for example). Within an allowable time, the score of the decision result may be halved. If well timed, the score of the decision result may be doubled.

For example, by this timing is adjusted to the tempo of the music, it is possible to be decided whether or not the movement of the player accords to the tempo.

Figure 33:
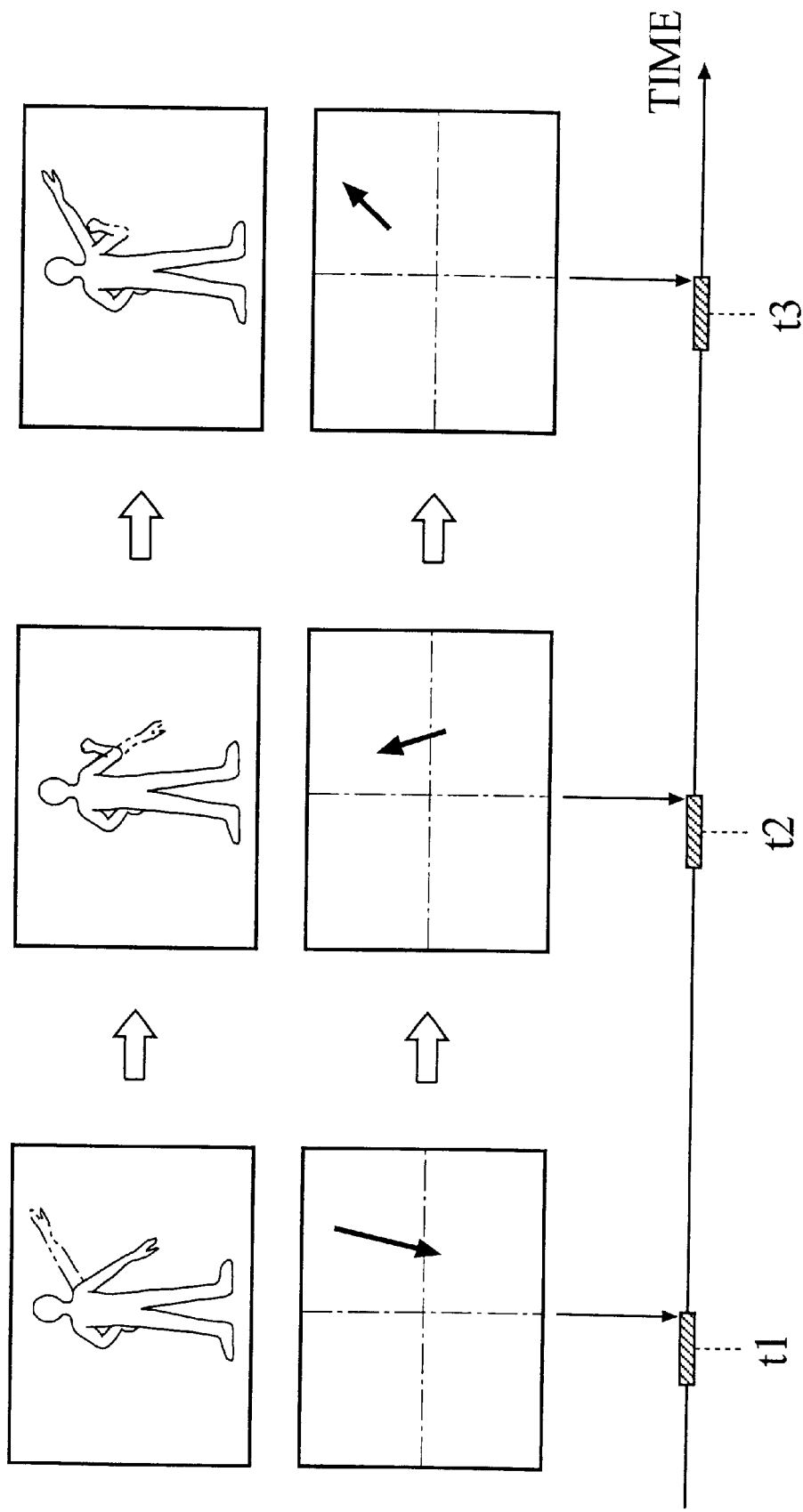
FIG. 33 is a view for explaining a decision of similarity on movements which are not timed but within an allowable time.

FIG. 32 shows an example of the timed case, and FIG. 33 shows an example of the case in which the movement is not timed but detected within the allowable time. In both FIGS. 32 and 33: the lapse of time is indicated in the rightward direction; the thick portions on the time axis indicate the time band of the allowable time; and the times t1, t2 and t3 indicate the timings.

In FIGS. 32 and 33, the player performs the movements to lower the extended arm, then to bend the elbow of the lowered arm, and further to extend the bent arm. The image sensor 2200 detects the movement vectors (arrows), as corresponding to the individual movements. At this time, in FIG. 32, there are performed the movements which are timed to the times t1, t2 and t3. FIG. 33 shows that the movements are performed out of the timings but within the allowable times t1, t2 and t3.

The realizing method using the timings as one element for deciding the degree of similarity is based on the following principle.

The similarity decision unit 2016 holds the decision reference data 2536 at the given timing (at the time t2, for example) considered, before that the timing (the time t2) comes. When the time then reaches within the allowable time period of the given timing (the time t2) considered, the similarity between the decision reference data 2536 and the player's movement data is started. Moreover, the decision results are temporarily stored with the time in the memory or the like. However, where a decision result having a higher similarity than the stored one, the stored decision result is updated. This processing is continued till the allowable time elapses. After lapse of the allowable time, the similarity decision unit 2016 decides whether or not the time of the stored decision result coincides with the given timing (the time t2), and the decision result is changed according to the coincidence with the given timing. In other words, the coincidence weighs the similarity of the decision result. The invention is realized by the method thus far described.

The image generation unit 2030 performs the processes for generating an image of the game execution screen, as has been described with reference to FIGS. 21 to 23.

The process by the image generation unit 2030 are: to generate the image as viewed from a given view point, of the instructor character dancing in the object space set by the game operation unit 2010; to generate the image for displaying the score 2910 and the timing gauge 2902; and to generate the window 2958 for displaying the movement result in an imitation. The images generated are displayed in the display unit 2300.

The sound generation unit 2040 performs the processes for generating music on the basis of the sound data 2532 determined by the assigned dance setting unit 2014, at the tempo determined by the assigned dance setting unit 2014, and for outputting the music to the speaker 2400. Here, the sound data 2532 has been described as the music for the BGM of the assigned dance but may be exemplified by voices for the rhythm. In this case, the sound generation unit 2040 generates the voices according to the tempo determined by the assigned dance setting unit 2014.

The aforementioned functions of the processing unit 2000 can be realized by the hardware such as the CPU of the CISC type or the RISC type, the DSP, or an IC dedicated to the image fetching, like the processing unit 100 of the game apparatus 1700 according to the first embodiment.

The display unit 2300 displays the image an so on, generated by the image generation unit 2030, and is realized by, for example, the CRT, the LCD, the plasma display or the like. The display 2730 in the game apparatus 2700 of FIG. 1 corresponds to the display unit 2300.

The data storage medium 2500 stores not only the game program 2510 relating to the dance game but also the assignment data 2530 containing the sound data 2532, the character movement data 2534 and the decision reference data 2536, and so on. The functions of the data storage medium 2500 can be realized by the hardware such as the CD-ROM, the game cassette, the IC card, the MO, the FD, the DVD, the memory or the hard disk, like the data storage medium 1500 of the game apparatus 1700 according to the first embodiment.

As described above, the processing unit 2000 performs the various operations on the basis of the program, data, and so on, stored in the data storage medium 2500.

Figure 34A:
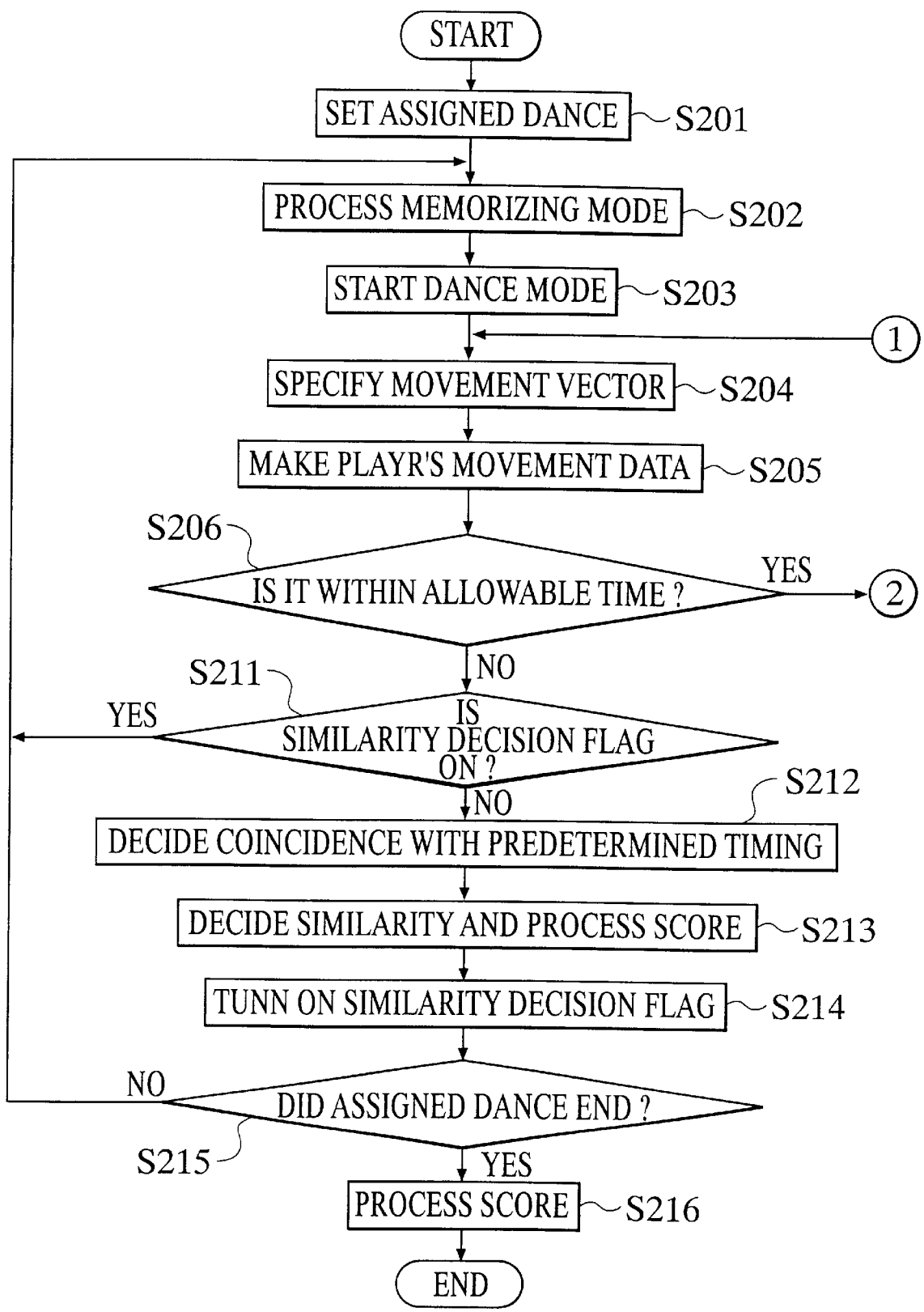
FIG. 34A and FIG. 34B are flow charts of a process of the game apparatus 2700.
Figure 34B:
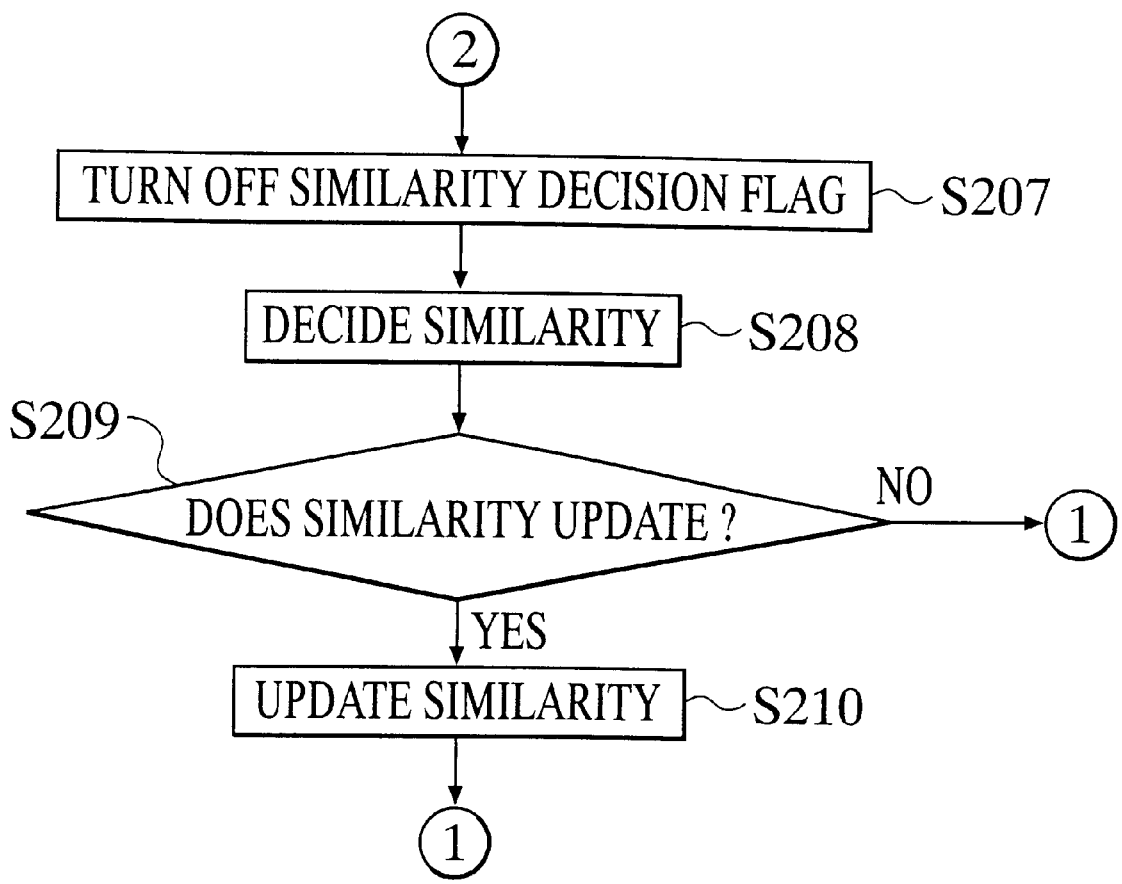

Here will be described the processes of the game apparatus 2700 of the second embodiment. FIGS. 34A and 34B are flow charts showing one example of the process in the game apparatus 2700 of the second embodiment.

In FIGS. 34A and 34B, when the game level of difficulty and so on is inputted from the input operating unit 2100, the assigned dance setting unit 2014 sets an assigned dance according to the game level of difficulty (step S201).

At this time, the assigned dance setting unit 2014 determines the sound data 2532, the character movement data 2534, the decision reference data 2536, corresponding to that question dance and the tempo of the assigned dance and the music for the BGM.

Next, by the game operation unit 2010 and the image generation unit 2030, there are performed the processes on the memorizing mode, i.e., the processes for displaying the movements of the assigned dance by the instructor character (step S202).

Thereafter, when the dance mode is started (step S203), the movement specifying unit 2017 specifies the movement vectors corresponding to each region from the movement vectors inputted from the image sensor 2200 (step S204), to make the player's movement data (step S205).

Next, when the similarity decision unit 2016 decides that the time is within the allowable time for deciding the similarity (step S206; YES), the routine transfers to the process of the step S207 in FIG. 34B, as following the arrow 2, and then the similarity decision unit 2016 turns OFF the similarity decision flag (step S207), and decides the similarity by comparing the player's movement data and the decision reference data 2536 (step S208). Here, the similarity decision flag is a flag for deciding whether or not the similarity is decided, and is stored in the memory or the like.

Thereafter, the similarity decision unit 2016 decides whether or not the similarity decided at the step S208 is to be replaced by the decided similarity or updated, so as to determine the highest similarity in the allowable time (step S209). When no updating is decided (step S209; NO), the routine transfers to the process of the step S204 in FIG. 34A, as following the arrow 1, and when the updating is decided (step S209; YES), the similarity is updated (step S210) and the routine transfers to the process of the step S204 in FIG. 34A, as following the arrow 1. Here, the similarity is stored together with the decided time in the memory or the like.

When the similarity decision unit 2016 decides that the time is not within the allowable time (step S206; NO), the similarity decision unit 2016 decides whether or not the similarity decision flag is ON (step S211). When the decision is ON (step S211; YES), the routine transfers to the process of the step S202.

On the other hand, when the decision is not ON (step S211; NO), the similarity decision unit 2016 decides the decision time of the similarity decided at the step S208 or updated at the step S209 is coincide with a predetermined timing (step S212). By changing the similarity according to the coincidence, moreover, the similarity at that predetermined timing is decided, and the decision result is displayed on the display unit 2300 through the image generation unit 2030. Thereafter, the game operation unit 2010 processes the score relating to the decided similarity (step S213).

Next, the similarity decision unit 2016 turns ON the similarity decision flag (step S214), and after the game operation unit 2010 decides whether or not the assigned dance has ended (step S215). When the decision is NO (step S215; NO), the routine transfers to the process of the step S202. On the other hand, when it is decided that the assigned dance is ended (step S215; YES), the score process to calculate and display the final point is performed (step S216), to end the game.

Next, one example of the hardware configuration capable of realizing the game apparatus 2700 according to the second embodiment will be described with reference to FIG. 35. The game apparatus 2700 shown in FIG. 35, a CPU 2600, a ROM 2602, a RAM 2604, a data storage medium 2606, a sound generation IC 2608, an image generation IC 2610 and I/O ports 2612, 2614 and 2628, wherein they are connected with one another by a system bus 2616 so that the data can be mutually inputted and outputted therebetween. Moreover: a display 2618 is connected with the image generation IC 2610; a speaker 2620 is connected with the sound generation IC 2608; a control device 2622 is connected with the I/O port 2612; a communication 2624 is connected with the I/O port 2614; and an image sensor 2628 is connected with the I/O port 2628.

The data storage medium 2606 stores mainly the program, the image data for expressing a display, the sound data, the play data and so on, and corresponds to the data storage medium 2500 shown in FIG. 24. For example, like the data storage medium 1606 of the game apparatus 1700 according to the first embodiment, when the second embodiment is realized as the computer, the data storage medium for storing the game program and so on is exemplified by the CD-ROM, the DVD, or the like. When as the consumer game machine, additionally, the game cassette or the like, is used as the data storage medium. Further, as the arcade game machine, the memory such as the ROM or the hard disk is used, and in the case, the data storage medium 2606 is the ROM 2602.

The control device 2622 corresponds to the game controller, the control panel or the like, for the player to input the instructions of the difficulty, the play start of the game and so on, to the game apparatus, like the control device 1622 of the game apparatus 1700 according to the first embodiment.

The CPU 2600 controls the entire apparatus and processes the various data, according to the program stored in the data storage medium 2606, the system program (e.g., the initialization information of the game apparatus) stored in the ROM 2602, the signals inputted from the control device 2622, and so on, like the CPU 1600 of the game apparatus 1700 according to the first embodiment.

The RAM 2604 is storage means to be used as the working area of the CPU 2600 and is stored with the given contents of the data storage medium 2606 and the ROM 2602, the processed results of the CPU 2600, and so on, like the RAM 1604 of the game apparatus 1700 according to the first embodiment.

The game apparatus further comprises the sound generation IC 2608 and the image generation IC 2610 so that it can output the proper game sound and image, like the sound generation IC 1608 and the image generation IC 1610 of the game apparatus 1700 according to the first embodiment.

The sound generation IC 2608 is an integrated circuit for generating the music of the BGM or the like, the voices for the rhythms of the dance, and so on, on the basis of the data stored in the data storage medium 2606 or the ROM 2602, and the generated music or the like is outputted by the speaker 2620.

The image generation IC 2610 is an integrated circuit for generating the pixel data to be outputted to the display 2618, on the basis of the image data sent from the RAM 2604, the ROM 2602, the data storage medium 2606 or the like.

The image sensor 2628 is constructed of the artificial retina chip or the like and detects the movements of the player, the image of the player, and so on.

The display 2618 and the communication device 2624 are constructed and have functions like the display 1618 and the communication device 1624 of the game apparatus 1700 according to the first embodiment, respectively. Therefore, their descriptions will be omitted.

The various processes as having been described with reference to FIGS. 22 to 33, are realized by the data storage medium 2606 which stores the program for performing the processes and so on, shown in the flow chart of FIG. 34, and by the CPU 2600, the image generation IC 2610 and the sound generation IC 2608 which act according to said program, and so on.

Here, the processes to be performed in the image generation IC 2610 and so on may be performed in the software manner by the CPU 2600 or a general-purpose DSP or the like.

Now, the game apparatus 2700 according to the second embodiment can be applied to the arcade game machine as shown in FIG. 19A and FIG. 19B, like the case of the game apparatus 1700 according to the first embodiment. Herein, the description of the case wherein the game apparatus 2700 is applied to the arcade game machine will be omitted.

As described hereinbefore, according to the game apparatus 2700 according to the second embodiment of the present invention, the free movements of the player are reflected as they are on the score or the like. Accordingly, it is possible to provide a physical game apparatus wherein the player uses the entire body and has no restriction on the inputting actions.

Here, the invention should not be limited to the second embodiment thus far described but can be modified in various manners.

For example, the foregoing second embodiment has been described by exemplifying the dance game. Since it is one gist of the present invention how the movements of the player are detected and how the similarity of the assigned movements is decided. Accordingly, the present invention can be applied to such a game as, for example, a gesture game, wherein the game is required to decide the movements of the player.

Further, the description has been made assuming that the range to be detected by the image sensor 2200 is partitioned into the four regions. However, the regions may be either four regions or more so that the similarity for a finer movement may be decided, or less than four regions. And further, the number of regions may be so changed midway of the assigned dance that the region is one in an intermission of the music. Furthermore, the number, the size and the position of the regions may be changed according to the kind of the assigned dance, or the standing position or the lengths of the limbs of the player, detected by the image sensor.

Furthermore, the description of specifying the movement vectors every region, has been made. However, the four movement vectors may be specified in the order of the larger movements or the higher speeds of the movements of all the regions.

Furthermore, the movements of the player have been shown and described only on the movements of arms. However, the movements should not be limited to those of the two arms or feet but may be exemplified by the sideway movements, squats or jumps of the player. No matter what the movements of the player might be, the similarity of the movements is decided on the basis of the movement vectors relating to those movements so that the movements of the player are not limited.

Furthermore, it has been explained that the decision of the similarity is described, first, by determining the highest decision result of similarity within the allowable time and next, by weighing it according to the coincidence with the given timing, but vice versa. Specifically, first, the coincidence with the given timing may be decided within the allowable time and next, the similarity of the movement vectors having the high coincidence may be decided.

Furthermore, according to the body shape such as the height or the lengths of the limbs of the player, it is arbitrary to change the decision result of the similarity. In a method for realizing this, first, an announcement is made before the start of the dance game to ask the player to take a pose in which the two arms and the two feet are extended, and the game operation unit 2010 detects the height and the lengths of the limbs of the player on the basis of the image, wherein the player extends the limbs, as detected by the image sensor 2200. Specifically, the length of the arms and the height of the player are decided from the range of the image, as occupied by the player, such that the arm length is decided from the sideway width of that range whereas the height is decided from the height of the range. Next, the similarity decision result of the dance (movements) in the dance mode is weighed in accordance with the height or the length of the limbs of the player. Accordingly, the method can be realized, as described above.

Furthermore, the similarity decision by the similarity decision unit 2016 is performed for each region, so that the decision results of the individual regions may be displayed.

Figure 36:
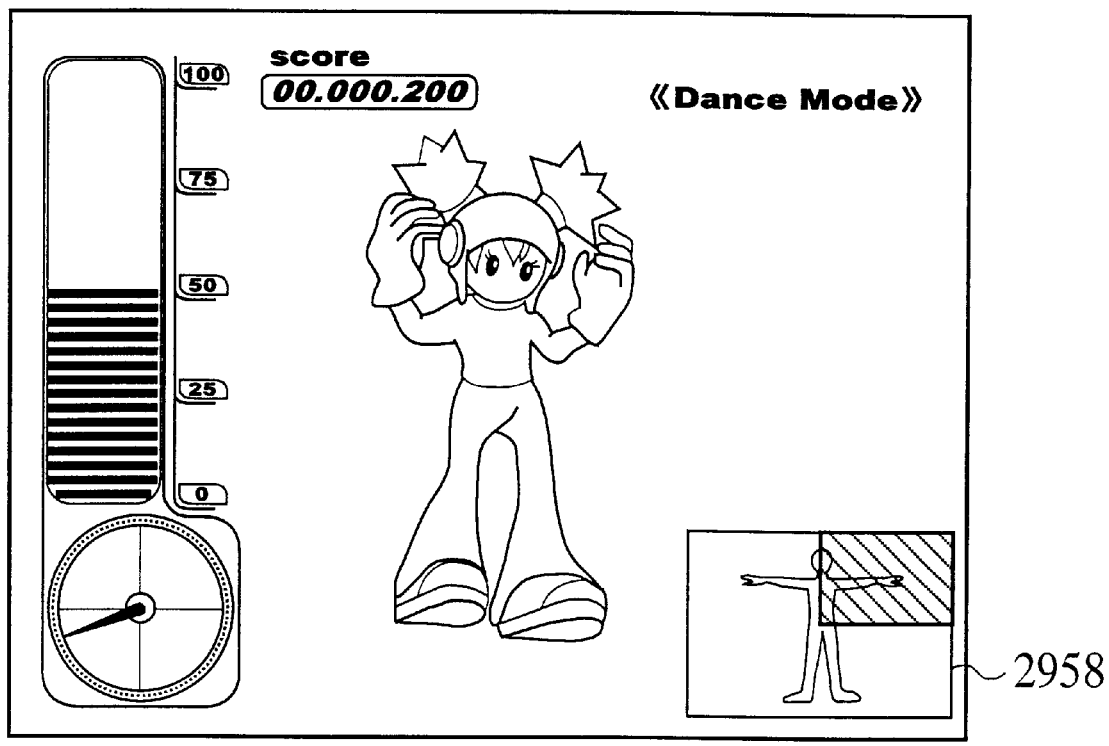
FIG. 36 is a view showing an exemplary screen of the case in which the decision result of each region is displayed.

For example, as in one example of the screen shown in FIG. 36, the display color of the considered region of the window 2958 may be changed according to the decision result of each region, or the considered region may display such a mark as "○" and "×". In this case, the player can instantly recognize where the movement of the region of the dance just played is bad or good.

Effects according to the second embodiment of the present invention will be explained, as follows.

According to the present invention according to the second embodiment, the free movements of the player are reflected as they are on the score or the like. Accordingly, It is possible to provide a physical game apparatus wherein the player uses the entire body and has no restriction on the inputting actions.

Further, the similarity is decided by using the direction, the magnitude and the speed of the movements of the player as the elements. Accordingly, it is possible to objectively make the subjective decision on whether or not the movements of the player are good.

Furthermore, the similarity is decided at the given timing or for every detection regions, so that the processing can be lightened.

[Third Embodiment]

The game apparatus 3700 which can realize a body sensing game requiring a player to use an entire body and vary contents of the game by outputting hints, will be explained according to the third embodiment of the game apparatus of the present invention, with reference to FIGS. 1, 2 and 37 to 53.

A front view showing an external of a housing 3750 of the game apparatus 3700 as an arcade game machine according to the third embodiment of the game apparatus of the present invention, and a vertical sectional view of the game apparatus 3700 showing a positional relation between a player 1800 and an image sensor 3720 and a display 3730 which are disposed in the housing 3750, are the same as the front view and the vertical sectional view of the game apparatus 1700 according to the first embodiment, as shown in FIG. 1 and FIG. 2. Therefore, the views is not omitted to show in figures.

The game apparatus 3700 comprises an artificial retina camera 3720 for detecting the movements of the player 1800, a display 3730 for displaying a game screen, operating buttons 3710 for inputting a mode of a game, a level selection, an instruction for starting a game, and so on, a light 3790 for illuminations and a speaker 3760 for outputting a BGM for a dance, voices for taking rhythms, and so on.

The game apparatus 3700 detects a movement of the player by the artificial retina camera 3720, and compares this detected movement of the player with a movement of a predetermined assigned dance, to decide the level of similarity. Thereafter, the game apparatus 3700 progresses the game and processes the score, according to the decision result.

Figure 37:
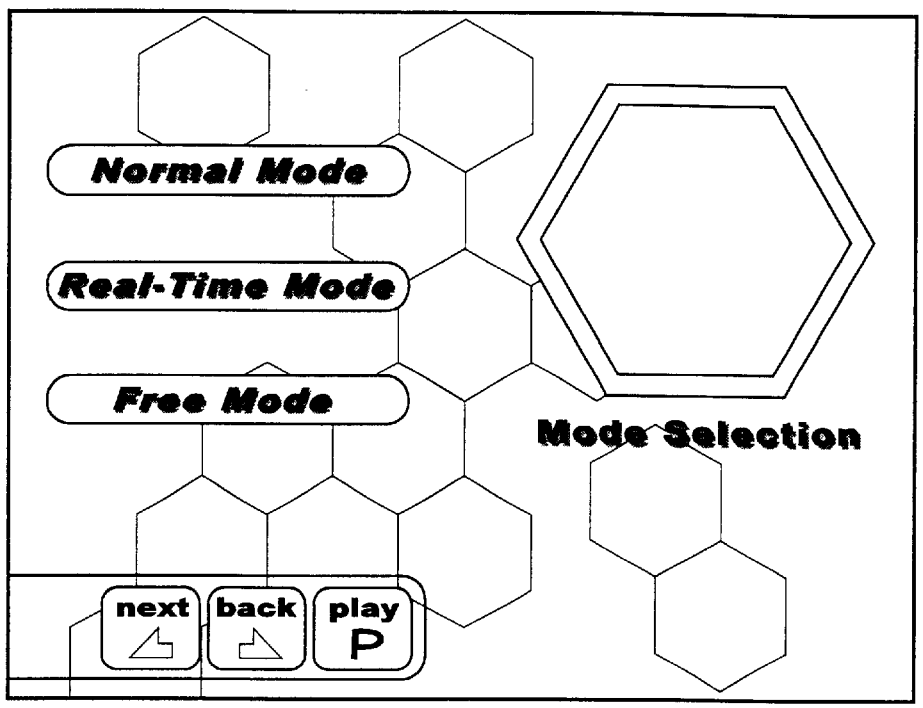
FIG. 37 is a view showing an exemplary screen in a memorizing mode, presented in the game apparatus 3700 according to the third embodiment of the present invention.

FIG. 37 is a view showing an exemplary screen in a memorizing mode, displayed on the display 3730. This mode selection screen prompts the player 1800 to select the mode of the game the player 1800 is about to start; for example, the player 1800 may select either a normal mode, a real-time mode or a free mode.

Herein, the normal mode represents a mode wherein a sample dance that is the lateral inversion of an assigned dance is displayed through movements of an instructor character 3956 (see FIG. 39) prior to the dance-start instruction, and the player 1800 then starts dancing.

The real-time mode represents a mode wherein the start of the dance is immediately instructed as the game starts, and the player 1800 dances simultaneously with the instructor character 3956 by copying the movements demonstrated by the instructor character 3956 displayed on the screen.

The free mode represent a mode wherein the player 1800 freely dances independently from the dance of the instructor character 3956 displayed on the screen.

Figure 38:
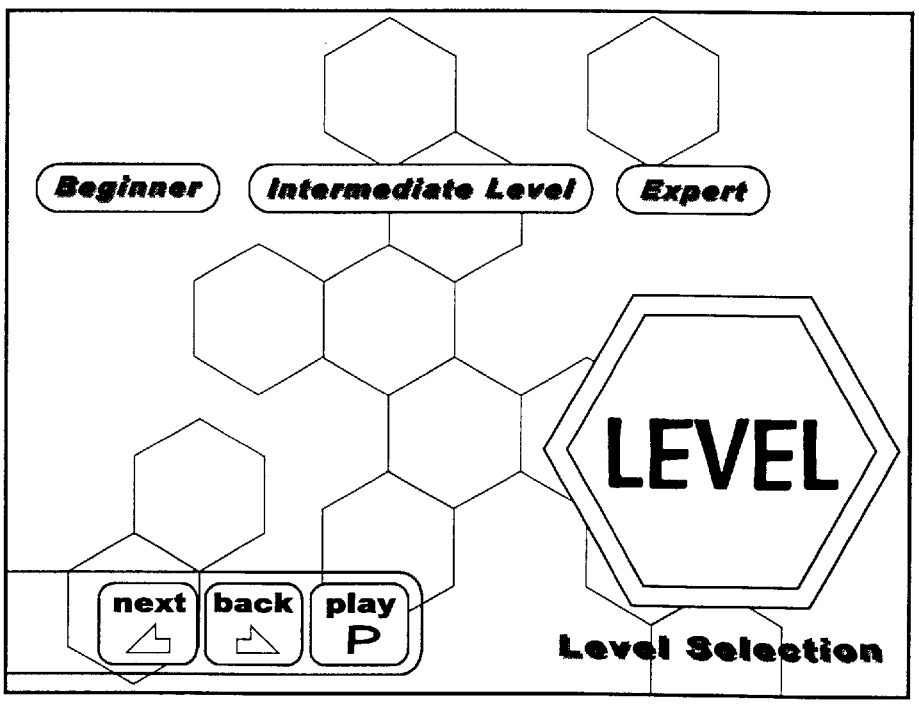
FIG. 38 is a view showing an exemplary game level selection screen presented in the game apparatus 3700.

FIG. 38 is a view showing an exemplary level selection screen displayed on the display 3730. This level selection screen shown in FIG. 38 is displayed only when the normal mode is selected in the mode selection screen shown in FIG. 37. This level selection screen prompts the player to select a desired level from different game levels of difficulty; for example, one from different game levels of difficulty such as a "Beginner", "Intermediate level" and "Expert".

Herein, for simplicity the number of the levels is assumed to be these three, "Beginner", "Intermediate Level" and "Expert", however, the number is not limited to three, there may be 4 or more levels, or 2 or less levels.

Figure 39:
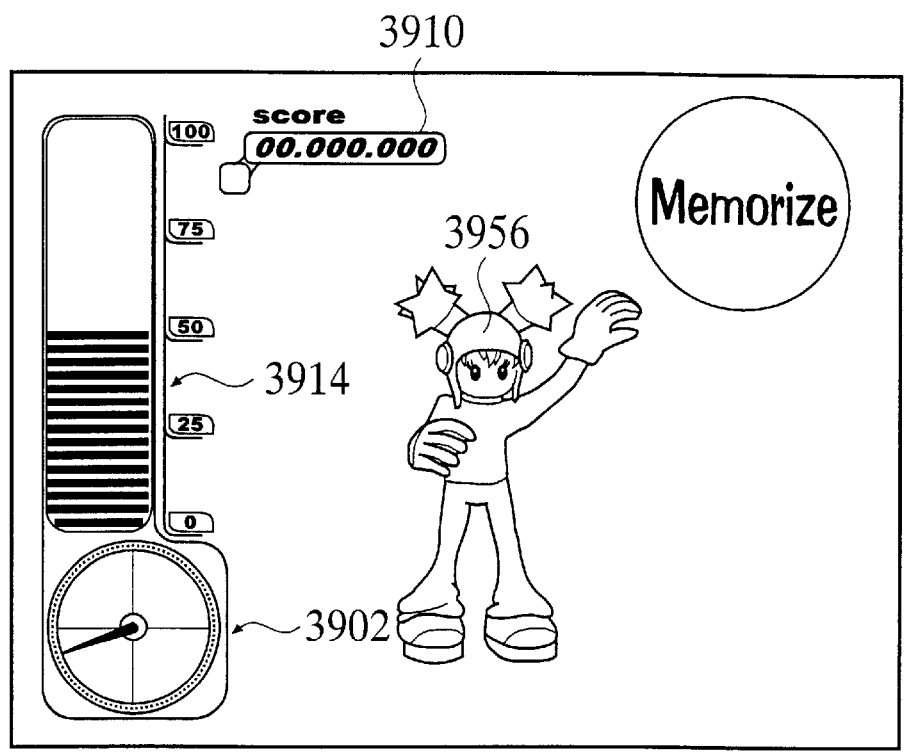
FIG. 39 is a view showing an exemplary screen presented in the game apparatus 3700, before a dance.

FIG. 39 is a view illustrating an exemplary screen displayed on the display 3730 prior to the start of the dance (before the dance-start instruction is given to the player) when the normal mode has been selected on the mode selection screen shown in FIG. 37. In the screen shown in FIG. 39, the instructor character 3956 for demonstrating the sample dance (the laterally-inverted movements of the assigned dance) is displayed.

Further, in the screen shown in FIG. 39, for example, a word "Memorize" may be indicated on the top right corner of the screen, in order to instruct the player 1800 to memorize this sample dance shown by the instructor character 3956, that is the assigned dance, like the screen shown in FIG. 14 according to the first embodiment. The indication to instruct the player 1800 to memorize the sample dance may be like the indication displayed on the top right of the screen shown in FIG. 21 according to the second embodiment.

Figure 40:
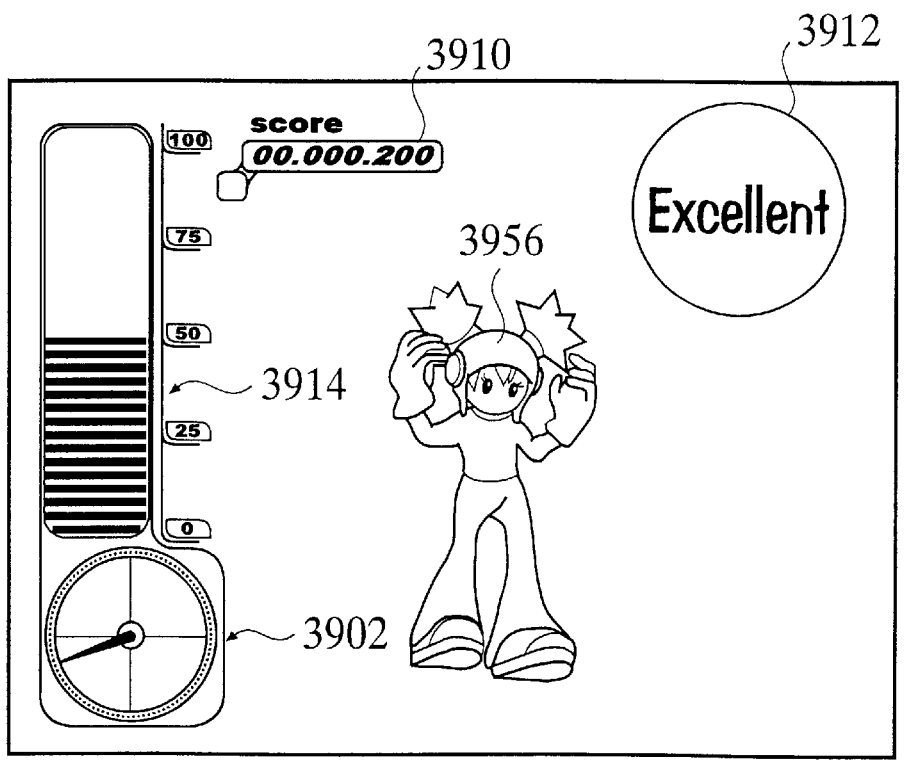
FIG. 40 is a view showing an exemplary screen presented in the game apparatus 3700, during a dance.

FIG. 40 is a view illustrating an exemplary screen displayed while the player 1800 is dancing (while the player is dancing after the dance-start instruction is given). The instructor character 3956 who performs the movements (dance) corresponding to the mode selected on the mode selection screen shown in FIG. 37 and the level selected on the level selection screen shown in FIG. 38, is displayed on the screen, as shown in FIG. 40. Further, the decision result 3912 corresponding to movement of the player 1800 detected by the artificial retina camera 3720 is displayed on the upper right of the screen.

As for the indication of this decision result, for example, when the player's movement is "very similar" to the assigned dance, then a term "Perfect" would be displayed, when the player's movement is "fairly similar", then a term "Good" would be displayed, when the player's movement is "little similar", then a term "Poor" would be displayed, and when the player's movement is "not similar at all", then a term "Failure" would be indicated, like the cases according to the first and the second embodiments.

Further, on the screen during the game performance (the screens shown in FIGS. 39 and 49), a level gauge 3914, a timing gauge 3902 and a score 3910 are displayed.

Herein, the level gauge 3914, the timing gauge 3902, and the score 3910 have functions like the level gauge 2914, the timing gauge 2901, and the score 2910 of the game apparatus 2700 according to the second embodiment, respectively. Therefore, the descriptions of them will be omitted.

The game apparatus 3700 can assign an assigned dance requiring the use of an entire body, and reflect the movements of the entire body of the player 1800 movements to the game. Accordingly, the player can enjoy playing the game by using the entire body to experience a physical amusement.

Figure 41A:
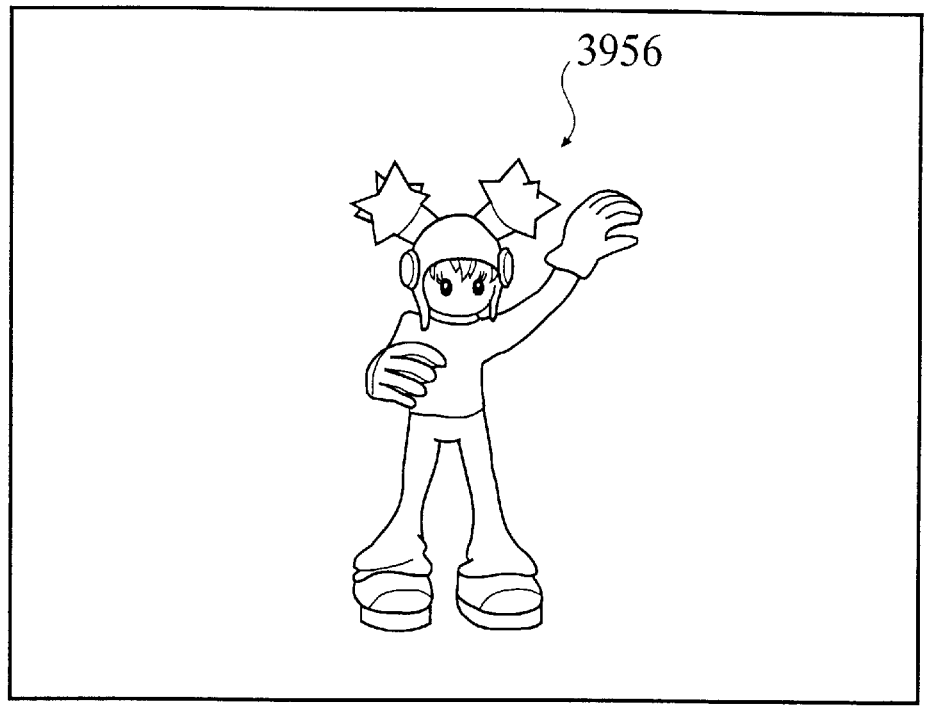
FIG. 41A and FIG. 41B are views showing a relationship between a movement of an instructor character 3956 and a movement of the player 1800.
Figure 41B:
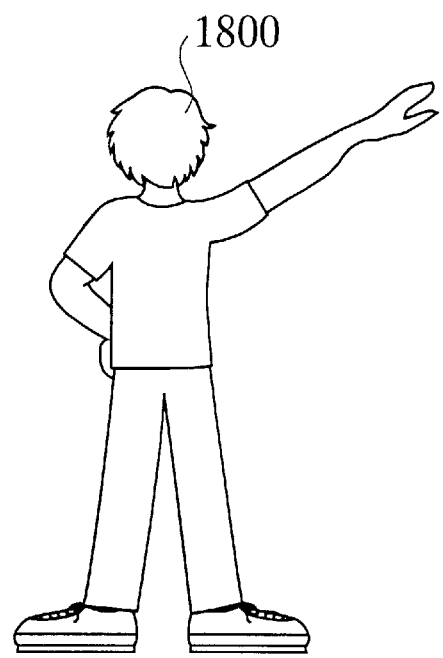

FIGS. 41A and 41B are views illustrating the relationship between the movement of the instructor character 3956 displayed on the display 3730 and the movement of the player 1800.

FIG. 41A shows the movement of the instructor character 3956 displayed on the display 3730, and FIG. 41B shows the player 1800 copying the movement of the instructor character 3956 shown in FIG. 41A.

The instructor character 3956 displayed on the display 3730 performs a movement that is a lateral inversion of a movement actually assigned to the player 1800. Accordingly, for example, when the instructor character 3956 raises its left arm as shown in FIG. 41A, then the movement of the player 1800 raising the right arm as shown in FIG. 41B would be deemed as equivalent to the movement demonstrated by the instructor character 3956.

That is, for example, in a case wherein the player 1800 memorizes the sample dance demonstrated by the instructor character 3956, or simultaneously dances with the instructor character 3956 by copying the sample dance, the player 1800 does not have to try to determine whether the instructor character 3956 has been the right arm or the left arm, and the player 1800 only has to perceive the moved arm from the viewpoint of the player 1800. Accordingly, the player 1800 may move reflectively in response to the movement of the instructor character 3956 as viewed by the player.

FIG. 42 is an exemplary functional block diagram of the game apparatus 3700 according to the third embodiment of the present embodiment. The functional block of the third embodiment comprises an input operating unit 3100, an image sensor 3200, a display unit 3300, a speaker 3400, a processing unit 3000 and a data storage medium 3500.

The input operating unit 3100 has buttons for instructing and inputting the selection of the mode, the selection of the level, the start of the game, and so on, for the dance game, like the input operating units 1100 and 2100 of the game apparatuses 1700 and 2700 according to the first and second embodiments. The operation buttons 3710 of the game apparatus 3700 shown in FIG. 1 corresponds to the input operating unit 3100. The instruction signals inputted by the input operating unit 3100 is outputted to the processing unit 3000.

The image sensor 3200 detects a movement of the player 1800 as a movement vector having the components of a starting position, a direction, a magnitude and a speed by performing the processes like the processes by the movement detection unit 1200 and the image sensor 2200 of the game apparatuses 1700 and 2700 according to the first and second embodiments. Thereafter, the image sensor 3200 outputs the movement vector detected to the processing unit 3000. Further, the movement detection function provided by the image sensor 3200 may be realized by an artificial retina chip or the like.

The image sensor 3200 detects the movement of the player 1800, and thereby the operation time required for the feature extraction processing by the processing unit 3000 may be reduced, so that it is possible to accelerate the process of the apparatus as a whole. That is, in an apparatus according to an earlier development, the movement of the player is detected based on an image captured by the imaging means such as a CCD or the like, so that a processing speed that is practical for a game apparatus has not been achieved. The solution to this problem is realized through the present invention.

The processing unit 3000 comprises a game operation unit 3010, an image generation unit 3030 and a sound generation unit 3040.

The game operation unit 3010 performs: a process for setting the game mode and the level based on the operation data inputted from the input operating unit 3100; a process for proceeding the game based on a game program 3510; a process for instructing the start of the dance through a visual display or a voice etc.; a process for setting an assigned dance to be assigned from an assignment data 3530; a process for moving (dancing) the instructor character 3956 in an object space based on a character movement data 3534; a process for controlling the position and direction of the viewpoint (the virtual camera 3542) based on a virtual camera control data 3540; a process for deciding the similarity between the movement of the player and the assigned dance by comparing the movement vector inputted from the image sensor 3200 and a decision reference data 3536; and a process for calculating the score based on the decision result.

Further, when the game operation unit 3010 performs the process for setting the assigned dance, it first performs a process to determine the assigned dance, the music for the BGM and the tempo from the assignment data 3530. More specifically, it determines those corresponding to the assigned dance from the character movement data 3534 and the decision reference data 3536, and at the same time, determines a music to serve as a BGM of the assigned dance from the sound data 3532, and it finally performs the process to determine the tempo to match the speed of the assigned dance with the speed of the music.

The game operation unit 3010 comprises a similarity decision unit 3016, a character movement setting unit 3012 and a viewpoint control unit 3019.

The character movement setting unit 3012 sets a character control pattern for controlling the movements of the instructor character 3956 and a camera control pattern for controlling the camera position etc. of the virtual camera 3542 (a given viewpoint (see FIGS. 45A and 45B) at a time of image generation of the instructor character 3956 by the image generation unit 3030) on the basis at the control data inputted from the input operating unit 3100 and the control pattern data 3538.

Further, the character movement setting unit 3012 also controls the instructor character 3956 to move within the object space in accordance with the set character control pattern and the character movement data 3534.

FIG. 43 is a diagram showing an exemplary control pattern data 3538. As shown in FIG. 43, the control pattern data 3538 contains a character control pattern and the camera control pattern according to the mode and level for the state prior to the start of the dance (the state before the dance-start instruction is given to the player) and the state during the dance (the state after the dance-start instruction is given to the player, or the state during which the player performs the dance).

For example, where the normal mode and the expert's level have been selected, the character control pattern and the camera control pattern prior to the dance performance are "A" and "1" respectively, and those during the dance performance are "B" and "1" respectively.

FIG. 44 is a diagram showing an exemplary character movement data 3534. As shown in FIG. 44, the character movement data 3534 contains position data indicated by the coordinates data, of the respective body parts of the instructor character 3956 (for example, the body parts corresponding to the right wrist, left knee . . . etc.) within the object space for each respective key frame, representing the movements of the instructor character 3956 corresponding to the character control patterns "A" and "B" associated with the selected mode or level indicated in the control pattern data 3538 shown in FIG. 43.

For example, the position data for the frame 1, which corresponds to the body part "a" of the instructor character 3956 for the character control pattern "A" is the coordinates (Xa11, Ya11, Za11), and the position data for the frame 1, which corresponds to the body part "a" of the instructor character 3956 for the character control pattern "B" is the coordinates (Xa21, Ya21, Za21). The movements of the instructor character 3956 between the respective frames are interpolated by the character movement setting unit 3012.

As shown in FIG. 44, the character movement data 3534 is set so that the positional coordinate data for the respective body parts for the character control pattern "A" would allow the instructor character 3956 to perform the movements (the sample dance) that are lateral inversion of the assigned dance, and the positional coordinate data for the respective body parts for the character control pattern "B" would allow the instructor character 3956 to perform the movements having no association with the assigned dance.

That is, where the normal mode is selected, the character movement setting unit 3012 controls the instructor character 3956 to perform the sample dance prior to the dance performance. Further, where the beginner's level or the intermediate level is selected in the normal mode, or where the real-time mode is selected, the character movement setting unit 3012 controls the instructor character 3956 to demonstrate the sample dance during the dance performance. And further, where the expert's level is selected in the normal mode, or where the free mode is selected, the character movement setting unit 3012 controls the instructor character 3956 to perform the movements not associated with the assigned dance during the dance performance.

It is of course possible to provide a greater number of character control patterns in the character movement data 3534 to assign a greater number of movements to the instructor character 3956 instead of only "A" and "B".

The viewpoint control unit 3019 controls the position, the angle and the angle of view of the virtual camera 3542 based on the camera control pattern set by the character movement setting unit 3012.

Figure 45A:
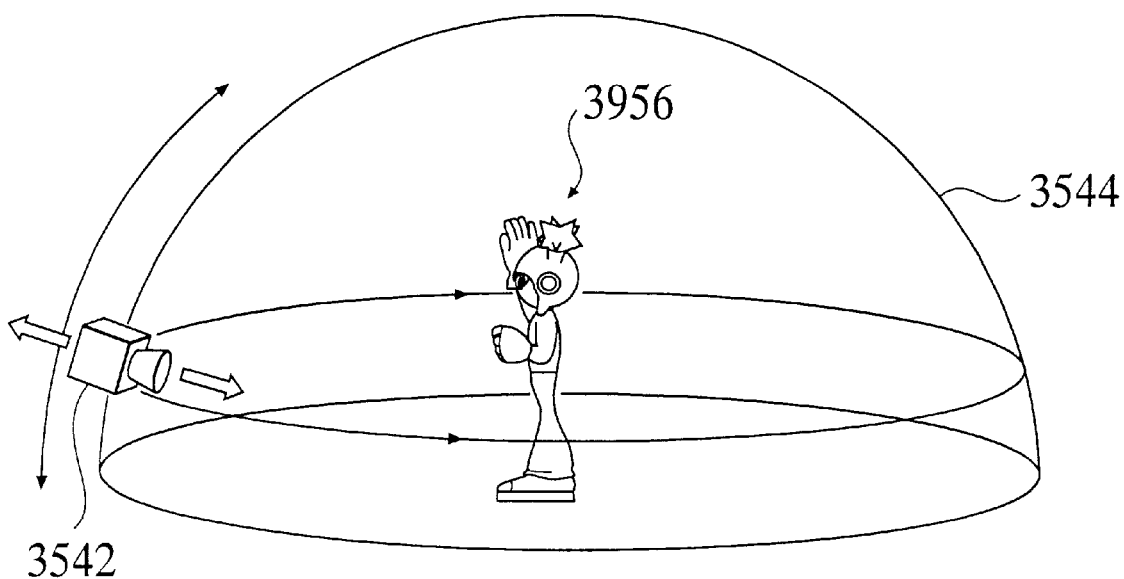
FIG. 45A and FIG. 45B are views for illustrating a virtual camera 3542 in an object space.
Figure 45B:
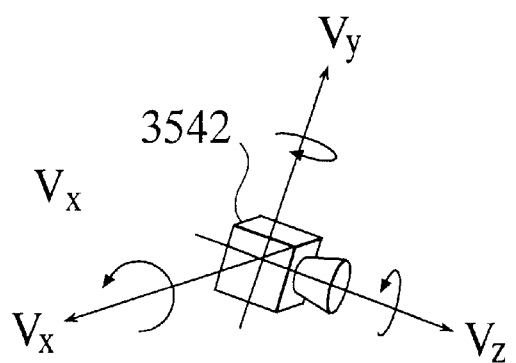

FIGS. 45A and 45B are views illustrating the virtual camera 3542 within the object space. FIG. 45A is a view showing the relationship between the instructor character 3956 and the virtual camera 3542 within the object space as set by the character movement setting unit 3012, and FIG. 45B is a view showing the angle of the virtual camera 3542.

As shown in FIG. 45A, the position of the virtual camera 3542 is defined by the distance from the instructor character 3956 and the latitude and the longitude on a sphere 3544 (FIG. 45A shows only an upper sphere, for simplicity) which has a center at the instructor character 3956 and a radius as the distance from the instructor character 3956. Herein, the latitude is represented by an angle defined by the center of the sphere 3544 and the virtual camera 3542 with the horizontal plane being 0 degree. The longitude is represented by an angle defined by a plane containing a given reference meridian of the sphere 3544 and a plane containing a meridian passing through the virtual camera 3542.

As shown in FIG. 45B, the angle of the virtual camera 3542 is defined by an angle Vx representing a vertical tilt, an angle Vy representing a lateral tilt and an angle Vz representing a rotation angle about the viewing direction.

Figure 46:
FIG. 46 is a diagram showing an example of a virtual camera control data 3540.

FIG. 46 is a diagram showing a data configuration of the virtual camera control data 3540.

The virtual camera control data 3540 comprises the data corresponding to the position, the direction and the angle of view for each given temporal interval such as each respective key frame, as the control data of the virtual camera 3542 corresponding to the camera control pattern "1" and "2" that are set by the control pattern data 3538 shown in FIG. 43.

In FIG. 46, according to the camera control pattern "1", the position of the virtual camera 3542 within the object space is a position in front of the instructor character 3956, and the distance from the instructor character 3956, the latitude and the longitude are indicated by Vd11, Vi11 and Vk11 respectively. The direction of the virtual camera 3542 is defined by the vertical tilt angle Vx11, the lateral tilt angle Vy11 and the rotation angle Vz11 about the viewing direction. The angle of view is Z11, and the position, the direction and the angle of view are all fixed values.

On the other hand, in FIG. 46, according to the camera control pattern "2", the position of the virtual camera 3542 within the object space is so configured to allow the virtual camera 3542 to revolve around the instructor character 3956. The direction of the virtual camera 3542 is set by fixed values of the vertical tilt angle Vx21, the lateral tilt angle Vy21 and the rotation angle Vz21 about the viewing direction. The angle of view is set to a fixed value Z21.

That is, prior to the dance performance, when the normal mode has been selected, the instructor character 3956 would be displayed to be facing forward at a fixed position and in a fixed size.

During the dance performance, when the beginner's level or the expert's level has been selected in the normal mode, or the real-time mode has been selected, the instructor character 3956 would be displayed to be facing straight forward at a fixed position and in a fixed size, and when the intermediate level has been selected in the normal mode, or the free mode has been selected, although the size of the instructor character 3956 displayed would be fixed, the instructor character 3956 would be turning as displayed.

Figure 47:
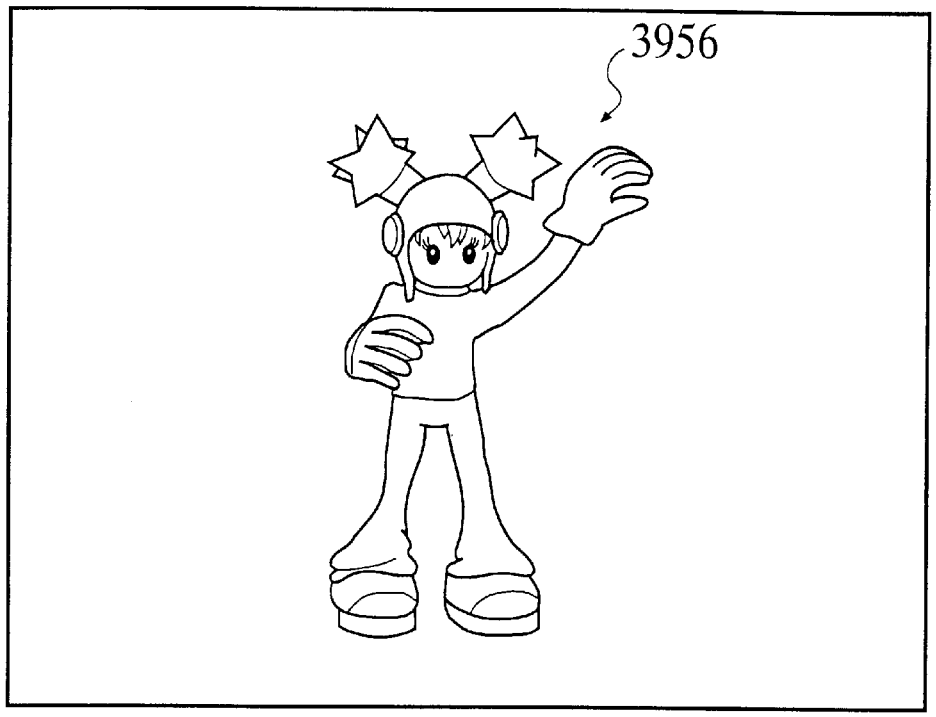
FIG. 47 is a view showing an exemplary display of the instructor character 3956 presented in the game apparatus 3700.
Figure 48:
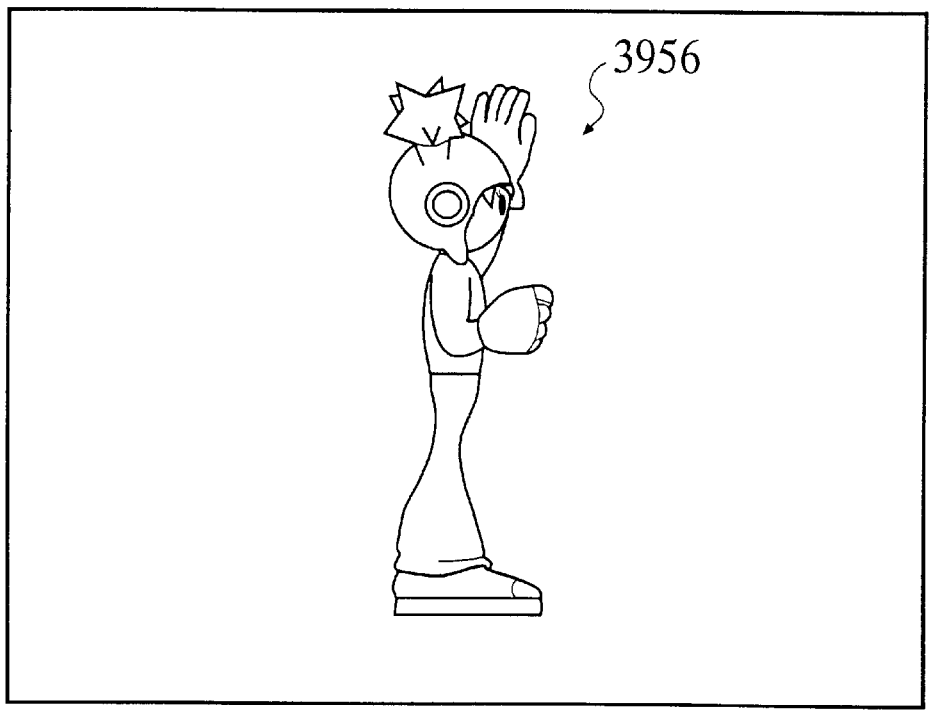
FIG. 48 is a view showing an exemplary display of the instructor character 3956 presented in the game apparatus 3700.
Figure 49:
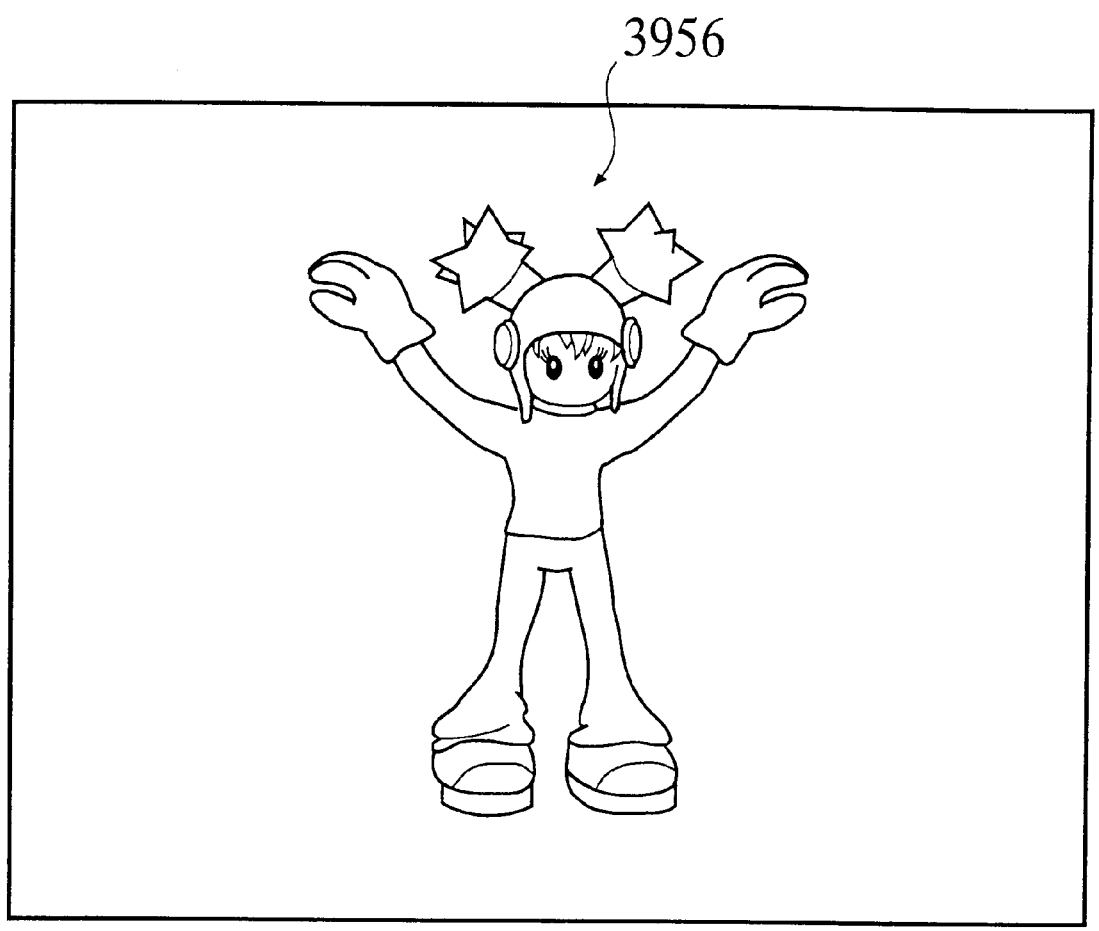
FIG. 49 is a view showing an exemplary display of the instructor character 3956 presented in the game apparatus 3700.

FIGS. 47 to 49 are views illustrating exemplary displays of the instructor character 3956 displayed in accordance with the character movement pattern and the camera movement pattern corresponding to the selected mode and level.

FIG. 47 is an exemplary display of the instructor character 3956 who is performing the movement (the sample dance) that is the lateral inversion of the assigned dance, FIG. 48 is an exemplary display of the instructor character 3956 performing the sample dance, in which the instructor character 3956 is turning as displayed, and FIG. 49 is an exemplary display of the instructor character 3956 performing a movement having no association with the assigned dance.

When the normal mode has been selected, prior to the dance performance, as shown in FIG. 47, the instructor character 3956 facing forward at a fixed position and in a fixed size would be displayed and perform the sample dance.

When the beginner's level has been selected, during the dance performance, as shown in FIG. 47, the instructor character 3956 facing forward at a fixed position and in a fixed size would be displayed and perform the sample dance, in the same manner as the manner prior to the dance performance. Accordingly, the game level of difficulty would be low, so that even a beginner player may enjoy pleasure of playing the game.

When the intermediate level has been selected, during the dance performance, as shown in FIG. 48, the instructor character 3956 showing the sample dance would turn as displayed. Therefore, the displayed instructor character 3956 would also face the sides and the back. Accordingly, although the player would easily recognize whether the player should move a leg or an arm, the player may be misled in judging the right or left since the instructor character 3956 is turning. Also, the instructor character 3956 may face one side as it turns as shown in FIG. 48, and in this state, the player only receives information on the one side of the instructor character 3956. Accordingly, the game level of difficulty would be greater than the beginner's level.

When the expert's level has been selected, as shown in FIG. 49, the displayed instructor character 3956 would be making movements having no association with the assigned dance. Therefore, the player would receive no clue that hints at the assigned dance during the dance performance. In addition, the player may mistakenly engage in a movement that is different from the assigned dance by being misled by the movements of the instructor character 3956. Accordingly, the game level of difficulty would become further greater than the intermediate level.

In this way, by changing the display of the instructor character 3956 during the dance performance, it is possible that the game level of difficulty is changed. As a result, it is possible to realizes a game amusing to beginners as well as skilled players, which will not let those skilled players get easily bored.

When the real-time mode has been selected, during the dance performance, as shown in FIG. 47, the instructor character 3956 facing forward at a fixed position and in a fixed size would be displayed and show the sample dance. However, the player would not be supplied with the information on the assigned dance prior to the dance performance, so that the player must start dancing without any advance knowledge of the assigned dance. Accordingly, the game level of difficulty would be higher, and the player would feel uncertainty and be urged to be tenser. Consequently, the amusement of the game is further enhanced.

When the free mode has been selected, the instructor character 3956 would not be displayed before the dance performance, and the instructor character 3956 who is turning and performing movements not associated with the assigned dance would be displayed during the dance performance as shown in FIG. 49. Therefore, in the state wherein the information on the assigned dance would not be presented to the player before and during the dance performance, the player is required to perform a free dance. Thereby, for this player's free dance, the score, the decision result and the level are indicated. Accordingly, the player may feel as if the player's dance is being decided. Consequently, a type of amusement that is different from the normal mode or the real-time mode in which the player dances in accordance with the assigned dance may be provided.

In FIG. 46, for example, the camera control pattern "2" may be so configured to provide parallel displacement of the position of the virtual camera 3542 in horizontal and vertical directions in front of the instructor character 3956. In this case, the instructor character 3956 displayed on the screen would move horizontally or vertically while facing forward.

Further, in FIG. 46, for example, the direction and the angle of view of the virtual camera 3542 for the camera control pattern "2" may be configured to be set variably, instead of using the fixed values. In such a case, the size, the position and so on of the instructor character 3956 displayed on the screen would also change.

Furthermore, in FIG. 46, a greater number of camera control patterns may be provided instead of using only the camera control patterns "1" and "2". In this case, the game level of difficulty may be changed in a greater variety by combining them with the character control patterns, allowing further divided level setting.

The similarity decision unit 3016 decides the level of similarity by comparing the respective components of the movement vector inputted from the image sensor 3200 with the decision reference data 3536 corresponding to the assigned dance.

FIG. 50 is a diagram showing an exemplary decision reference data 3536. The decision reference data 3536 contains a decision reference data of the direction, the magnitude and the speed at each given timing (time period). In FIG. 50, the decision reference data at the time t1 for a dance 1 provides a direction $\alpha 11$, a magnitude $\beta 11$ and a speed $\gamma 11$.

A specific similarity decision method by the similarity decision unit 3016 is like the similarity decision method by the similarity decision unit 2016 of the game apparatus 2700 according to the second embodiment, so that its description will be omitted.

The image generation unit 3030 performs a process for generating images of the instructor character 3956 making movements within the object space defined by the character movement setting unit 3012, as viewed from the virtual camera 3542 (a given viewpoint) that is controlled for its position, its angle and its angle of view by the viewpoint control unit 3019.

In other words, when the virtual camera 3542 is controlled in accordance with the set values of the camera control pattern "1" in the virtual camera control data 3540 by the viewpoint control unit 3019, the images of the instructor character 3956 facing forward are generated by the image generation unit 3030. On the other hand, when the virtual camera 3542 is controlled in accordance with the set values of the camera control pattern "2", the images of the turning instructor character 3956 are generated by the image generation unit 3030.

Further, the image generation unit 3030 performs a process for generating images of the score 3910, the level gauge 3914 and so on, based on the score calculated by the game operation unit 3010, the similarity decision result and so on. The images provided by the image generation unit 3030 are displayed on the display unit 3300.

The sound generation unit 3040 performs a process for generating and outputting a music from a speaker 3400 based on the sound data 3532 selected by the game operation unit 3010, at a tempo determined by the game operation unit 3010. The sound data 3532 has been explained as being a back ground music of the assigned dance, however, it may alternatively be voices or effect sounds for helping the player to take the rhythms. In the latter case, the sound generation unit 3040 would be generating voices or effect sounds that synchronize with the tempo determined by the game operation unit 3010.

The above-described functions of the processing unit 3000 may be realized by hardware such as a CPU of a CISC-type or a RISC-type, a DSP, an image capturing IC and a memory etc, like the cases of the processing units 1000 and 2000 of the game apparatuses 1700 and 2700 according to the first and second embodiments.

The display unit 3300 is a display for indicating images and so on generated by the image generation unit 3030, and the display 3730 in the game apparatus 3700 shown in FIG. 1 corresponds to this display unit 3300. Further, the display unit 3300 can be realized by a CRT, a LCD, a plasma display or the like, like the cases of the display units 1300 and 2300 of the game apparatuses 1700 and 2700 according to the first and second embodiments.

The data storage medium 3500 stores, besides the game program 3510, the above-explained sound data 3532, the character movement data 3534, the decision reference data 3536, the assignment data 3530 including the control pattern data 3538, and the virtual camera control data 3540. The function of this data storage medium 3500 may be realized by hardware including a CD-ROM, a game cassette, an IC card, a MO, a FD, a DVD, a hard disk, a memory and so on, like the cases of the data storage mediums 1500 and 2500 of the game apparatuses 1700 and 2700 according to the first and second embodiments.

As previously explained, the processing unit 3000 performs various processes based on the program, the data and so on stored on this data storage medium 3500.

The process of the game apparatus 3700 according to the third embodiment of the present invention will now be explained with reference to the flow chart shown in FIG. 51.

Figure 51:
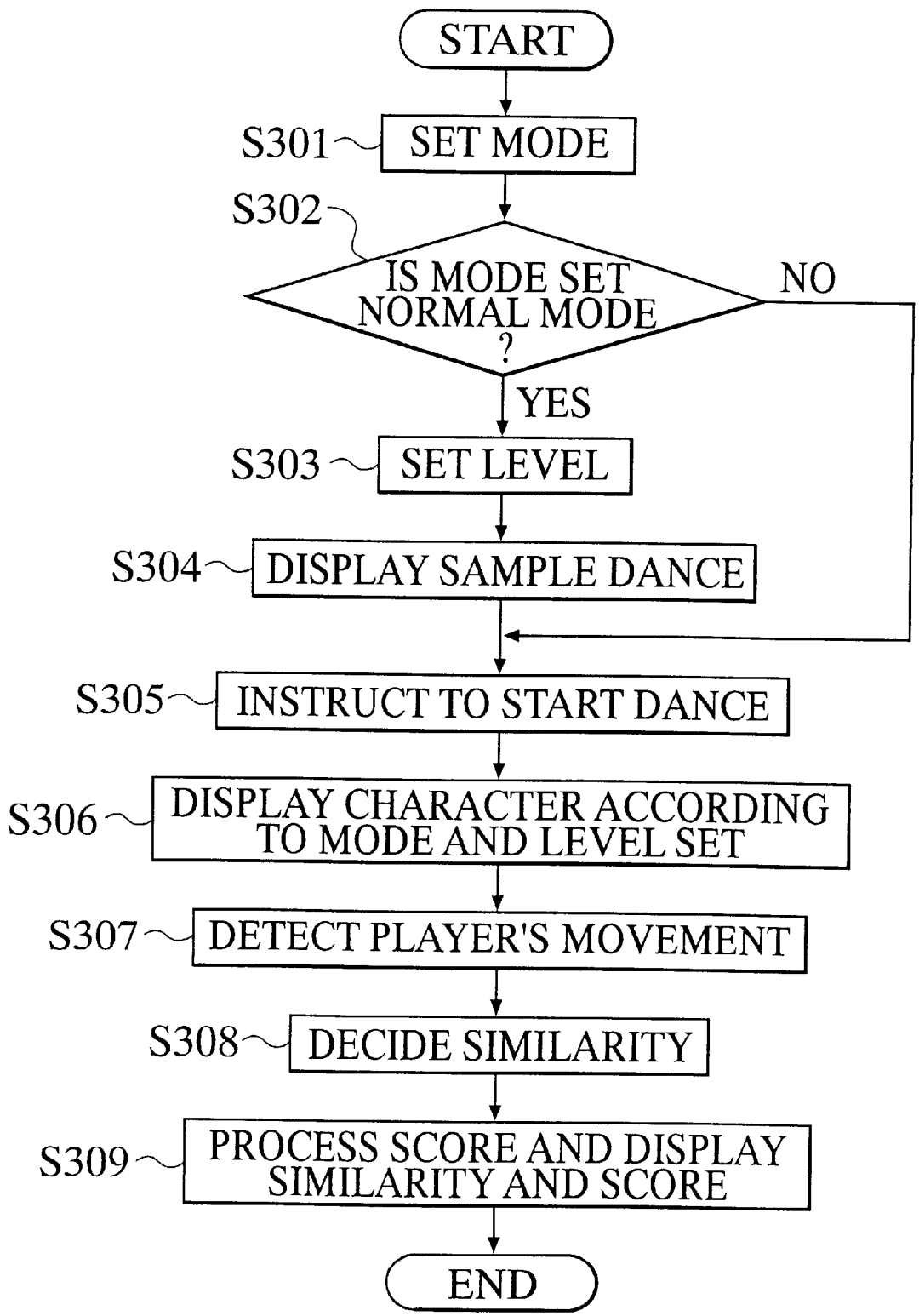
FIG. 51 is a flow chart of a process of the game apparatus 3700.
Figure 52:
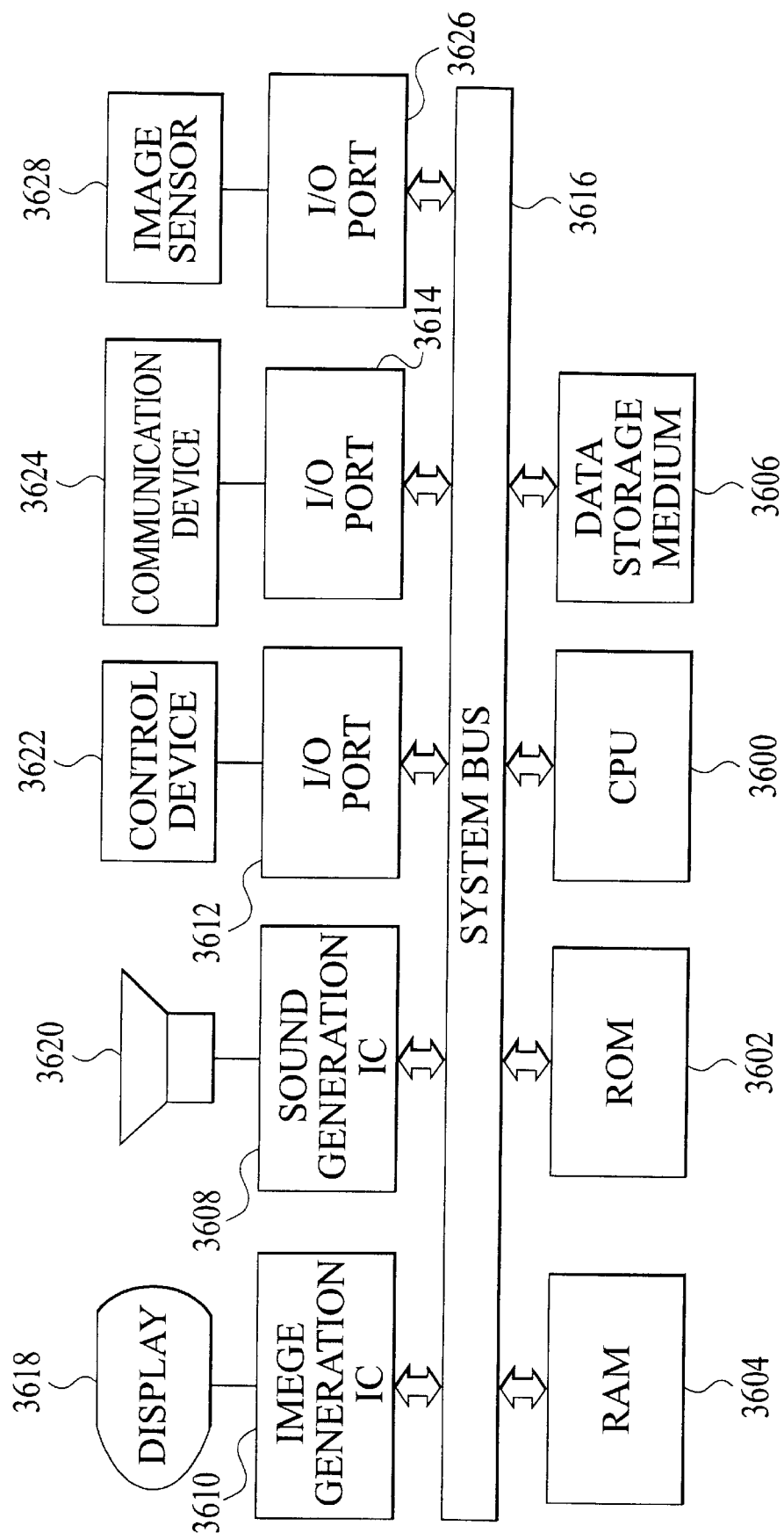
FIG. 52 is a block diagram showing an exemplary hardware configuration capable of realizing th e game apparatus 3700.

With reference to FIG. 51, when a mode is selected and set based on the operation data inputted from the input operating unit 3100 in the mode selection screen (FIG. 37) (step S301), the game operation unit 3010 decides whether or not the set mode is the normal mode (step S302).

When the set mode is detected to be the normal mode at the step S301 (step S301; YES), the image generation unit 3030 instructs the display unit 3300 to display the level selection screen (FIG. 38) thereon, and a level is selected and set based on the operation data inputted from the input operating unit 3100 (step S303).

Next, the character movement setting unit 3012 controls the instructor character 3956 to perform movements (sample dance) which is the lateral inversion of the assigned dance, based on the control pattern data 3538 and the character movement data 3534, and at the same time, controls the virtual camera 902 based on the control pattern data 3538 and the virtual camera control data 3540. The image generation unit 3030 generates images of the instructor character 3956 as viewed from the virtual camera 3542 and displays the images on the display unit 3300 (step S304). Upon completion of the sample dance, the game operation unit 3010 instructs the start of the dance performance (step S305).

On the other hand, when the normal mode has not been selected at the step S302 (step S302; No), the game operation unit 3010 directly instructs the start of the dance performance (step S305).

After the dance-start instruction, the character movement setting unit 3012 sets the character control pattern and the camera control pattern associated to the set mode and level, that are to be used during the dance performance, based on the control pattern data 3538, and controls the instructor character 3956 to perform the movements within the object space in accordance with the character movement data 3534 corresponding to the set character control pattern, and also controls the virtual camera 3542 for its position, its direction, and its angle of view according to the virtual camera control data 3540 corresponding to the set camera control pattern.

Thereafter, the image generation unit 3030 generates the images of the instructor character 3956 as viewed from the virtual camera 3542, and displays the images on the display unit 3300 (step S306).

Next, during the dance performance by the player, the image sensor 3200 detects the movements of the player (step S307), and the similarity decision unit 3016 compares the detected movements of the player and the decision reference data 3536 to decide the level of similarity (step S308)

Thereafter, the game operation unit 3010 processes to calculate the score based on the decision result decided by the similarity decision unit 3016, and the decision result and the score are displayed on the screen (step S309). Thereby, the game is terminated.

Next, one example of the hardware configuration capable of realizing the game apparatus 3700 according to the third embodiment will be described with reference to FIG. 51. The game apparatus 3700 shown in FIG. 52, comprises a CPU 3600, a ROM 3602, a RAM 3604, a data storage medium 3606, a sound generation IC 3608, an image generation IC 3610, I/O ports 3612, 3614 and 3626, wherein they are connected through a system bus 3616 so as to be capable of inputting and outputting data to and from each other. A display 3618 is connected to the image generation IC 3610, a speaker 3620 is connected to the sound generation IC 3608, a control device 3622 is connected to the I/O port 3612, a communication device 3624 is connected to the I/O port 1614 and an image sensor 3628 is connected to the I/O port 3626.

The data storage medium 3606 corresponds to the data storage medium 3500 shown in FIG. 42. Further, the data storage medium 3606 is constructed and has functions, like the data storage mediums 1606 and 2606 of the game apparatuses 1700 and 2700 according to the first and second embodiments shown in FIGS. 18 and 35.

Figure 18:
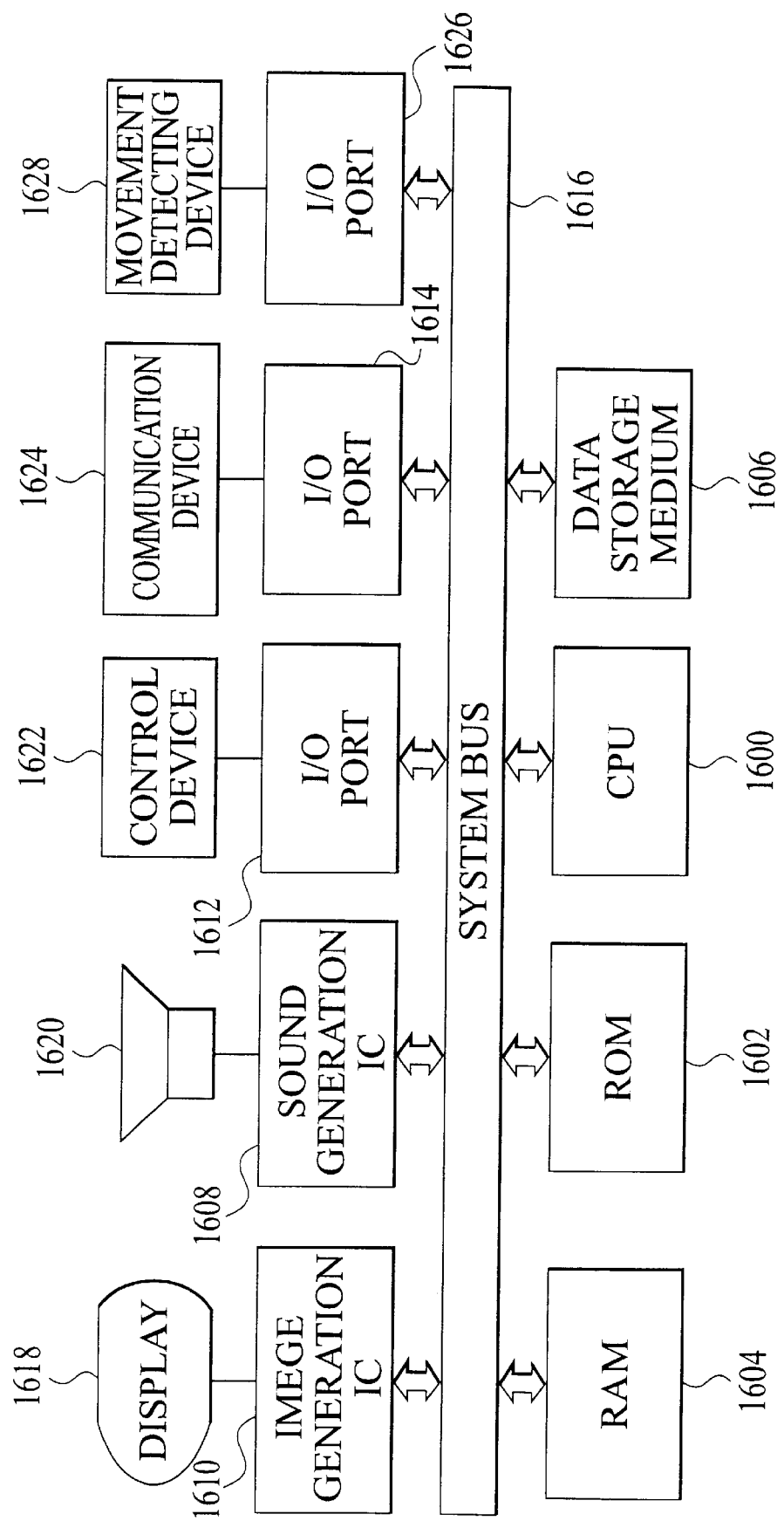
FIG. 18 is a block diagram showing an exemplary hardware configuration capable of realizing the game apparatus 1700.
Figure 35:
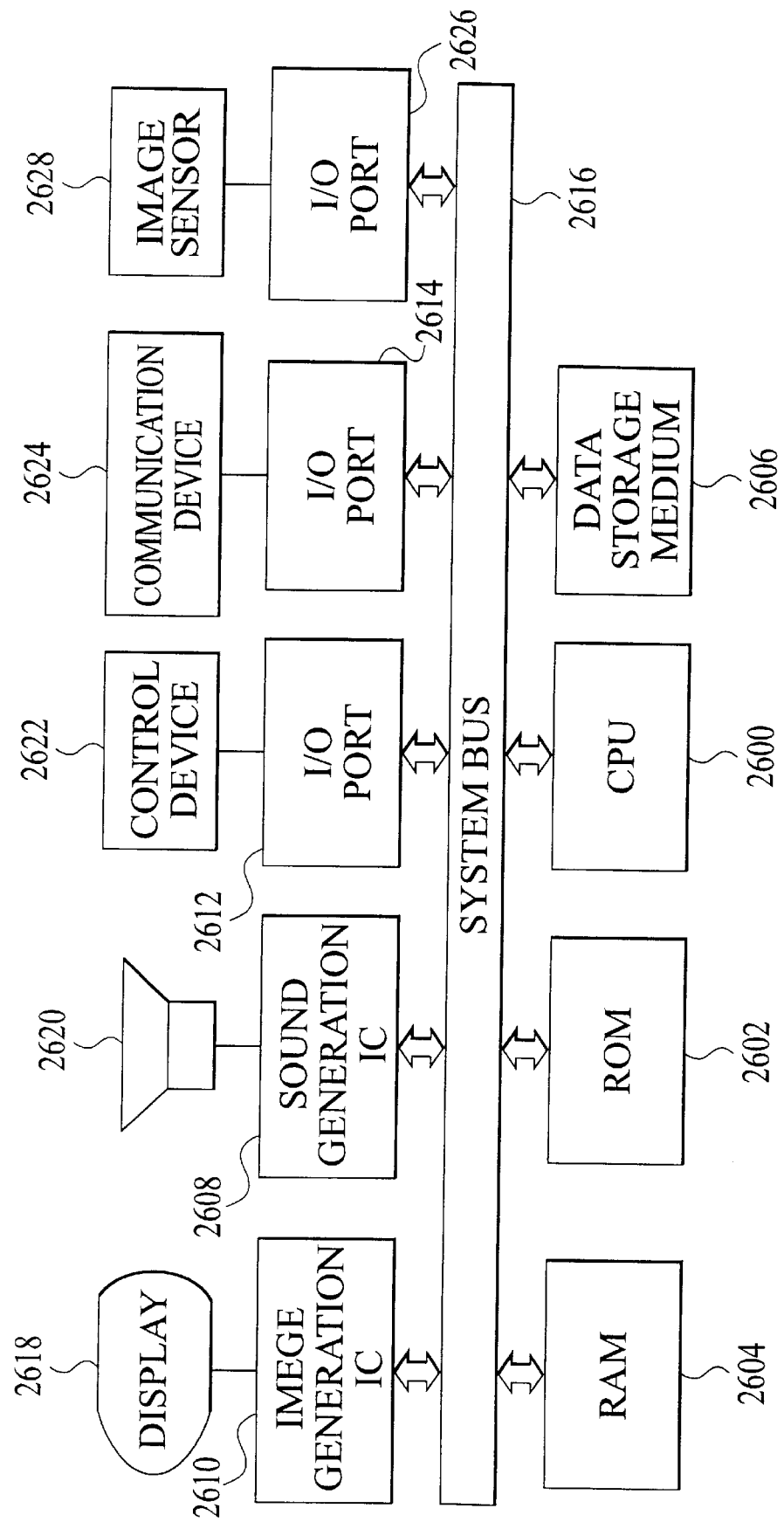
FIG. 35 is a block diagram showing an exemplary hardware configuration capable of realizing the game apparatus 2700.

Further, the control device 3622, the CPU 3600, the RAM 3604, the sound generation IC 3608, the image generation IC 3610, the display 3618, and the communication device 3624, are constructed and have functions like the control devices 1622 and 2622, the CPU 1600 and 2600, the RAM 1604 and 2604, the sound generation IC 1608 and 2608, the image generation IC 1610 and 2610, the displays 1618 and 2618, and the communication devices 1624 and 2624 of the game apparatuses 1700 and 2700 according to the first and second embodiments shown in FIGS. 18 and 35, respectively. Therefore, their descriptions will be omitted.

The image sensor 3628 comprises an artificial retina chip etc., and it detects the movements, the images and so on of the player, like the image sensor 2628 of the game apparatus 2700 according to the second embodiment.

The above various processes explained with reference to FIGS. 37 to 50 are realized by the data storage medium 3606 storing a program for performing the processes indicated in the flow chart shown in FIG. 51 and the CPU 3600, the image generation IC 3610 and the sound generation IC 3608 etc. that operate according to the program.

The processes performed by the image generation IC 3610 or the like, may be written as software applications run by the CPU 3600, a general DSP or the like.

Now, the game apparatus 3700 according to the third embodiment can be applied to the arcade game machine as shown in FIG. 19A and FIG. 19B, like the cases of the game apparatuses 1700 and 2700 according to the first and second embodiment. Herein, the description of the case wherein the game apparatus 3700 is applied to the arcade game machine will be omitted.

As explained heretofore, according to the game apparatus 3700 of the third embodiment of the present invention, the movements of the player's entire body may be reflected to a game, and the game level and the game content may be changed by varying the display of the instructor character 3956 according to the selected level. Accordingly, the content of the game can be readily changed, and it is possible to realize a body-sensing type game apparatus that allows the player to play by using the entire body.

The game apparatus 3700 according to the third embodiment of the present invention is not limited to the above embodiment, and various modifications are possible.

For example, in the above third embodiment, when the real-time input mode has been selected the instructor character 3956 has been explained as being facing forward while it demonstrates the sample dance, however, the direction of the instructor character 3956 is not limited thereto. The instructor character 3956 may be configured to turn, to move, or to change the size while it is displayed, to increase the game level of difficulty for the real-time mode. It may be possible to provide the level selection also for the real-time mode, and the display of the instructor character 3956 may be configured to change according to a selected level.

Figure 53:
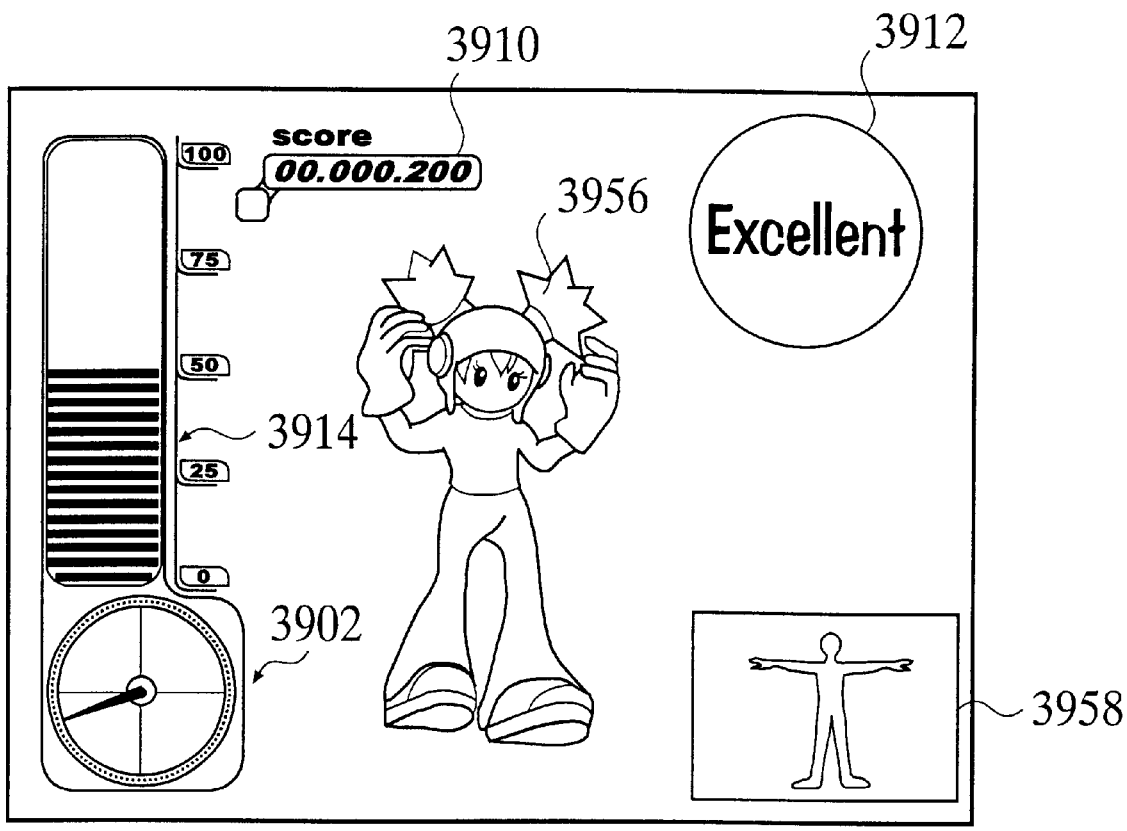
FIG. 53 is a view showing an exemplary screen presented in the game apparatus 3700, during a dance.

Further, the image sensor 3200 may be configured to capture also the player's image itself. As shown in FIG. 53, a window 3958 may be provided on the screen displayed during the game performance to display the image of the player as captured by the image sensor 3200. In this way, the player can self-check the own movements (dance).

Furthermore, it may be configured to output indications through the voice from the speaker 3400 or the textual display in synchronization with the movements of the instructor character 3956 to indicate its current movements, before or during the dance performance. In this case, since the movements of the instructor character 3956 are the lateral inversion, for example, when the instructor character 3956 raises its right arm, a voice or a text display saying "left arm" would be outputted. Furthermore, by outputting the voices or the textual display indicating movements that do not match with the assigned dance during the dance performance to confuse the player, the game level of difficulty would be increased, and thereby the amusement of the game is enhanced.

Furthermore, the game level of difficulty may be changed, for example, by changing the camera control pattern during the dance performance based on the current value of the level gauge 3914 displayed.

For example, under a condition wherein the intermediate level has been selected, thus the instructor character 3956 is being displayed with the virtual camera 3542 revolving around the instructor character 3956 (the camera control pattern "2") during the dance performance, if the level indicated by the level gauge 3914 becomes lower than a given level (for example, the case wherein the player is tired or the level is too hard for the player), the virtual camera 3542 may stop at the fixed position in front of the instructor character 3956.

Conversely, under a condition wherein the beginner's level has been selected, thus the virtual camera 3542 is in a fixed state at a position in front of the instructor character 3956, if the level indicated by the level gauge 3914 exceeds a given level (for example, the case wherein the selected level is too easy for the player), the virtual camera 3542 starts revolving around the instructor character 3956.

Furthermore, the game level of difficulty has been explained as being controlled by the movements of the instructor character 3956 and the movements of the virtual camera 3542. However, the game level of difficulty may be controlled by the speed of the movement of the instructor character 3956 and the speed (the tempo) of the music. In this case, for example, when the camera control pattern "2" is selected to have the virtual camera 3542 revolve around the instructor character 3956, if the speed of the movements of the instructor character 3956 and the music is faster, the revolving speed of the virtual camera 3542 may also be accelerated.

Furthermore, in the third embodiment, it has been explained that the information hinting at the assigned dance is not given when the free mode has been selected, however, the present invention is not limited to these embodiments. For example, the output of the hints for the assigned dance may be configured to stop upon an input of a given instruction into the input operating unit 3100 and so on even during the game.

Effects according to the third embodiment of the present invention will be explained, as follows.

According to the present invention, the movements of the player's entire body may be reflected to the game, and thereby it is possible to realize a body-sensing type game allowing the player to play by using the player's entire body.

Further, since the game level of difficulty and the content of the game can readily be changed by varying the timing and the contents of the hint indications or the voice outputs, a game enjoyable to any players from beginners to experts can be realized.

Furthermore, since the movements displayed as hints are the lateral inversions of the assigned movements, the player can intuitively determine the correct movements by visually viewing the hints and move reflectively. Accordingly, the time period from the display of a hint to the actual performance by the player may be minimized.

Furthermore, since the player performs the movements in synchronization with the tempo of the music, the voice, the effect sounds or the video etc., amusement of performing the movements can further be enhanced.

Furthermore, since the processes for the feature extraction etc. to detect the movements of the player can be performed on the side of the artificial retina chip, the processing speed of the apparatus as a whole may be accelerated.

The entire disclosures of Japanese Patent Application Nos. Tokugan 2000-42048 filed on Feb. 18, 2000, Tokugan 2000-42049 filed on Feb. 18, 2000, and Tokugan 2000-42052 filed on Feb. 18, 2000, including specifications, claims, drawings and summaries, are incorporated herein by reference in its entirety.

What is claimed is:

1. A game apparatus comprising:
   a storage section for storing a predetermined assigned movement for a player;
   an assigned movement display section for displaying the assigned movement, thereon;
   a sound generation section for generating at least one of a sound, a music and a sound effect;
   a movement detection section for detecting a movement of the player;
   a similarity decision section for comparing the assigned movement with the movement of the player detected by the movement detection section, to decide a similarity between the assigned movement and the movement of the player;
   a game operation section for processing a score on the basis of the similarity decided by the similarity decision section; and
   a tempo adjusting section for adjusting a tempo of the at least one of the sound, music and sound effect based on progress of a game.

2. A game apparatus comprising:
- a storage section for storing a predetermined assigned movement for a player;
- an assigned movement display section for displaying the assigned movement, thereon;
- a sound generation section for generating at least one of a sound, a music and a sound effect;
- a movement detection section for detecting a movement of the player;
- a player movement display section for displaying the movement of the player detected by the movement detection section, thereon;
- a similarity decision section for comparing the assigned movement with the movement of the player detected by the movement detection section, to decide a similarity between the assigned movement and the movement of the player;
- a game operation section for processing a score on the basis of the similarity decided by the similarity decision section; and
- a tempo adjusting section for adjusting a tempo of the at least one of the sound, music and sound effect based on progress of a game.

3. A game apparatus according to claim 1, wherein the assigned movement matches at least one of the sound, the music and the sound effect, generated by the sound generation section.

4. A game apparatus according to claim 1, wherein the assigned movement matches a tempo of at least one of the sound, the music and the sound effect, generated by the sound generation section.

5. A game apparatus according to claim 1, further comprising a tempo display section for displaying a tempo of the assigned movement, thereon.

6. A game apparatus according to claim 1, further comprising:
- a game level setting section for setting a game level of difficulty,
- wherein at least one of a tempo of the assigned movement, a type of the assigned movement and the similarity decided by the similarity decision section is changed on the basis of the game level of difficulty set by the level setting section.

7. A game apparatus according to claim 1, wherein at least one of a tempo of the assigned movement, a type of the assigned movement and the similarity decided by the similarity decision section is changed on the basis of the similarity decided by the similarity decision section.

8. A game apparatus according to claim 1, wherein the similarity decision section compares the assigned movement with the movement of the player detected by the movement detection section, at a predetermined time of the assigned movement, to decide the similarity between the assigned movement and the movement of the player; and
the game apparatus further comprises a timing notice section for indicating the predetermined time to the player by a visual effect or an auditory effect.

9. A game apparatus according to claim 1, wherein the similarity decision section compares the assigned movement with the movement of the player detected by the movement detection section, at a predetermined time of the assigned movement, to decide the similarity between the assigned movement and the movement of the player; and
the game apparatus further comprises a decision display section for displaying a decision according to the similarity decided at the predetermined time by the similarity decision section.

10. A game apparatus comprising:
- a storage section for storing a predetermined assigned movement for a player;
- an assigned movement display section for displaying the assigned movement, thereon;
- a movement detection section for detecting a movement of the player;
- a player movement display section for displaying the movement of the player detected by the movement detection section, thereon;
- a similarity decision section for comparing the assigned movement with the movement of the player detected by the movement detection section, to decide a similarity between the assigned movement and the movement of the player;
- a game operation section for processing a score on the basis of the similarity decided by the similarity decision section, wherein the similarity decision section compares the assigned movement with the movement of the player detected by the movement detection section, at a predetermined time of the assigned movement, to decide the similarity between the assigned movement and the movement of the player; and
- a decision display section for displaying a decision according to the similarity decided at the predetermined time by the similarity decision section, wherein the decision display section is a gauge display section for displaying a gauge that fluctuates according to the decision of the similarity decided at the predetermined time by the similarity decision section.

11. A game apparatus comprising:
- a storage section for storing a predetermined assigned movement for a player;
- an assigned movement display section for displaying the assigned movement, thereon;
- a sound generation section for generating at least one of a sound, a music and a sound effect;
- a movement detection section for detecting a movement of the player;
- a similarity decision section for comparing the assigned movement with the movement of the player detected by the movement detection section, to decide a similarity between the assigned movement and the movement of the player;
- a game operation section for processing a score on the basis of the similarity decided by the similarity decision section, wherein the similarity decision section compares the assigned movement with the movement of the player detected by the movement detection section, at a predetermined time of the assigned movement, to decide the similarity between the assigned movement and the movement of the player; and
- a decision display section for displaying a decision according to the similarity decided at the predetermined time by the similarity decision section, wherein the decision display section is a gauge display section for displaying a gauge that fluctuates according to the decision of the similarity decided at the predetermined time by the similarity decision section.

12. A game apparatus according to claim 8,
wherein the predetermined time is changed according to a tempo of at least one of the sound, the music and the sound effect, generated by the sound generation section.

13. A game apparatus according to claim 9,
wherein the predetermined time is changed according to a tempo of at least one of the sound, the music and the sound effect, generated by the sound generation section.

14. A game apparatus according to claim 1,
wherein the game operation section calculates the score on the basis of the similarity decided by the similarity decision section.

15. A game apparatus according to claim 1,
wherein the game operation section calculates the score on the basis of the similarity decided by the similarity decision section, to calculate a cumulative total of the score calculated; and
the game apparatus further comprises a score display section for displaying the cumulative total of the score, thereon.

16. A game apparatus according to claim 1,
wherein the assigned movement display section displays the assigned movement before the similarity decision section decides the similarity.

17. A game apparatus according to claim 1, further comprising a movement start notice section for indicating when the player starts moving to the player by a visual effect or an auditory effect.

18. A game apparatus according to claim 1, wherein the assigned movement is a dance.

19. A game apparatus according to claim 1, wherein the movement detection section comprises an artificial retina chip.

20. A game apparatus according to claim 1, wherein the movement detection section detects the movement of the player from a light received through a visible spectrum cut-off filter.

21. A game apparatus comprising:
a storage section for storing a predetermined assigned movement for a player;
an assigned movement display section for displaying the assigned movement, thereon;
a sound generation section for generating at least one of a sound, a music and a sound effect;
a movement detection section for detecting a movement of the player;
a similarity decision section for comparing the assigned movement with the movement of the player detected by the movement detection section, to decide a similarity between the assigned movement and the movement of the player;
a game operation section for processing a score on the basis of the similarity decided by the similarity decision section; and
a wall member disposed upright in a line of the movement detection section and the player.

22. A game apparatus according to claim 21, further comprising a projection suppression section for suppressing a projection of a shadow of the player on the wall member.

23. A storage medium having a computer-executable program recorded thereon, the computer comprising a movement detection section for detecting a movement of a player, wherein the program comprises:

a program code of executing a predetermined game;
a program code of storing a predetermined assigned movement;
a program code of displaying the assigned movement;
a program code of inputting an input data based on a movement of the player detected by the movement detection section;
a program code of generating at least one of a sound, a music and a sound effect;
a program code of comparing the assigned movement with the input data, to decide a similarity between the assigned movement and the input data;
a program code of processing a score on the basis of similarity decided; and
a program code of adjusting a tempo of the at least one of the sound, music and sound effect based on progress of a game.

24. A storage medium having a computer-executable program recorded thereon, the computer comprising a movement detection section for detecting a movement of a player, wherein the program comprises:

a program code of executing a predetermined game;
a program code of storing a predetermined assigned movement;
a program code of displaying the assigned movement;
a program code of inputting an input data based on a movement of the player detected by the movement detection section;
a program code of generating at least one of a sound, a music and a sound effect;
a program code of displaying the movement of the player on the basis of the input data inputted;
a program code of comparing the assigned movement with the input data, to decide a similarity between the assigned movement and the input data;
a program code of processing a score on the basis of similarity decided; and
a program code of adjusting a tempo of the at least one of the sound, music and sound effect based on progress of a game.

25. A storage medium on which is recorded a computer program comprising program code means for performing the steps of:

storing a predetermined assigned movement for a player;
displaying the assigned movement;
generating at least one of a sound, a music and a sound effect;
detecting a movement of the player;
comparing the assigned movement with the movement of the player detected, to decide a similarity between the assigned movement and the movement of the player;
processing a score on the basis of the similarity decided; and
adjusting a tempo of the at least one of the sound, music, and sound effect based on progress of a game.

26. A storage medium on which is recorded a computer program comprising program code means for performing the steps of:

storing a predetermined assigned movement for a player;
displaying the assigned movement;
generating at least one of a sound, a music and a sound effect;

detecting a movement of the player;

displaying the movement of the player detected;

comparing the assigned movement with the movement of the player detected, to decide a similarity between the assigned movement and the movement of the player;

processing a score on the basis of the similarity decided; and adjusting a tempo of the at least one of the sound, music, and sound effect based on progress of a game.

27. The game apparatus of claim 1, further comprising the similarity decision section deciding a similarity between the movement of the player detected by the movement detection section and the predetermined movement stored in the storage section, on a basis of at least one of a direction, a magnitude and a speed of the movement of the player.

28. A game apparatus according to claim 27, wherein the similarity decision section decides the similarity between the movement of the player and the predetermined assigned movement corresponding to a predetermined time thereof, every predetermined time of the assigned movement.

29. A game apparatus according to claim 27, further comprising:

a timing notice section for indicating a predetermined time by a visual effect or an auditory effect; and a timing decision section for deciding whether the movement of the player detected by the movement detection section coincides with the predetermined time, or not.

30. A game apparatus according to claim 27, further comprising:

a movement specifying section for specifying the movement of the player to be decided on the similarity, wherein the movement of the player is specified from a plurality of movements of the player concurrently detected by the movement detection section, on the basis of at least one of the direction, the magnitude and the speed of each of the movements of the player;

wherein the similarity decision section decides the similarity between the movement of the player specified by the movement specifying section and the predetermined assigned movement.

31. A game apparatus according to claim 29, further comprising:

a movement specifying section for specifying the movement of the player to be decided on the similarity, wherein the movement of the player is specified from a plurality of movements of the player concurrently detected by movement detection section when being decided to coincide with the predetermined time by the timing decision section;

wherein the similarity decision section decides the similarity between the movement of the player specified by the movement specifying section and the predetermined assigned movement.

32. A game apparatus according to claim 27, wherein the similarity decision section decides the similarity between the movement of the player and the predetermined assigned movement corresponding to each of a plurality of detection regions divided from a detection range of the movement detection section, for every detection region.

33. A game apparatus according to claim 30, wherein the movement specifying section specifies the movement of the player to be decided on the similarity, for each of a plurality of detection regions divided from a detection range of the movement detection section, and the similarity decision section decides the similarity between the movement of the player specified by the movement specifying section and the predetermined assigned movement corresponding to the detection region, for every detection region.

34. A game apparatus according to claim 33, wherein the similarity decision section decides the similarity, by considering the movement of the player extended over a plurality of detection regions.

35. A game apparatus according to claim 32, further comprising a by-region decision display section for displaying a decision according to the similarity decided every the detection region by the similarity decision section.

36. A game apparatus according to claim 27, wherein the similarity decision section changes the similarity decided according to a predetermined condition detected by the movement detection section.

37. A game apparatus according to claim 32, wherein the detection region is changed according to a predetermined condition detected by the movement detection section.

38. A game apparatus according to claim 36, wherein the predetermined condition relates to a body shape of the player detected by the movement detection section.

39. A game apparatus according to claim 37, wherein the predetermined condition relates to a body shape of the player detected by the movement detection section.

40. A game apparatus according to claim 27, wherein the movement detection section comprises an artificial retina chip for detecting the movement of the player.

* * * * *